(12) United States Patent
Fukuoka et al.

(10) Patent No.: US 6,862,496 B2
(45) Date of Patent: Mar. 1, 2005

(54) LAUNDRY SYSTEM

(75) Inventors: Ichiro Fukuoka, Moriguchi (JP); Keiji Fuse, Moriguchi (JP); Shinya Izutsu, Moriguchi (JP)

(73) Assignee: Sanyo Electronic Co., Ltd., Osaka (JP)

( * ) Notice: Subject to any disclaimer, the term of this patent is extended or adjusted under 35 U.S.C. 154(b) by 446 days.

(21) Appl. No.: 09/821,810

(22) Filed: Mar. 30, 2001

(65) Prior Publication Data
US 2002/0010515 A1 Jan. 24, 2002

(30) Foreign Application Priority Data

Mar. 31, 2000 (JP) ........................................ 2000-099762
Feb. 14, 2001 (JP) ........................................ 2001-036805

(51) Int. Cl.[7] .............................................. G06F 17/00
(52) U.S. Cl. .............................. 700/237; 700/9; 700/17; 700/19; 700/232; 700/236; 700/241; 700/244; 705/34; 705/41; 705/44; 705/67; 705/72; 705/76; 705/77; 705/78; 705/79; 455/90.1; 455/420; 379/91.01; 235/379; 235/381
(58) Field of Search ................................. 235/379–381, 235/382.5, 449; 700/83, 90, 244, 236–239, 241, 2–4, 9, 19, 17, 231–234; 194/343, 350, 217, 257; 705/41, 64–67, 76–79, 16–21, 72, 34, 35, 44, 39, 40, 400, 1; 307/38; 414/142.1, 143.2, 803; 725/104; 340/3.1, 3.9; 379/91.01, 91.02; 709/223, 217–219; 702/188; 455/418–420, 90.1

(56) References Cited

U.S. PATENT DOCUMENTS

| | | | | |
|---|---|---|---|---|
| 5,225,977 A | * | 7/1993 | Hooper et al. ................ | 705/41 |
| 5,386,362 A | * | 1/1995 | Keret ........................... | 705/30 |
| 5,704,046 A | * | 12/1997 | Hogan .......................... | 705/39 |
| 5,757,643 A | * | 5/1998 | Kuroda et al. ................ | 700/9 |
| 5,799,281 A | * | 8/1998 | Login et al. .................. | 705/1 |
| 6,061,668 A | * | 5/2000 | Sharrow ....................... | 705/400 |
| 6,167,387 A | * | 12/2000 | Lee-Wai-Yin ................. | 705/41 |
| 6,275,500 B1 | * | 8/2001 | Callaway et al. ........... | 370/449 |
| 6,356,881 B1 | * | 3/2002 | Milch et al. ................... | 705/41 |
| 6,434,403 B1 | * | 8/2002 | Ausems et al. .......... | 455/556.2 |
| 2001/0056502 A1 | * | 12/2001 | Hollstrom et al. .......... | 709/250 |

FOREIGN PATENT DOCUMENTS

| | | | |
|---|---|---|---|
| GB | 2 234 837 | 2/1991 | ........... G07F/17/20 |
| JP | 08-126800 | 5/1996 | ........... D06F/95/00 |
| JP | 08-153248 | 6/1996 | ............ G07F/7/02 |
| WO | WO 97 45814 | 12/1997 | ............ G07F/7/08 |
| WO | WO 99 48062 | 9/1999 | ............ G07F/7/00 |
| WO | WO 99 49419 | 9/1999 | ........... G07B/15/00 |

* cited by examiner

Primary Examiner—Anthony Knight
Assistant Examiner—Crystal J. Barnes
(74) Attorney, Agent, or Firm—Rabin & Berdo, P.C.

(57) ABSTRACT

Purpose: To provide a laundry system with improved customer services by utilizing portable information terminals having a radiocommunication function such as mobile phones and PHS. Constitution: Upon completion of washing or drying in a laundry machine 102, data for notifying the user of the completion of the treatment are transmitted to the user's mobile phone 100. In addition, when a prescribed time, for example, 10 minutes, elapses after washing or drying finished, a request for permission to unload the laundry is transmitted to the user's mobile phone 100 so as to ask the user whether the clothes can be taken out from the laundry machine 102 or not. The system charges the user when a prohibition response is sent back or there is no response to the request for permission to unload the laundry.

19 Claims, 54 Drawing Sheets

*📶📞

LAUNDRY MOBILE MENU

INPUT YOUR PASSWORD

YOUR PASSWORD:

CONFIRM PASSWORD AND PRESS DETEMINATION KEY

FIG. 8
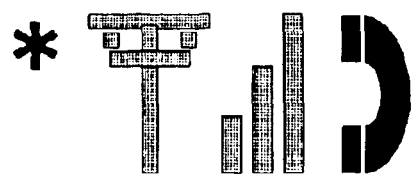
USE LAUNDRY
INPUT MACHINE NUMBER YOU USE
(REFER TO INDICATION ON MACHINE OPERATION PART)
MACHINE NO. : 
CONFIRM MACHINE NUMBER AND PRESS DETERMINATION KEY

USE LAUNDRY

WHEN READY-TO-DRIVE LAMP STARTS FLASHING, LOAD YOUR LAUNDRY AND PRESS START BUTTON.

THANK YOU.

OPERATION PART (DRYER)

OPERATION PART (WASHING MACHINE)

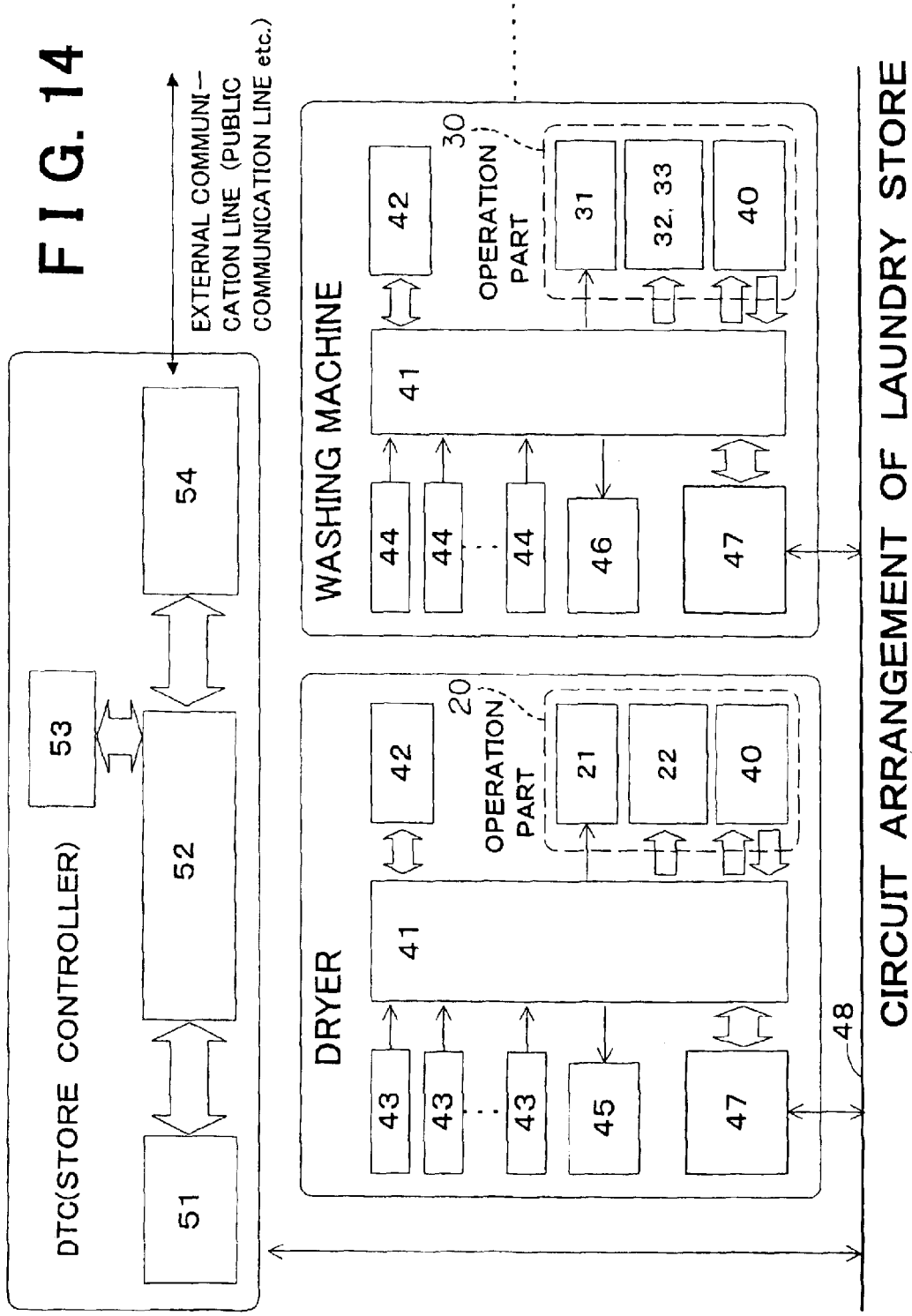

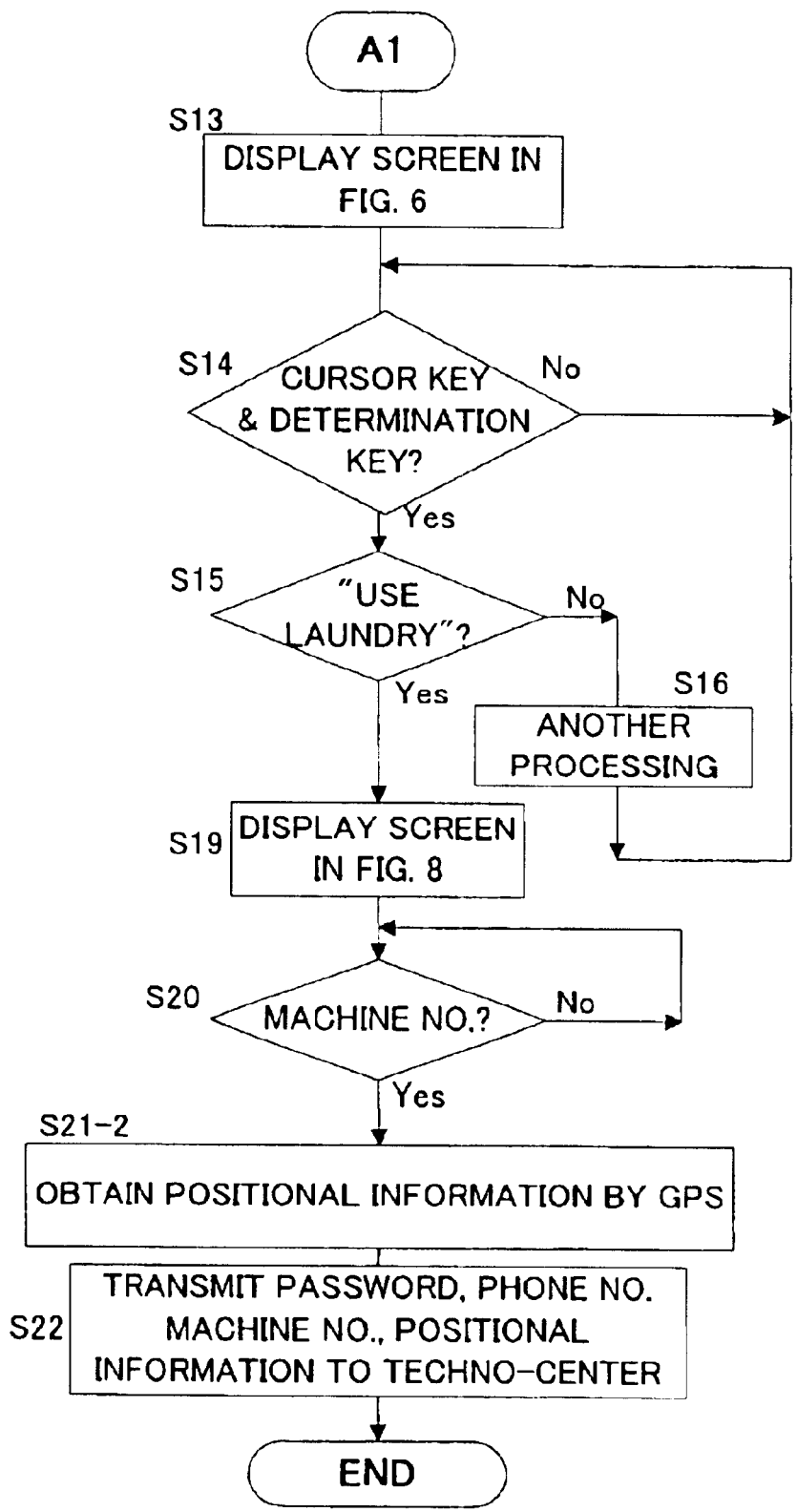

FIG. 21

| STORE# | PHONE# | LONGITUDE (EAST LONGITUDE) | LONGITUDE (NORTH LATITUDE) |
|---|---|---|---|
| 1 | 03-3333-5678 | 139. 45. 6. 7 | 35. 40. 5. 6 |
| 2 | 03-*-** | 139. **. *. * | 35. **. *. * |
| 3 | 03-*-** | 139. **. *. * | 35. **. *. * |
| 4 | 06-*-** | 139. **. *. * | 35. **. *. * |
| 5 | 06-*-** | 139. **. *. * | 35. **. *. * |
| 6 | 06-*-** | 139. **. *. * | 35. **. *. * |
| 7 | 075-*-** | 139. **. *. * | 35. **. *. * |
| 8 | 075-*-** | 139. **. *. * | 35. **. *. * |
| 9 | 075-*-** | 139. **. *. * | 35. **. *. * |
| 10 | 077-*-** | 139. **. *. * | 35. **. *. * |
| 11 | 077-*-** | 139. **. *. * | 35. **. *. * |
| 12 | 077-*-** | 139. **. *. * | 35. **. *. * |

<MASTER FILE OF STORES>

CIRCUIT ARRANGEMENT OF MOBILE PHONE

FIG. 28
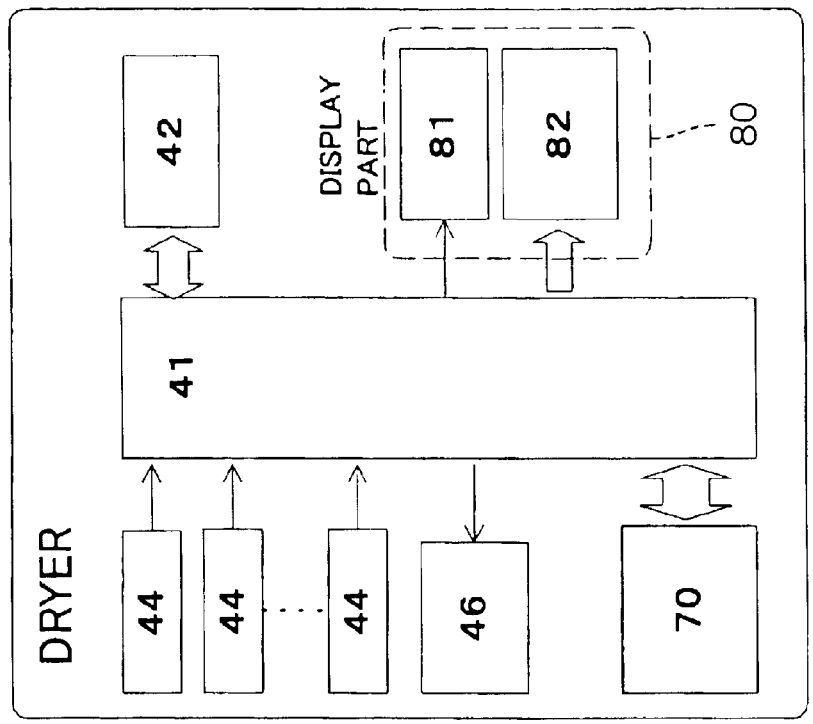
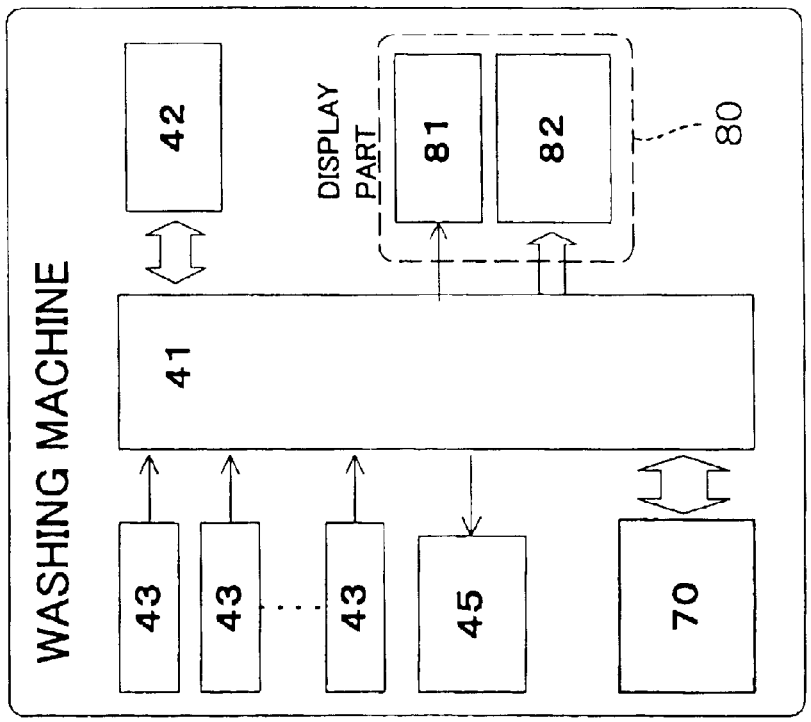
CIRCUIT ARRANGEMENT OF LAUNDRY STORE

MACHINE OPERATION PART

USE LAUNDRY

LOAD YOUR LAUNDRY WHEN MACHINE INDICATING LAMP STARTS FLASHING

INPUT OPERATION TIME BY NUMERIC KEYS, AND PRESS DETERMINATION KEY TO START

OPERATION TIME: 123 MIN.

MOBILE PHONE SIDE

MACHINE INDICATING LAMP  81

DRYING TIME: 123 MIN.  82

80

MACHINE SIDE

MACHINE INDICATING LAMP IS TURNED OFF. OPERATION IS STARTED. REMAINING TIME IS DISPLAYED.

FIG. 39
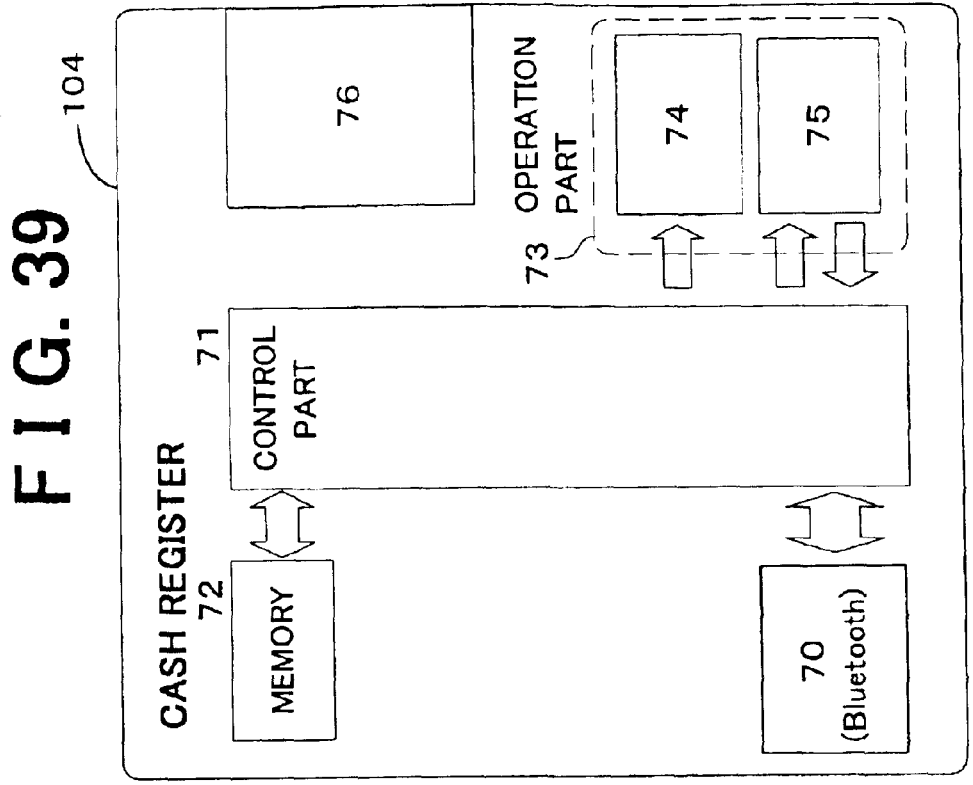
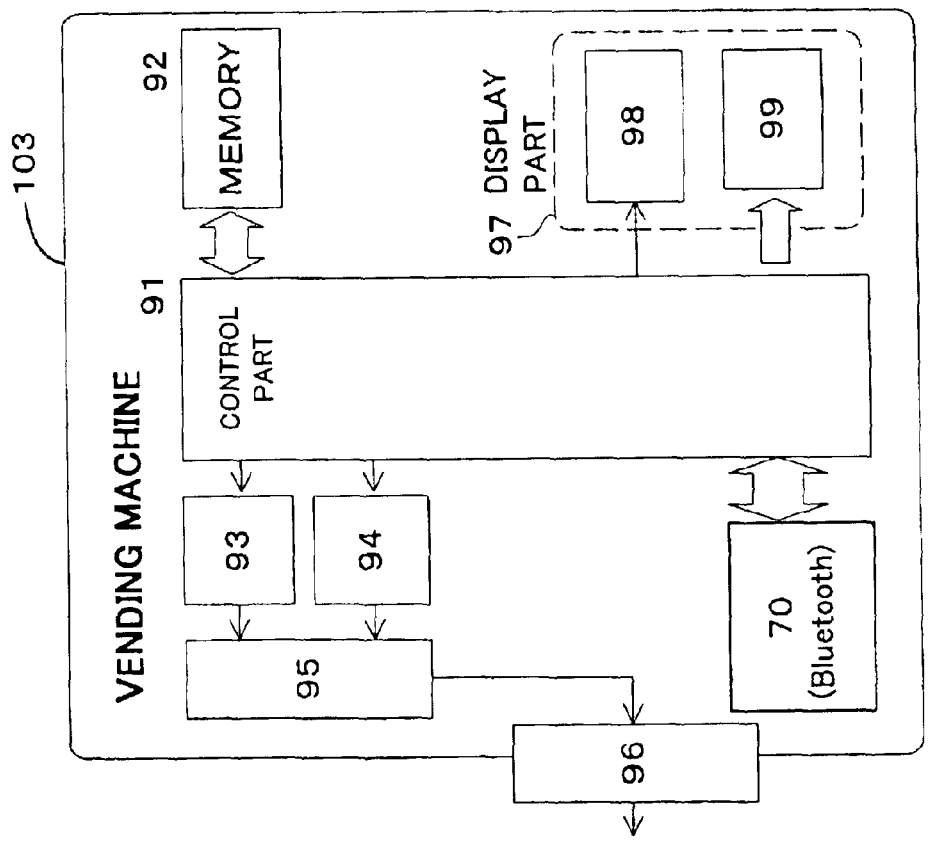

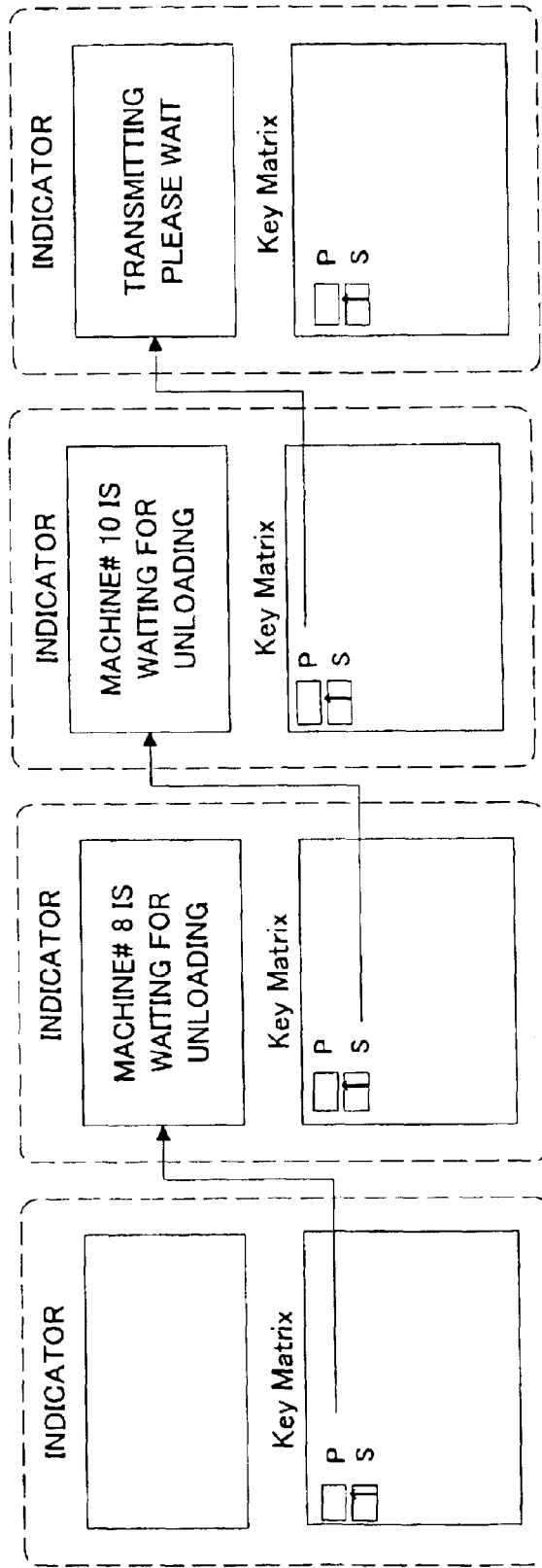

FIG. 48

| MACHINE NUMBER | PROHIBITION FLAG | SUSPENSION TIME COUNTER |
|---|---|---|
| 1 | CLEAR | 00 (MIN.) |
| 2 | CLEAR | 00 (MIN.) |
| 3 | CLEAR | 00 (MIN.) |
| 4 | CLEAR | 00 (MIN.) |
| 5 | SET | 05 (MIN.) |
| 6 | CLEAR | 00 (MIN.) |
| 7 | CLEAR | 00 (MIN.) |
| 8 | SET | 07 (MIN.) |
| 9 | CLEAR | 00 (MIN.) |
| 10 | SET | 09 (MIN.) |

CASH REGISTER CONTROL PROGRAM MANAGING TABLE

LAUNDRY SYSTEM

BACKGROUND OF THE INVENTION

1. Field of the Invention

The present invention relates to a laundry system, and in particular, this invention is concerned with a laundry system utilizing portable communication tools such as mobile phones, portable telephones, cellular phones, PHS (personal handy-phone system), mobile communication terminals, and so on.

2. Description of Related Art

Nowadays, coin laundries are wide spread and used by many people as facilities in which washing can be done conveniently. Generally, unmanned operation is adopted in the coin laundries so that one can do the laundry on a so-called self-service basis any time in 24 hours.

As is obvious from its name, washing machines and dryers in a coin laundry are made operable by putting in coins and bills (bank notes). Accordingly, a managing unit for accepting coins (and bills) is installed or incorporated in each of the washing machines and dryers.

Being operated unmanned and for 24 hours, the coin laundries have the convenience of allowing anyone to use them freely. On the other hand, they sometimes suffer from damages due to robbery, in which the coins and bills collected inside the managing units are forcibly taken out during time zones such as midnight and early morning when there are few users. In many of such events, coins and bills are taken not only by breaking the managing units so as to take the coins and bills collected inside, but also by destroying the bodies of the washing machines and dryers together with the managing units. Accordingly, the equipment damage amounts to a huge loss in the current circumstances.

Meanwhile, the coin laundries are robbed of the coins and bills with their equipment being destroyed because there are coins and bills collecting inside the equipment (managing unit). Accordingly, it is possible to assume that if there are no coins or bills inside the equipment of a coin laundry, it will never be robbed of coins and bills and its equipment will never be broken.

Recently, there are also stores having vending machines installed in addition to the laundry machines. It is also possible to think of manned stores capable of functioning as so-called convenience stores in which articles of daily use are displayed besides the laundry machines.

However, in either case, that is, in the case of unmanned stores provided with laundry machines together with vending machines or in the case of manned stores functioning as convenience stores, the existence of a large amount of money in the stores (laundries) is not favorable in terms of prevention of stealing and robbery.

The present invention arises from such a background mentioned above, and therefore it is an object of this invention to provide a laundry system (because of the no use of coins, this system cannot be called a "coin laundry" in a precise sense, and accordingly, this system is hereinafter simply referred to as the "laundry system") usable without coins or bills.

This invention, of course, does not provide a laundry system of free-of-charge, but intends to provide a laundry system which allows for what is called cashless use in which instead of using coins or bills for the charges as in the known systems, portable communication tools such as mobile phones, portable telephones, cellular phones, PHS and mobile communication terminals are used.

In addition, another object of this invention is to provide a system that allows, besides cashless use of laundry machines, cashless purchasing of products from vending machines installed in the stores or articles of daily use displayed in the stores by means of portable communication tools.

SUMMARY OF THE INVENTION

The present invention is to provide a laundry system comprising laundry equipment which comprises a plurality of laundry machines such as washing machines and dryers, and a laundry managing server for managing the laundry equipment, wherein:

the laundry equipment comes into an operable state by receiving a signal for permitting operation thereof from the laundry managing server, and transmits operational information to the laundry managing server in response to operation of the laundry equipment which has become operable; and the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information.

In the laundry system according to the present invention, when an operation of a laundry machine has finished, that is, when cleaning or drying has finished, a portable communication tool (such as a mobile phone or the like) of the customer can be informed of the completion of cleaning or drying, whereby the quality of customer service of the laundry system is enhanced.

The invention according to the present invention also provides a system which can utilize a portable communication tool provided with radio communication means for long-distance communication together with specified low power radio communication means so that communication with the laundry equipment and the laundry managing server can be effectively performed.

According to this invention, it is further possible to provide a laundry system that allows for so-called cashless use thereof by means of a portable communication tool instead of coins and bills that have been used conventionally. In particular, the present invention enables the customer to use desired laundry equipment such as a washing machine or a dryer by means of a portable communication tool such as a mobile phone. Moreover, the customer is billed for the laundry usage along with the communication charge of the portable communication tool, and the contents of the bill can be checked out so that accounting of the charges caused by the use of laundry equipment is conveniently carried out. In addition, utilizing bank account transfer makes the use of the laundry equipment more convenient.

BRIEF DESCRIPTION OF THE DRAWINGS

FIG. 8 illustrates an example of another screen on the display screen.

FIG. 14 includes a block diagram showing a control circuit arrangement of laundry machines in the laundry, and a block diagram showing a control circuit arrangement of a DTC (store controller) in the laundry.

FIGS. 18A and 18B are flow charts showing another controlling procedure of the mobile phone 10.

FIG. 21 illustrates a part of contents stored in a master file of customers of the techno-center 3.

FIG. 28 is a block diagram showing a circuit arrangement of the laundry machines in the store.

FIG. 39 is a block diagram showing an arrangement of control circuits of a vending machine 103 and a cash register 104 installed a store 110.

FIGS. 42A–D and FIGS. 43A and 43B are detailed illustrations of an operation part of the cash register 104.

FIG. 48 illustrates an example of prohibition flags and suspension time counter provided in a control program managing table inside the cash register 104.

DESCRIPTION OF THE PREFERRED EMBODIMENTS

Referring now to the appended drawings, specific embodiments of the present invention are described.

Figure 1:
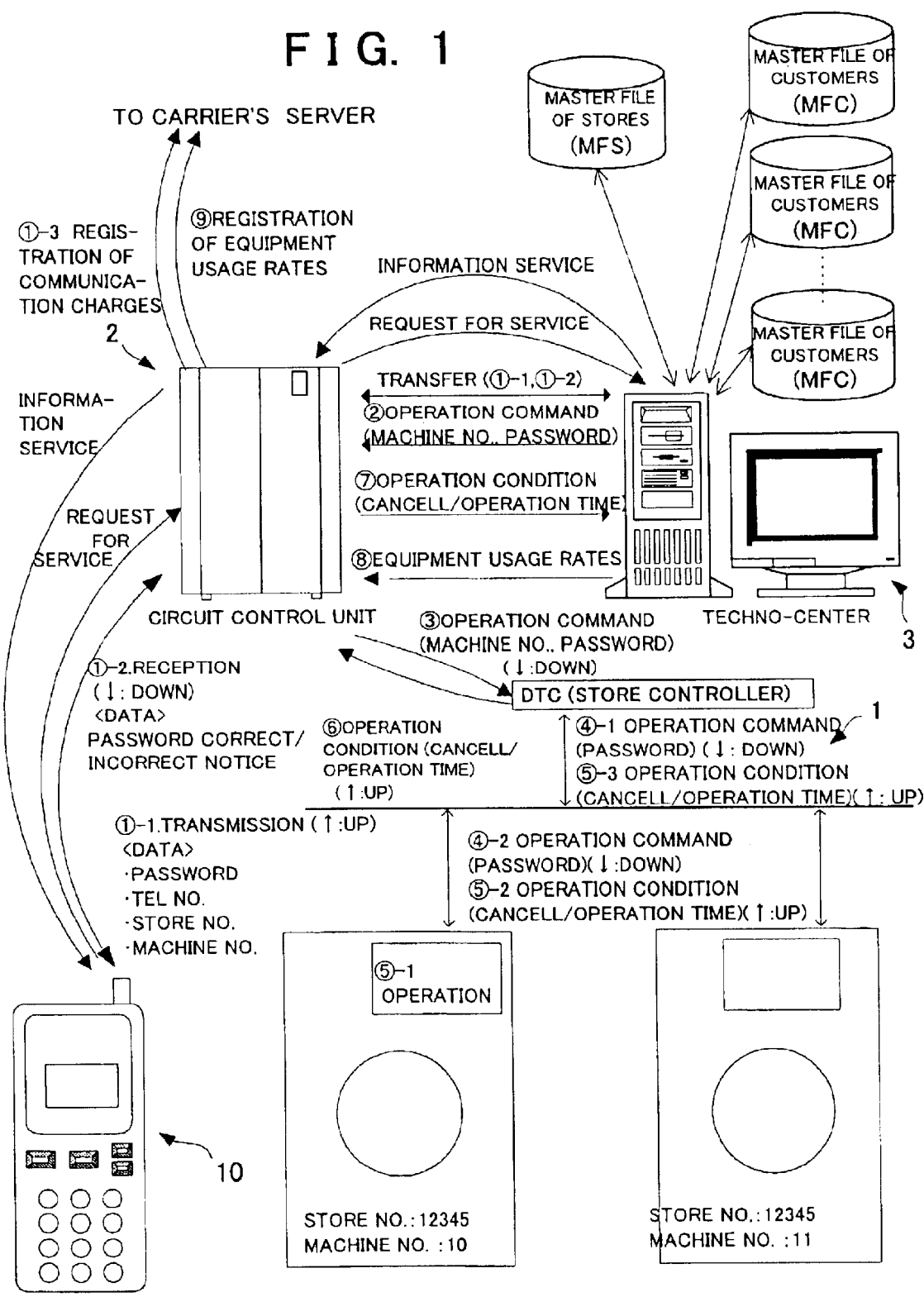
FIGS. 1 and 2 are block diagrams showing the whole structure of a laundry system according to a first embodiment of the present invention.
Figure 2:
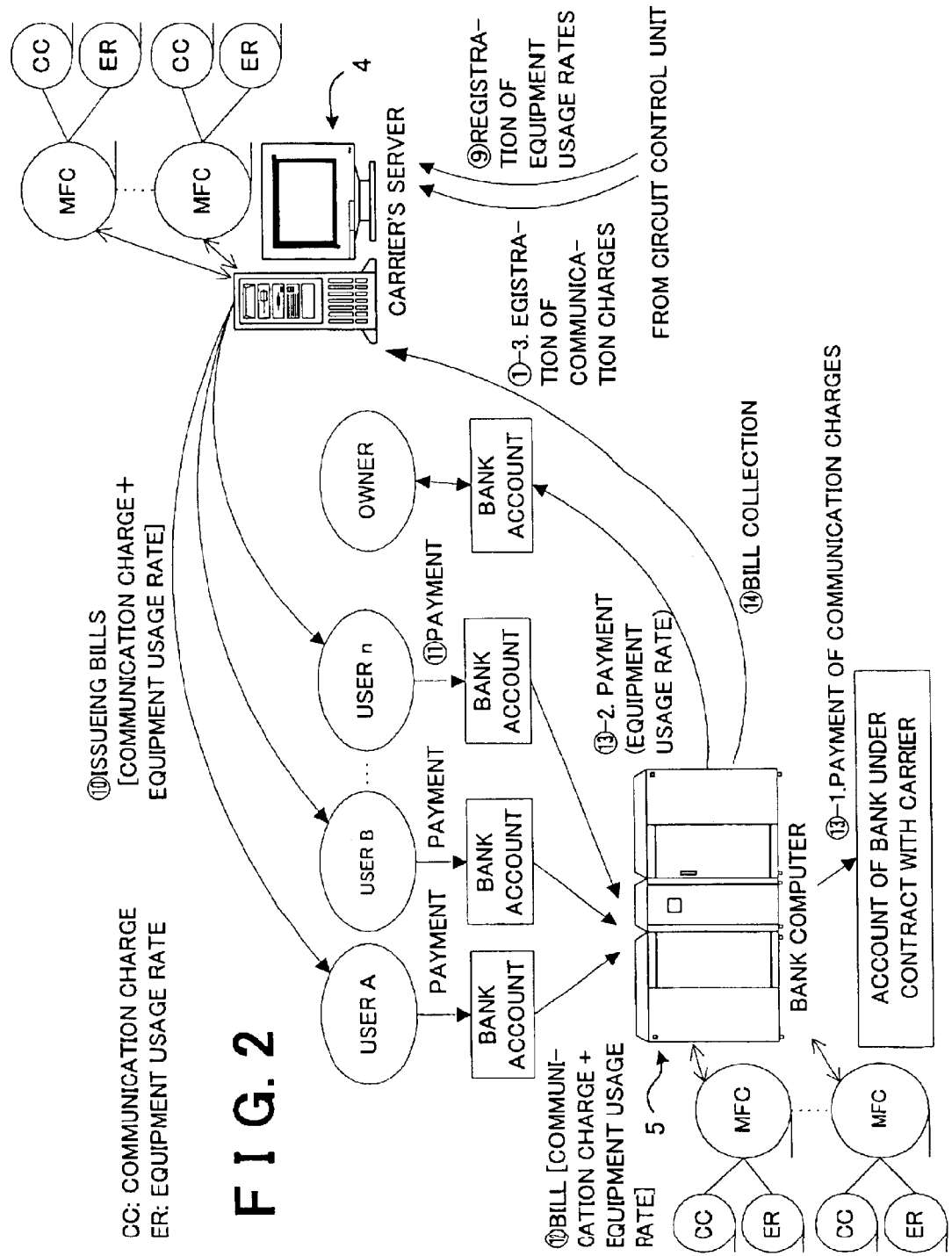

FIGS. 1 and 2 are block diagrams showing the whole structure of a laundry system according to a first embodiment of this invention. The laundry system in this embodiment includes a laundry (store) 1 on business in a town or the like, which is provided with a plurality of laundry machines such as washing machines and dryers as well as a DTC (store controller) to which those machines are connected. The DTC is a controller for communicating with a circuit control unit 2 of a carrier.

The laundry system can be communicated with a techno-center 3 via the circuit control unit 2. The techno-center 3 is, for example, a business center of a company providing this laundry system. The techno-center 3 has a laundry managing server maintaining a master file of stores and master files of customers. The customer of the laundry 1 uses, for example, a mobile phone 10 so as to request a service from the techno-center 3 through the circuit control unit 2, thereby obtaining service information from the techno-center 3 or using desired laundry machines in the laundry 1.

Issuance of bills to customers who have used the laundry system is also available in this laundry system by using a carrier's server 4. The carrier's server 4 maintains master files of customers in which communication charges and laundry equipment usage rates of individual customers are memorized so that the contents of the bills include such communication charges and laundry equipment usage rates.

A bank computer 5 under contract with the carrier collects the charges listed in the bills from bank accounts of individual customers and pays the communication charges to a bank account of the carrier, while paying the equipment usage rates to a bank account of the laundry owner.

Specifically, the bank computer 5 under contract with the carrier accesses the master files of customers kept by the carrier's server 4, or the bank computer 5 itself owns the master files of customers so as to detect the communication charges and the equipment usage rates of individual customers and pay the communication charges and the equipment usage rates to the bank account of the carrier and to the bank account of the laundry owner, respectively.

In the laundry system according to this embodiment, the DTC, the circuit control unit 2, the techno-center's server 3, the carrier's server 4 and the bank computer 5 are interconnected with one another by a communication circuit or network such as the Internet.

The whole structure and a general operational flow of the laundry system according to this embodiment have been discussed so far. Now, each of the constituents and its operation are specifically explained.

Figure 3:
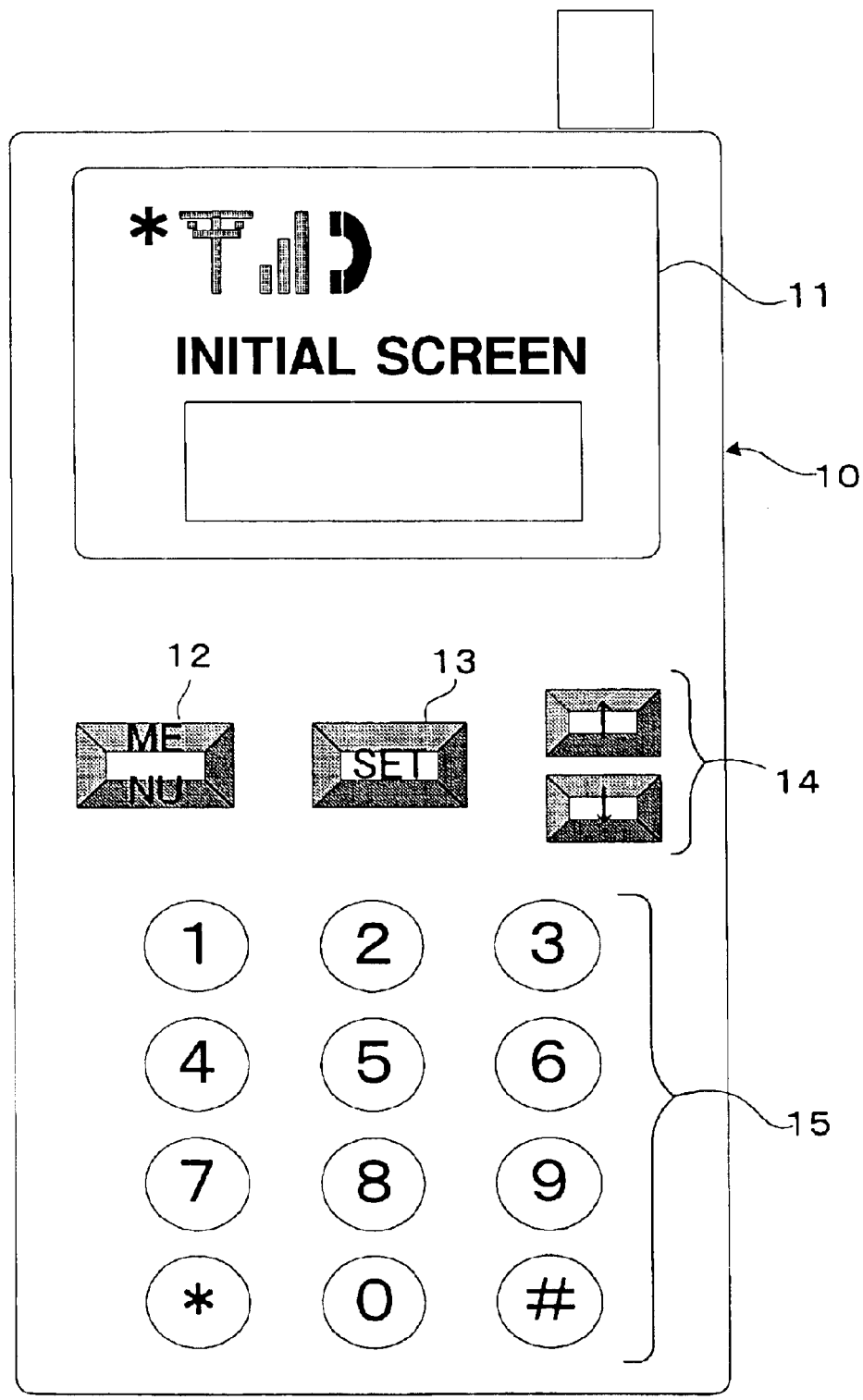
FIG. 3 is an elevational view of a mobile phone as an example of portable communication tools.

FIG. 3 is an elevational view of a mobile phone 10, which is an example of the portable communication tools. The mobile phone 10 is provided with a display 11, a menu key 12, a determination key 13, cursor keys 14, and numeric keys 15.

Figure 4:
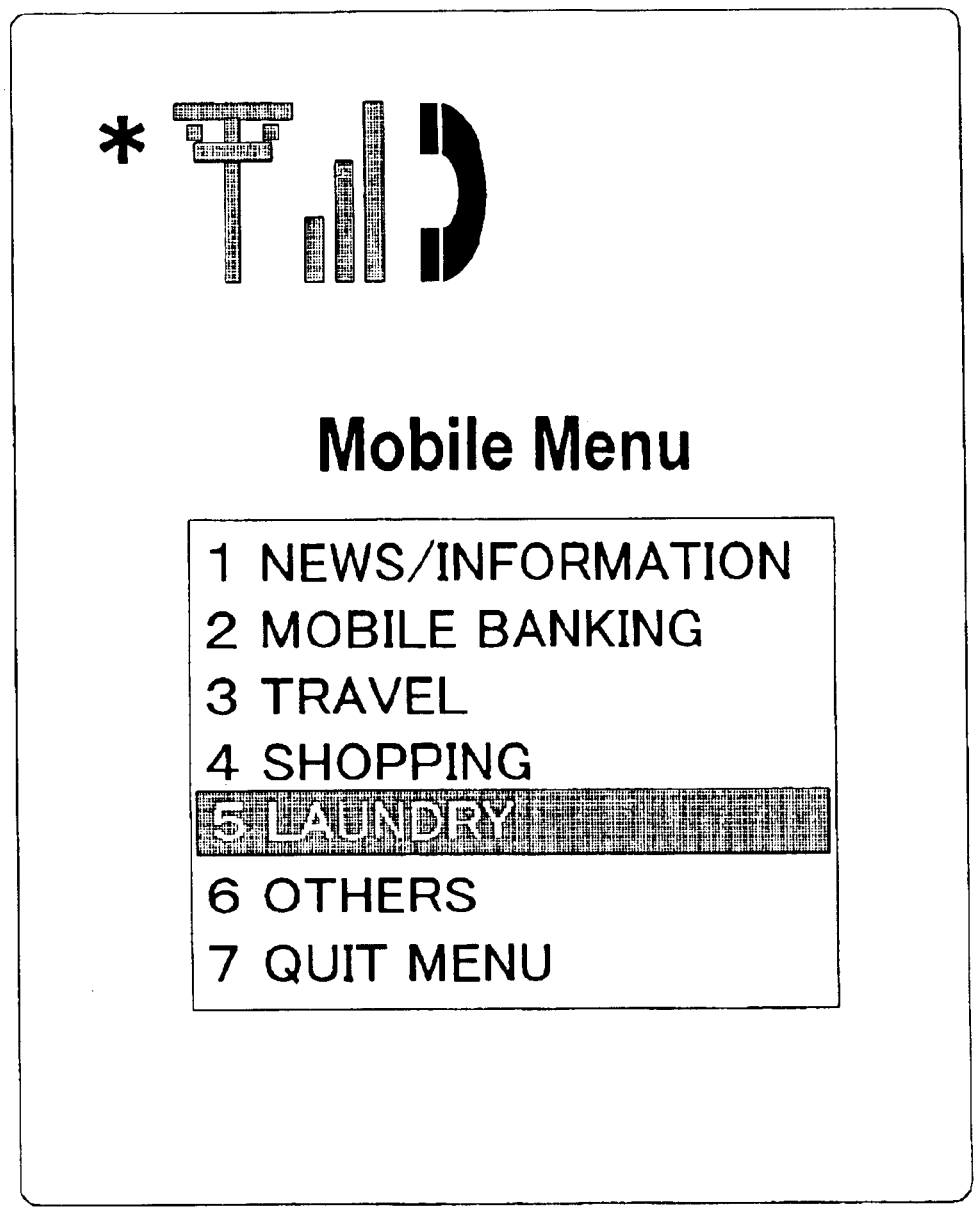
FIG. 4 illustrates one example of a screen on a display screen.

When the menu key is operated while the display 11 shows an initial screen as in FIG. 3, the screen on the display 11 turns into a mobile menu page shown in FIG. 4. Selecting "5. Laundry" on this screen by the cursor keys 14 followed by pressing of the determination key 13 brings a screen shown in FIG. 5. Meanwhile, when "7. Quit menu" is selected on the screen in FIG. 4 and the determination key 13 is pressed, the display returns to the initial screen.

Figure 5:
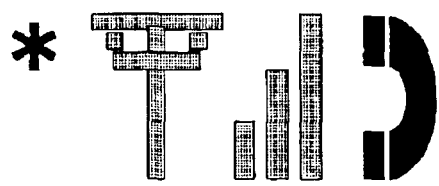
FIG. 5 illustrates an example of another screen on the display screen.

FIG. 5 illustrates a laundry mobile menu page in which the customer is requested to input a password. The customer needs to have a contract for permitting use of the laundry system with the techno-center 3 (See FIG. 1) in advance so that the password is given to the customer under the contract.

Figure 6:
FIG. 6 illustrates an example of another screen on the display screen.

With the laundry mobile menu shown in FIG. 5 being displayed, when the password of the customer is properly inputted and the determination key 13 is pressed, the display screen advances to the page in FIG. 6. On the screen in FIG. 6, the customer can select either "1. Use the laundry" or "2. Other information services". When selecting "1. Use the laundry" by the cursors 14 and pressing the determination key 13, the display is proceeded to the stage in FIG. 7.

The "2. Other information services" in FIG. 6 can illustrate services providing various information centered on laundry-related information, for example, newly opened laundries, information related to the laundry use such as time zones with discount charges, recommended detergents, hacks for cleaning and so forth.

Figure 7:
FIG. 7 illustrates an example of another screen on the display screen.

At the page of laundry use shown in FIG. 7, the customer is instructed to input a store number. Each laundry store belonging to this system has preliminarily been provided with a store number for identifying the store. The customer is supposed to input the store number by the numeric keys 15. The screen displayed as in FIG. 7 may include a note reading; "The store number has been delivered to you in advance. If you don't know, refer to the indication in the operation part of the machine." for the sake of customer's convenience.

After inputting the store number and pressing the determination key 13, the display is proceeded to the page shown in FIG. 8 for inputting a laundry machine number to be used.

The laundry 1 is given a store number. Likewise, each of the laundry machines is provided with a identifying number. The customer is supposed to input a machine number that the customer wants to use. If the customer wants to use a washing machine, the customer inputs the number of the washing machine "10" by the numeric keys 15. Pressing the determination key 13 brings the next page.

Also, in the screen at the stage of inputting the machine number, an instruction such as "Refer to the operation part of the machine for the machine number" or the like may be included for the sake of customer's convenience.

Figure 9:
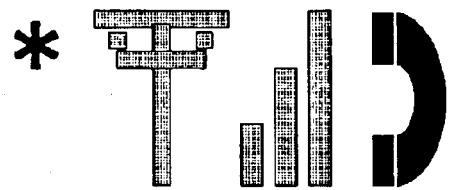
FIG. 9 illustrates an example of another screen on the display screen.

At the page shown in FIG. 9, an instruction on how to operate the laundry machine is displayed. In this embodiment, an instruction such as "Load your laundry when the ready-to-drive lamp in the operation part starts flashing, and operate the buttons on the machine to start the operation. Thank you." will be displayed.

What has been described above is the operation in the laundry to be carried out by the customer by means of the mobile phone 10.

Figure 10:
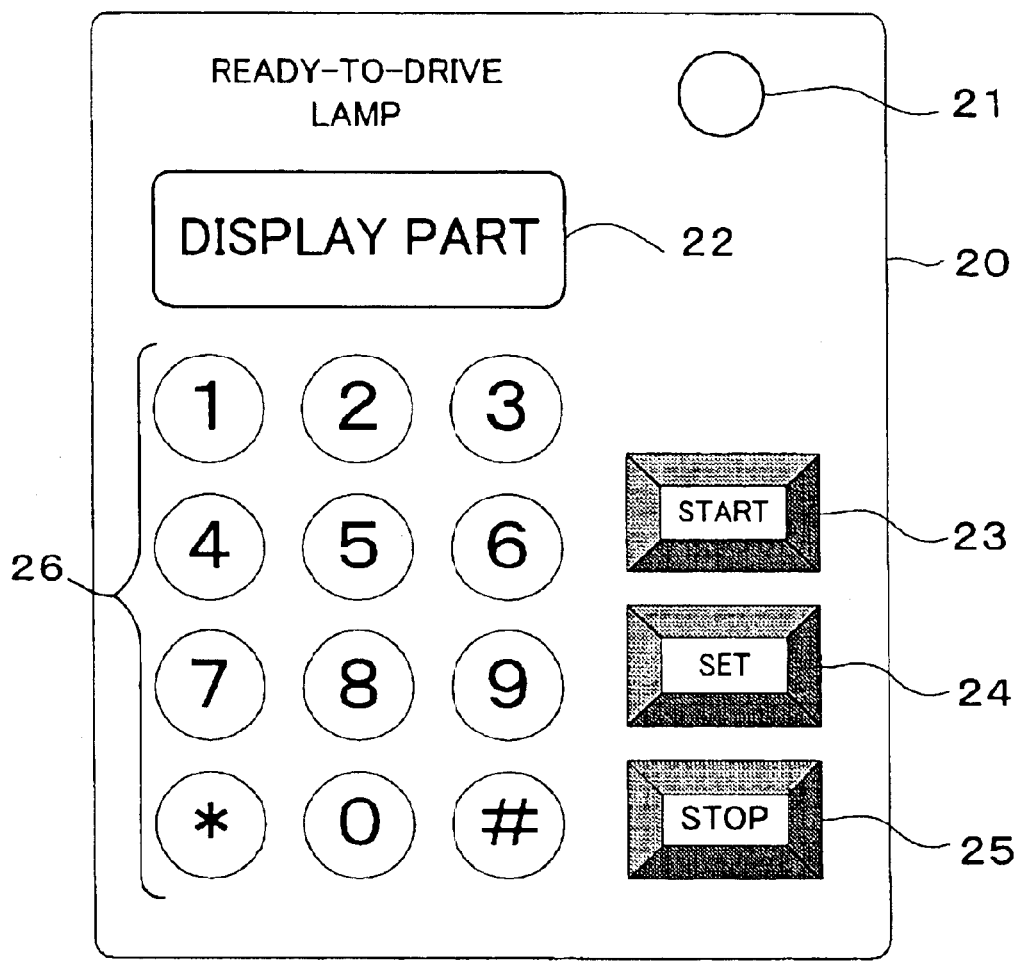
FIG. 10 is a view showing an arrangement of an operation part of a dryer installed in a laundry.

FIG. 10 is an elevational view of an arrangement of an operation part of a dryer installed in the laundry 1. The operation part 20 of the dryer is provided with a ready-to-drive lamp 21 that starts flashing when the dryer comes in a condition possible to drive. The operation part 20 also includes a display part 22, an operation key 23, a determination key 24, cancellation key 25 and numeric keys 26.

Figure 11:
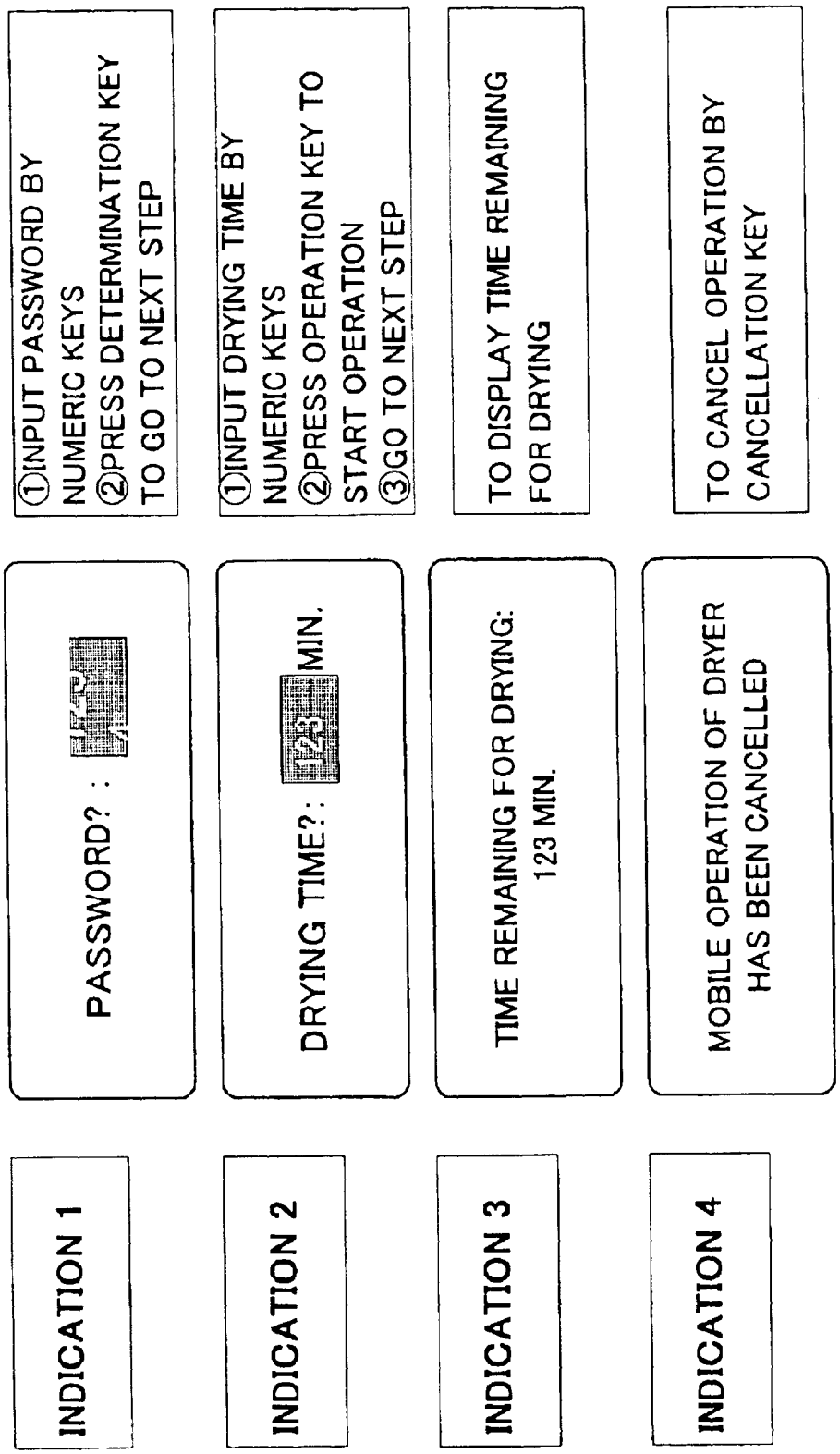
FIG. 11 illustrates a transition of the display mode of a display part 22.

After the ready-to-drive lamp 21 on the operation part 20 starts flashing, indications, namely, "Indication 1" to "Indication 4" shown in FIG. 11 are displayed in sequence on the display part 22. According to these indications, the customer operates the keys.

First, an indication requesting to input the password is displayed (Indication 1). The customer is to input the password by the numeric keys 26 and press the determination key 24. The password is the one that has been explained referring to FIG. 5, which has been preliminarily given to the customer upon under contract with the techno-center 3. Requesting the password at the stage of operating the laundry machine contributes to enhancing the effectiveness of prevention of fraudulent use.

Subsequently, input of the time for drying is requested (Indication 2). The customer inputs a time for drying, for example, "123 minutes", by the numeric keys 26. After confirming the time, the customer presses the operation key 23, thereby starting the operation of the dryer. During the drying operation, time remaining for the drying is displayed (Indication 3). If the customer wishes to stop the drying operation, the customer may press the cancellation key 25. In that case, a message which reads, "The mobile operation of the dryer has been cancelled.", is displayed on the display part 22, and the operation is stopped.

Figure 12:
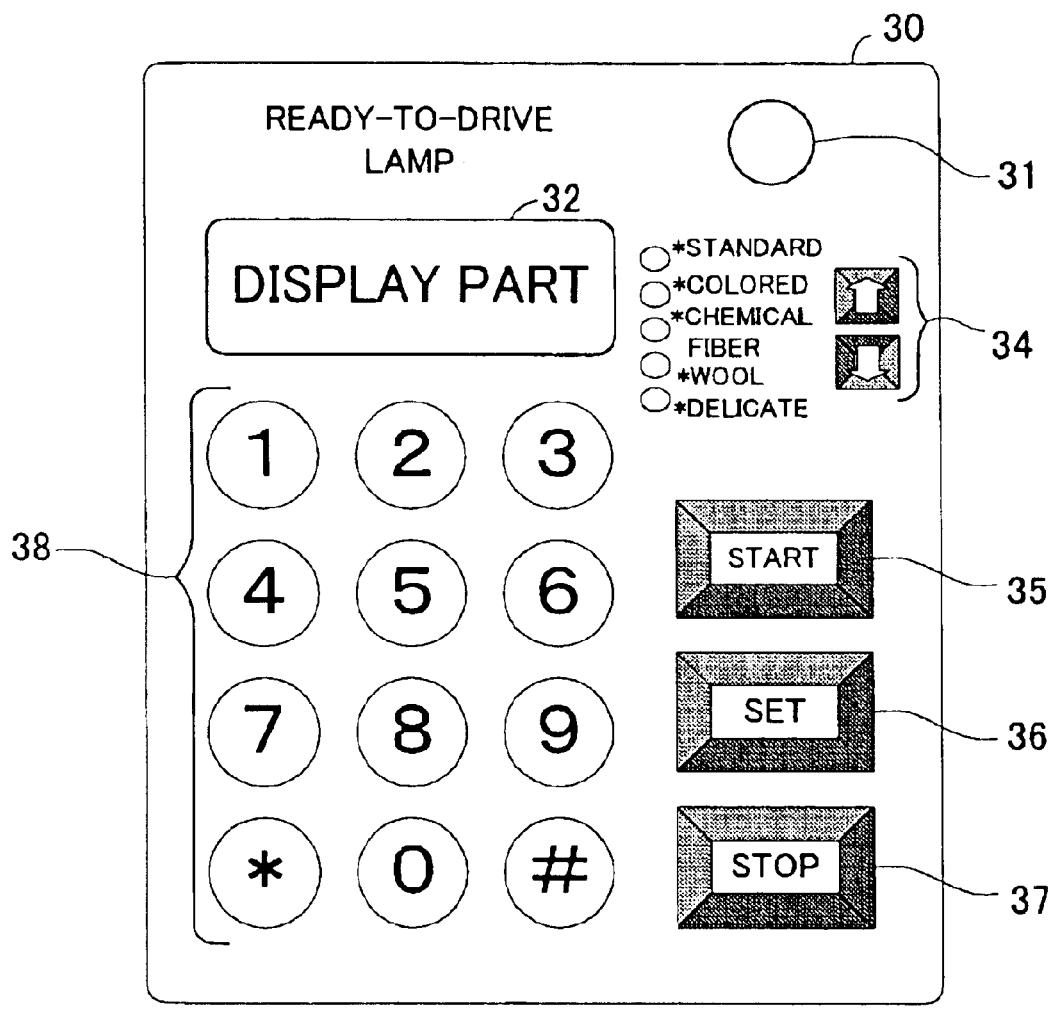
FIG. 12 is an elevational view showing an arrangement of an operation part of a washing machine.

FIG. 12 is an elevational view showing an example of the operation part 30 of a washing machine in the laundry 1. The operation part 30 of the washing machine is provided with a ready-to-drive lamp 31 which starts flashing when the washing machine comes in a condition possible to drive. This operation part 30 also includes a display part 32, washing course indicating lamps 33, cursor keys 34, an operation key 35, a determination key 36, a cancellation key 37 and numeric keys 38.

Figure 13:
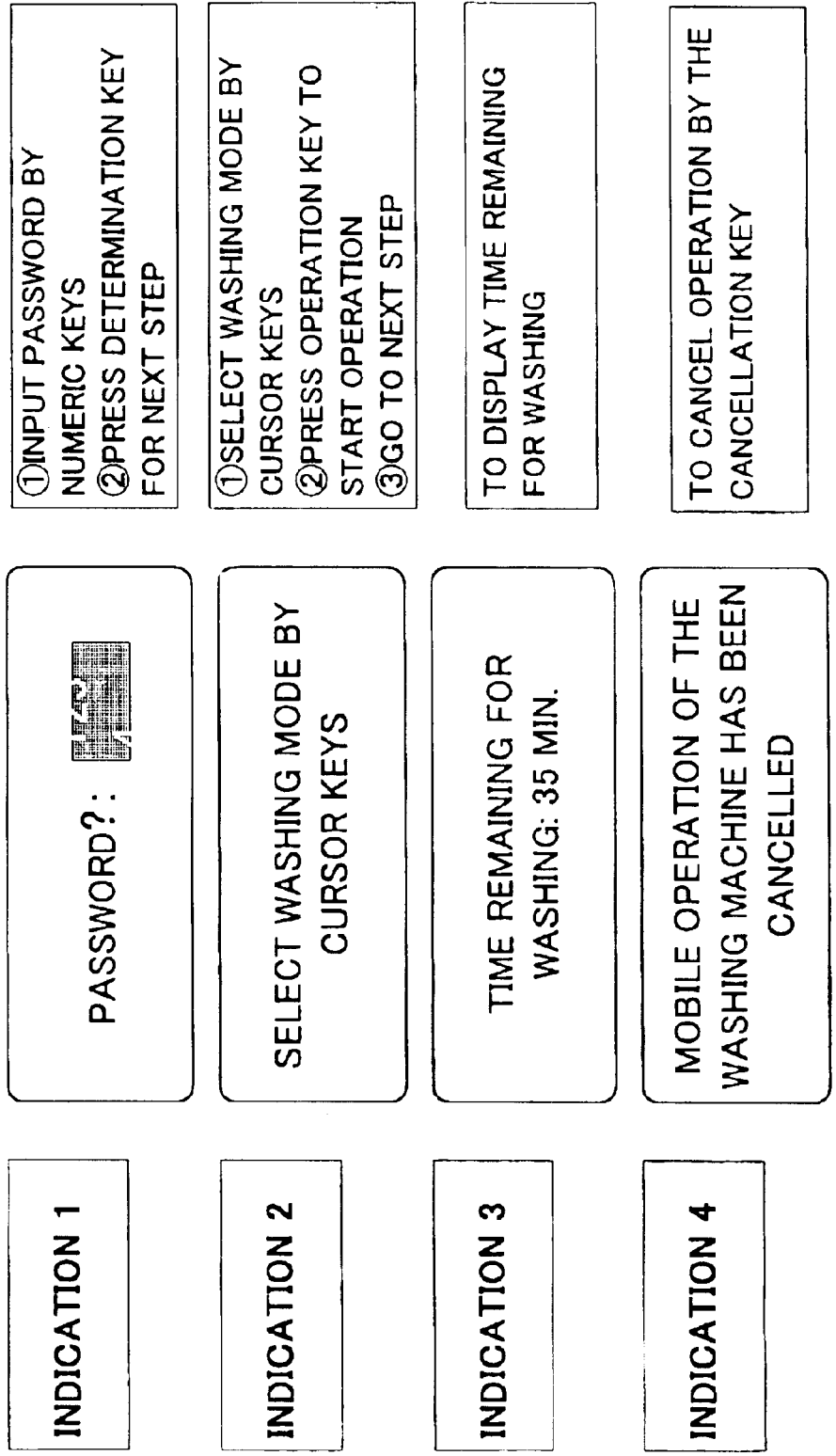
FIG. 13 illustrates a transition of the display mode of a display part 32.

FIG. 13 illustrates a transition of the display in the display part 32 when the ready-to-drive lamp 31 is flashing. First, a request for inputting the password is shown in the display part 32 (Indication 1). In response to this message, the customer is to input the password by the numeric keys and press the determination key 36 so that the display proceeds to Indication 2. Indication 2 asks the customer to select a washing course by the cursor keys 34. The customer can select a desired washing course by pressing the cursor keys 34 by which the indication in the washing course indicating lamps moves sequentially. After selecting the washing course, the customer is to press the operation key 35 to start the washing operation.

During the washing operation, time remaining for the washing is displayed (Indication 3). If the customer wishes to stop the washing, the customer may press the cancellation key 37, when a message, "The mobile operation of the washing machine has been cancelled.", is displayed on the display part 32 (Indication 4).

FIG. 14 is a block diagram showing a control circuit arrangement of laundry machines and the DTC in the laundry.

Each machine in the laundry (a washing machine and a dryer) is provided with a control part 41 including a microcomputer and a memory 42. The operation part 20 (or 30) described referring to FIGS. 10 and 12 above is connected to the control part 41. As mentioned above, the operation part 20 (or 30) is provided with the ready-to-drive lamp 21 (or 31), the display part 22 (or the display part 32 and course indicating lamps 33), and a key matrix 40 including the operation key, the determination key, the cancellation key, and cursor keys. In addition, various kinds of sensors 43 (or 44) for detecting the operational status of the laundry machine direct signals to the control part 41. The control part 41 drives a load drive circuit 45 (or 46) based on the signals from the operation part 20 (or 30) and the signals from the various kinds of sensors 43 (or 44).

Additionally, a data transceiving interface 47 is connected to the control part 41. Signals are transmitted/received between the data transceiving interface 47 and the DTC through a communication line 48 such as LAN.

The DTC comprises an interface 51 for transmitting/receiving data of the laundry machines, a DTC control part 52 connected to the interface 51, a memory 53 and a communication controlling/communication data transceiving interface 54 (specifically, a modem, etc.) for transmitting/receiving data to/from an external communication circuit such as a public communication circuit and Internet.

The DTC performs communication with the techno-center 3 via the external communication circuit and the circuit control unit 2 (refer to FIG. 1).

Now, controlling procedures of each part constituting this laundry system is described referring to flowcharts.

Figure 15A:
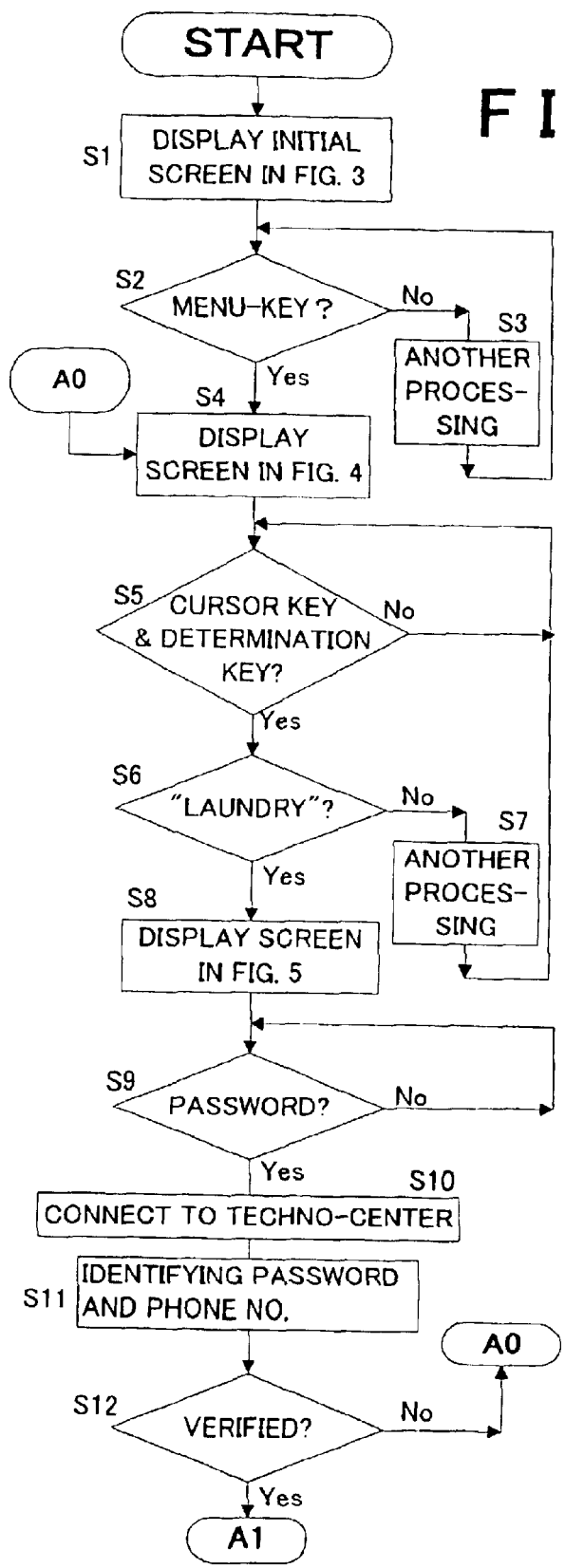
FIGS. 15A and 15B are flow charts showing a controlling procedure of the mobile phone 10.
Figure 15B:
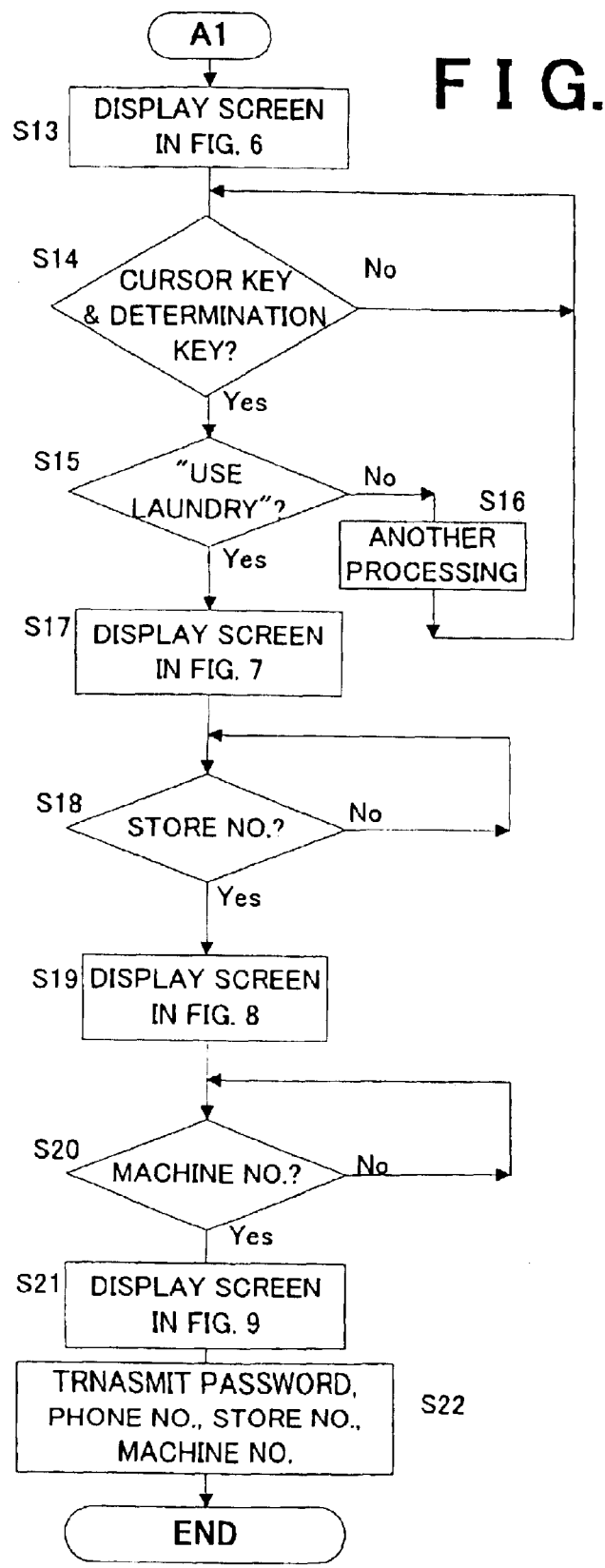

FIGS. 15A and 15B are flow charts illustrating a controlling procedure of the mobile phone 10. In the mobile phone 10, the initial screen (the screen in FIG. 3) is first displayed on the display 11 (step S1). When the menu key 12 is pressed with the initial screen being displayed (Yes at step S2) the processing proceeds to a step S4. When another input by a key other than the menu key 12 is done (No at step S2), another processing (step S3) will be carried out. When the menu key 12 is pressed, the "mobile menu" page in FIG. 4 appears on the display 11 (step S4). After the cursor keys 14 are operated, whether the determination key 13 has been pressed or not is judged (step S5). When the response in the step S5 is positive, whether the "5. Laundry" has been selected or not is checked(step 56). When the response in the step S6 is negative, a processing selected from among other processing options listed in the mobile menu will be carried out (step S7).

When the response in the step S6 is affirmative, the display shows the screen in FIG. 5 (step S8), where input of the password is requested and whether the password has been inputted or not is checked (step S9).

Upon the input of the password, the mobile phone 10 is connected to the techno-center 3 through the circuit control unit 2 (step S10) so that the password and the number of the mobile phone (that is, the customer's ID) are transmitted by, for example, packet communication. In response to this transmission, correspondence of the password to the customer's ID is checked based on the data registered in the master files of individual customers (step S11). When the password is verified (step S12), the screen in FIG. 6 is displayed (step S13). When the password is erroneous, the screen returns to the page in FIG. 4.

With the page in FIG. 6 being displayed, when the cursor keys 14 are pressed and the determination key 13 is pressed (when answered affirmative at step S14), whether "1. Use the laundry" has been selected or not is judged (step S15). When "2. Other information services" has been selected, another processing according to the selection will be carried out (step 16).

When "1. Use the laundry" is selected, the display shows the screen in FIG. 7 (step S17) until the store number of the laundry is inputted (step S18), when the display shows the screen in FIG. 8 according to the input of the store number (step S19). After waiting for the machine number to be inputted (step S20), the screen advances to the page in FIG. 9 in response to the input of the machine number (step S21). Then, the password, the mobile phone number (customer's ID), the store number and the machine number are transmitted to the techno-center 3, for example, by a packet communication (step S22).

Figure 16:
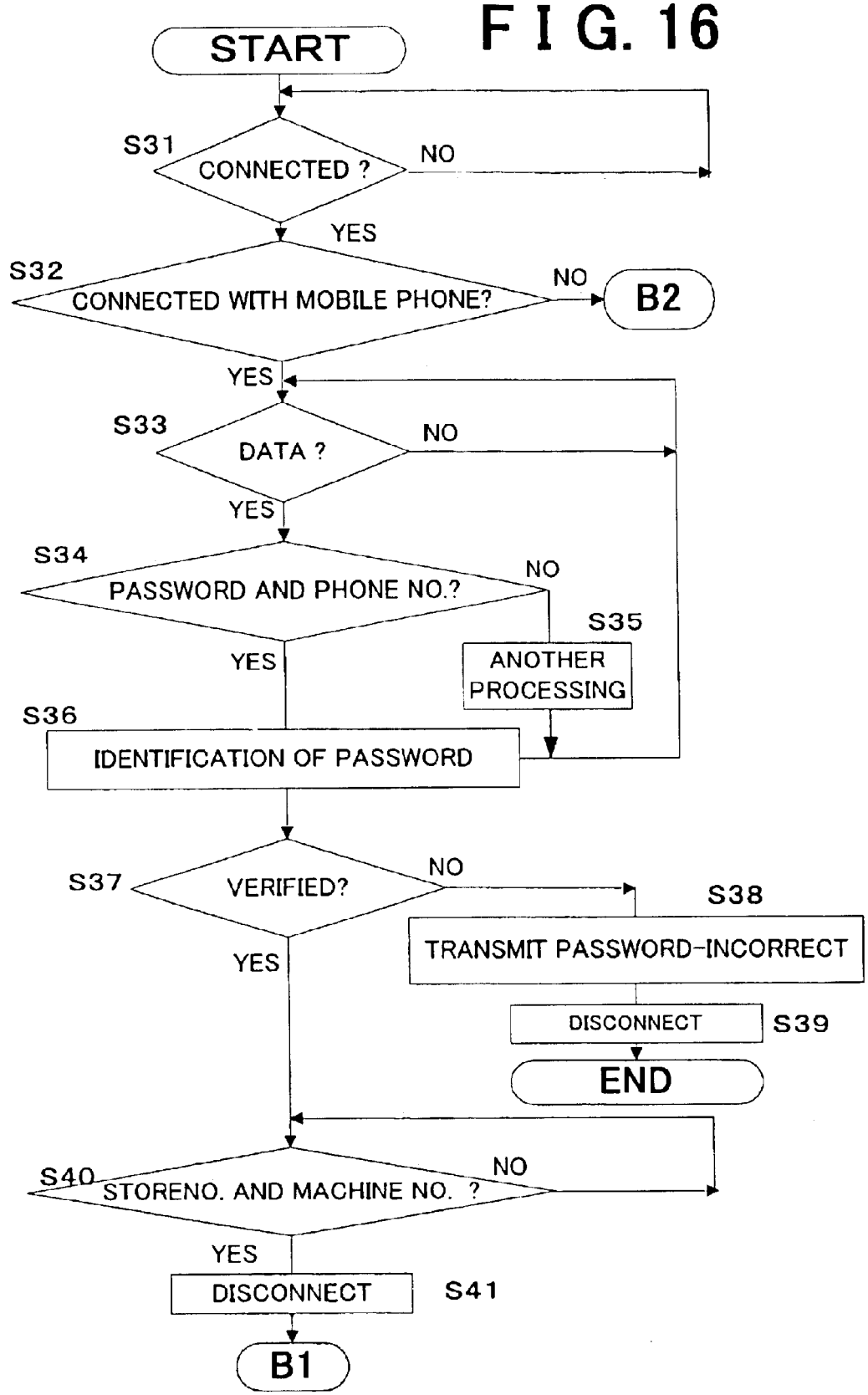
FIGS. 16, 17A and 17B are flow charts showing a controlling procedure of a laundry managing server of the techno-center 3.
Figure 17A:
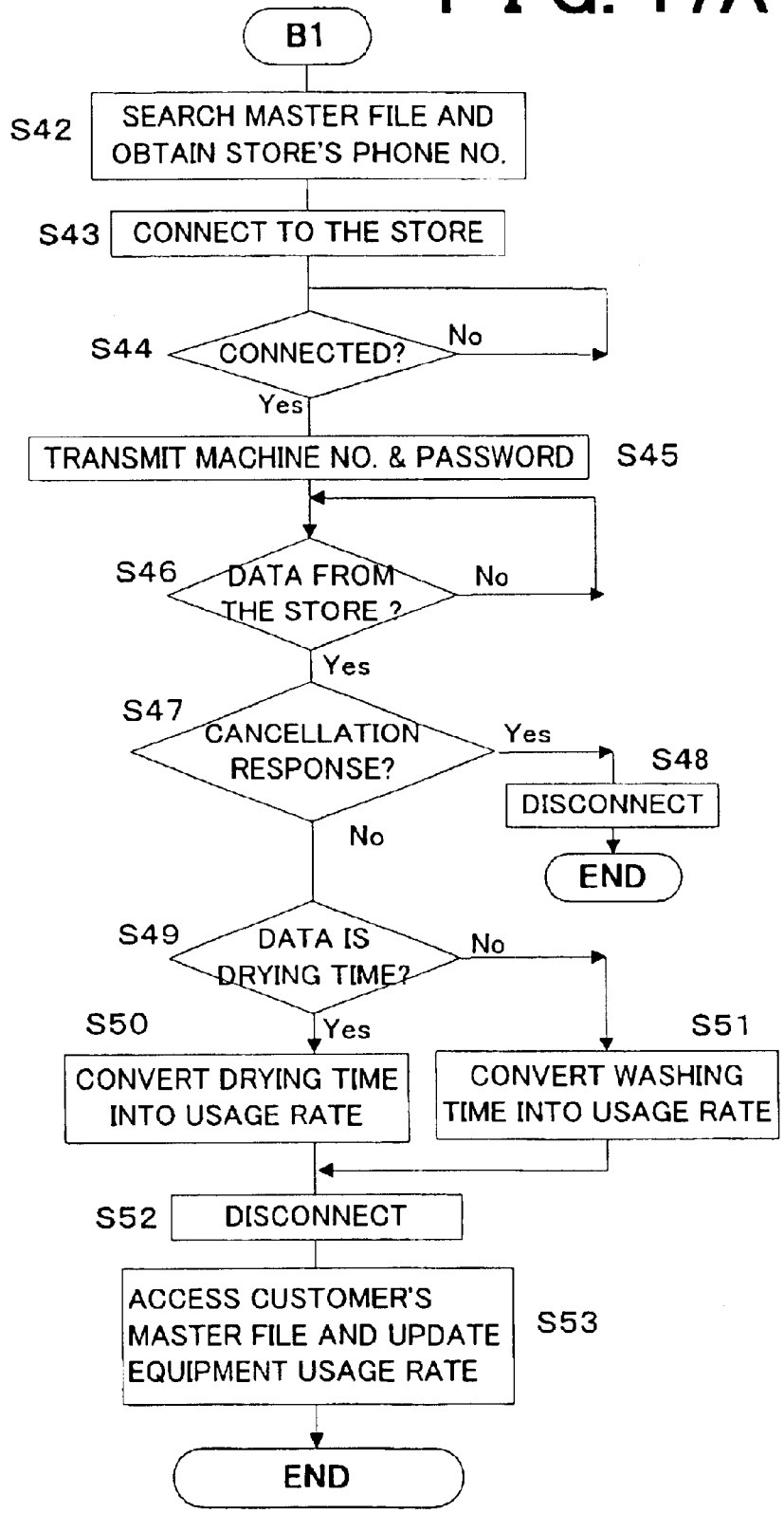
Figure 17B:
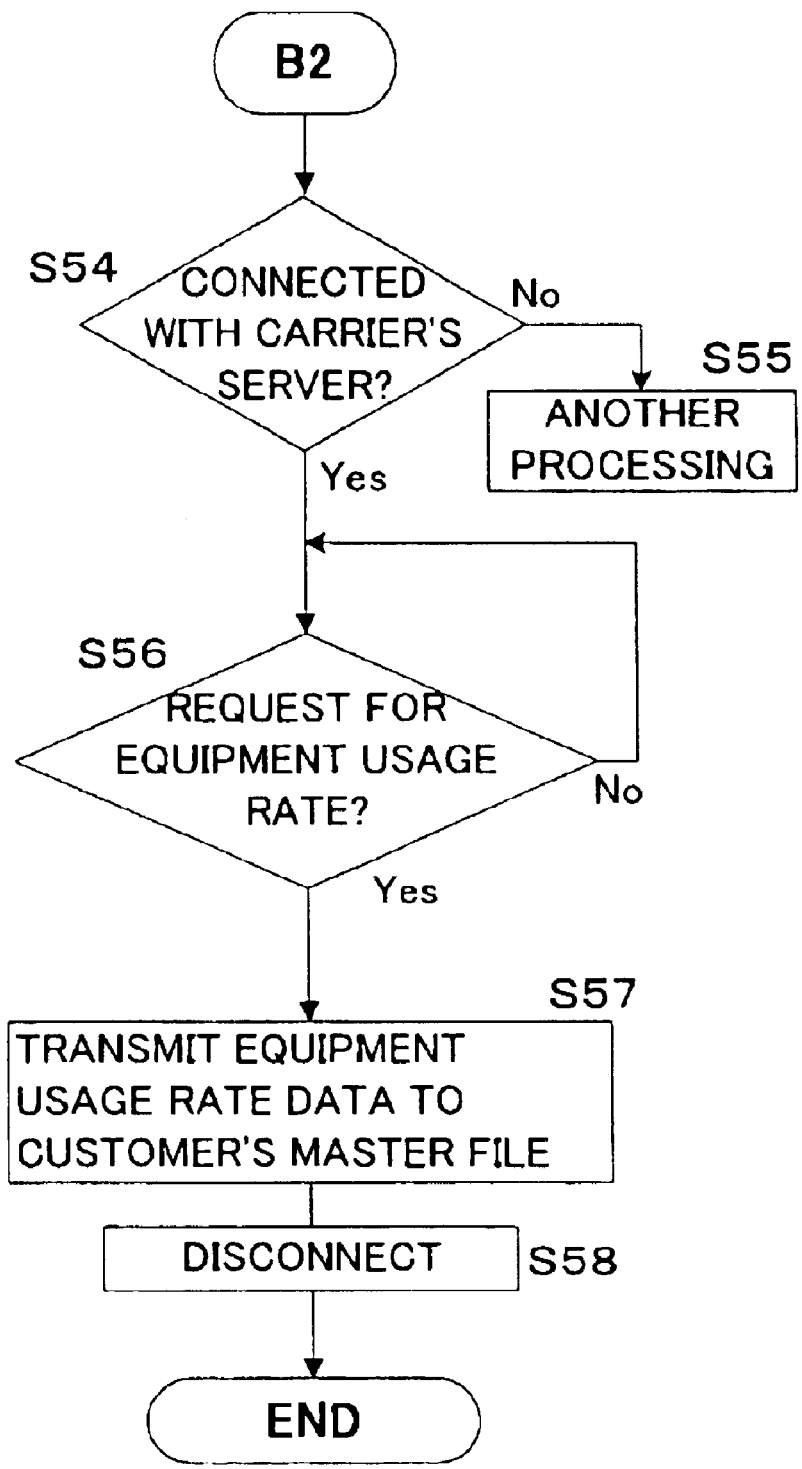

FIGS. 16, 17A and 17B are flow charts showing a controlling procedure of the laundry managing server of the techno-center 3. The server of the techno-center 3 judges whether the circuit has been connected or not (step S31), and when the circuit has been connected, it determines whether the connection has been made from the mobile phone 10 or not (step S32).

In the case of a connection from the mobile phone 10, the server waits for data transmission to complete (step S33), and then determines whether the data received are a password or a phone number (step S34). When data other than a password and a phone number are received, another processing will be carried out according to the data received (step S35).

In the case of receiving a password or a phone number, the master files of customers are explored using the phone number (customer's ID) as an index so as to compare the registered password corresponding to the customer's ID with the password that has been received (step S36). Thereafter, whether the both passwords are identical or not is determined (step S 37). When the passwords are not identical, password mismatch information is transmitted (step S38) and the circuit is disconnected (step S39).

When the password that has been received and the registered password on record are determined to be identical, the server waits until the store number and the machine number are received (step S40). Upon receipt of the store number and the machine number, the circuit is temporarily cut off (step S41).

The laundry managing server then explores the master file of stores with the store number (store ID) as an index so as to read out the phone number of the store which corresponds to the store ID (step S42). (Phone numbers, e-mail addresses and other communication data of individual stores are memorized in the master file of individual stores.) The store and the circuit are then connected by the phone number (step S43), and the server waits until the connection is established (step S44), when the machine number of the store received in the step S40 and the password that has been confirmed as identical in the step 37 are transmitted (step S45).

Subsequently, the operation part of the laundry machine selected by the customer is operated in the store. The server waits until data based on the operation are sent from the store (step S46). Upon recognition of receipt of the data from the store, whether the data received are a cancellation response or not is checked (step S47). Here, the cancellation response refers to data generated by pressing the cancellation key 25 (or 37). When the cancellation response is confirmed, the circuit will be cut off (step S48).

When the data received from the store are not a cancellation response but a time for drying (Yes at step S49), the drying time is to be converted into a dryer operation charge (step S50). When the data received is a washing time (No at step S49), the washing time is converted into a washing machine operation charge (step S51). Then the circuit is disconnected (step S52). Subsequently, the system accesses the master files of customers with the mobile phone number (customer's ID) as an index so as to add the operation charge of this time, thereby updating a column of equipment usage rate in the master files of customers (step S53).

In the step S32, when the connection is not made from a mobile phone, whether it is from the carrier's server 4 or not is determined (step S54). If it is not from the carrier's server 4, another processing according to the source of the connection will be performed (step S55).

When the connection is made from the carrier's server 4, whether there is a request for a customer's equipment usage rate or not is further checked (step S56). When there is such a request, the master files of customers are accessed so that the data of the customer's equipment usage rate are transmitted to the carrier's server 4 (step S57), and then the circuit is disconnected(step S58).

The control procedure shown in FIG. 15 to FIG. 17 is arranged such that the store number is inputted by the mobile phone 10 based on which the techno-center 3 explores the master file of stores. However, such input of the store number can be omitted by providing the mobile phone 10 with a GPS antenna housed therein for receiving signals from GPS (Global Positioning System). In such a case, the system may be arranged such that instead of the store number for input, information on the location of the mobile phone 10 based on a signal obtained by the GPS antenna is regarded as positional information of the store, thereby exploring the master file of the stores. An arrangement as this one is hereinafter discussed.

Figure 18A:
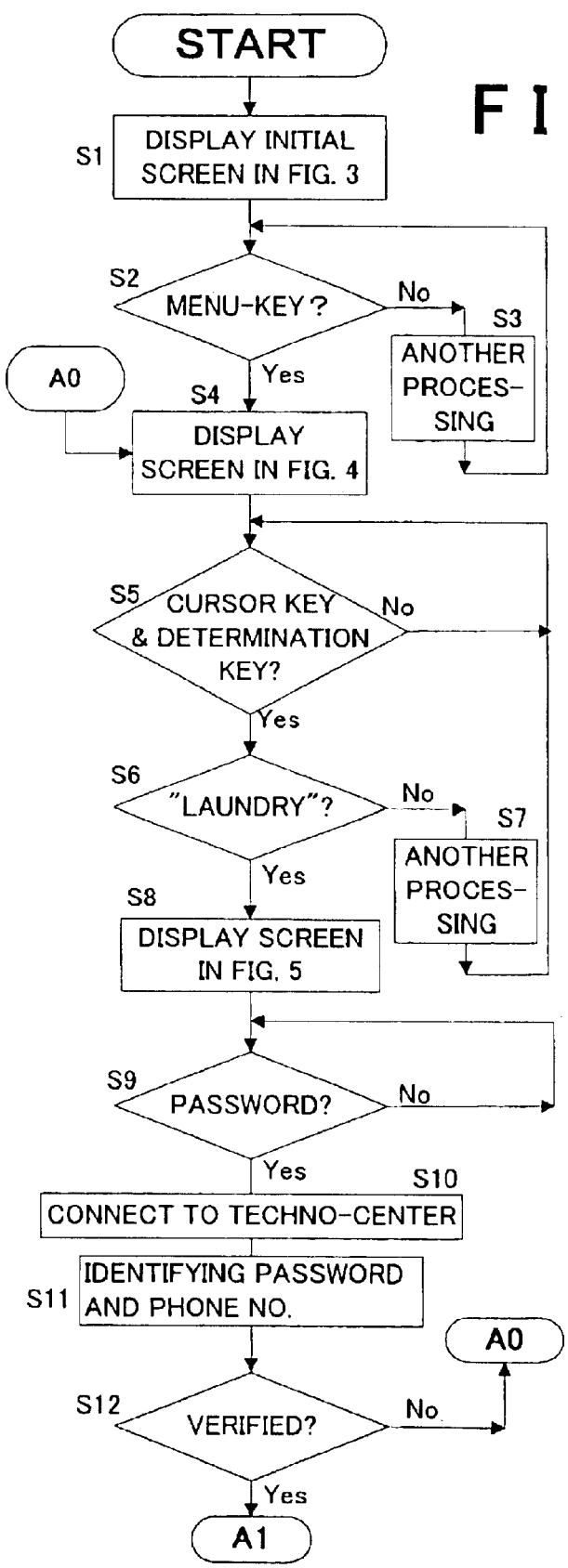
Figure 19:
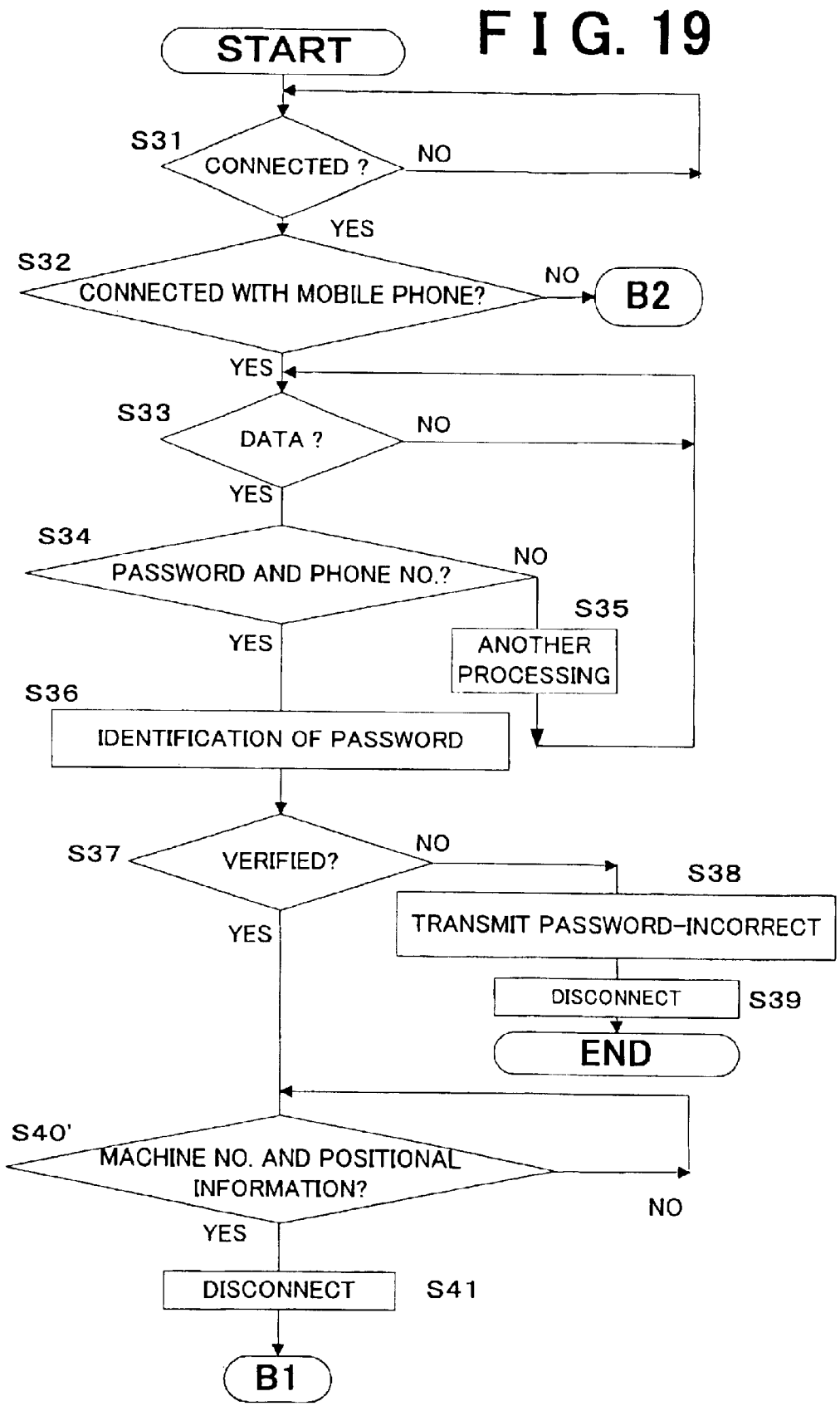
FIG. 19 is a flow chart showing another controlling procedure of the laundry managing server of the techno-center 3.

FIGS. 18–20 are flowcharts shown in contrast to FIGS. 15–17, which illustrate controlling procedures carried out in the mobile phone 10 and the techno-center 3 when a GPS antenna is housed in the mobile phone 10.

FIGS. 18A, B are flow charts showing a controlling procedure of the mobile phone 10 in which major steps are the same as those in FIG. 15. The steps identical or corresponding to those in FIG. 15 are therefore denoted by the same step numbers and explanations thereof are omitted.

The controlling procedure in FIG. 18 eliminates the steps S17 and S18, namely, the steps of displaying the page for inputting the store number and waiting for input of the store number. Immediately after determining that "1. Use the laundry" has been selected in the step S15, the mobile phone 10 displays the page (the screen in FIG. 8) for inputting the machine number (step S19).

Meanwhile, after accepting the inputted machine number, a processing for obtaining the positional information of the mobile phone 10 based on a signal from the GPS received by the GPS antenna is carried out in the step S21-2.

Then, in the step S22, the password, the mobile phone number (curstomer's ID), the machine number and the positional information obtained in the step S21-2 are transmitted to the techno-center 3.

Figure 20A:
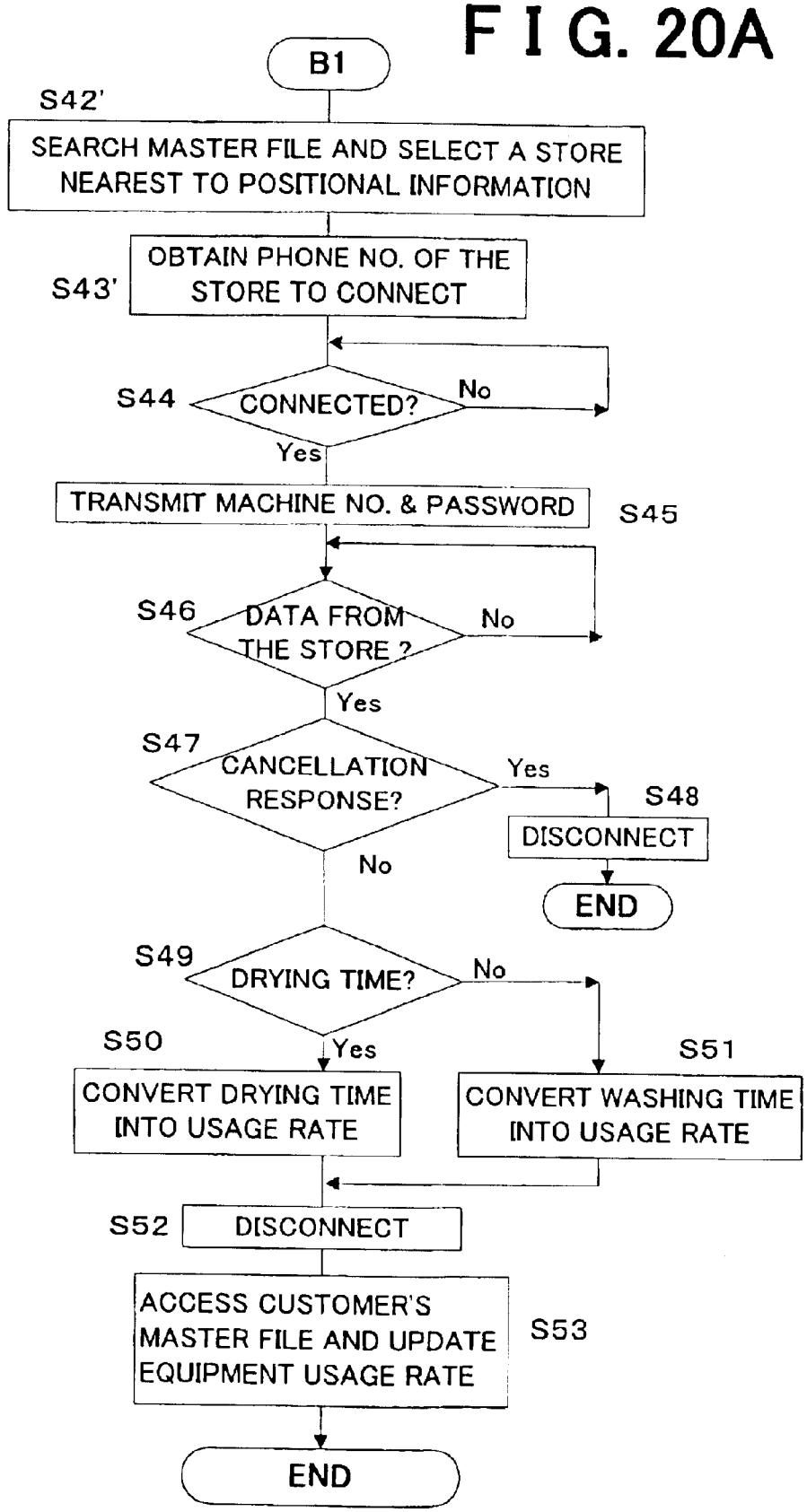
FIGS. 20A and 20B are flow charts showing another controlling procedure of the laundry managing server of the techno-center 3.
Figure 20B:
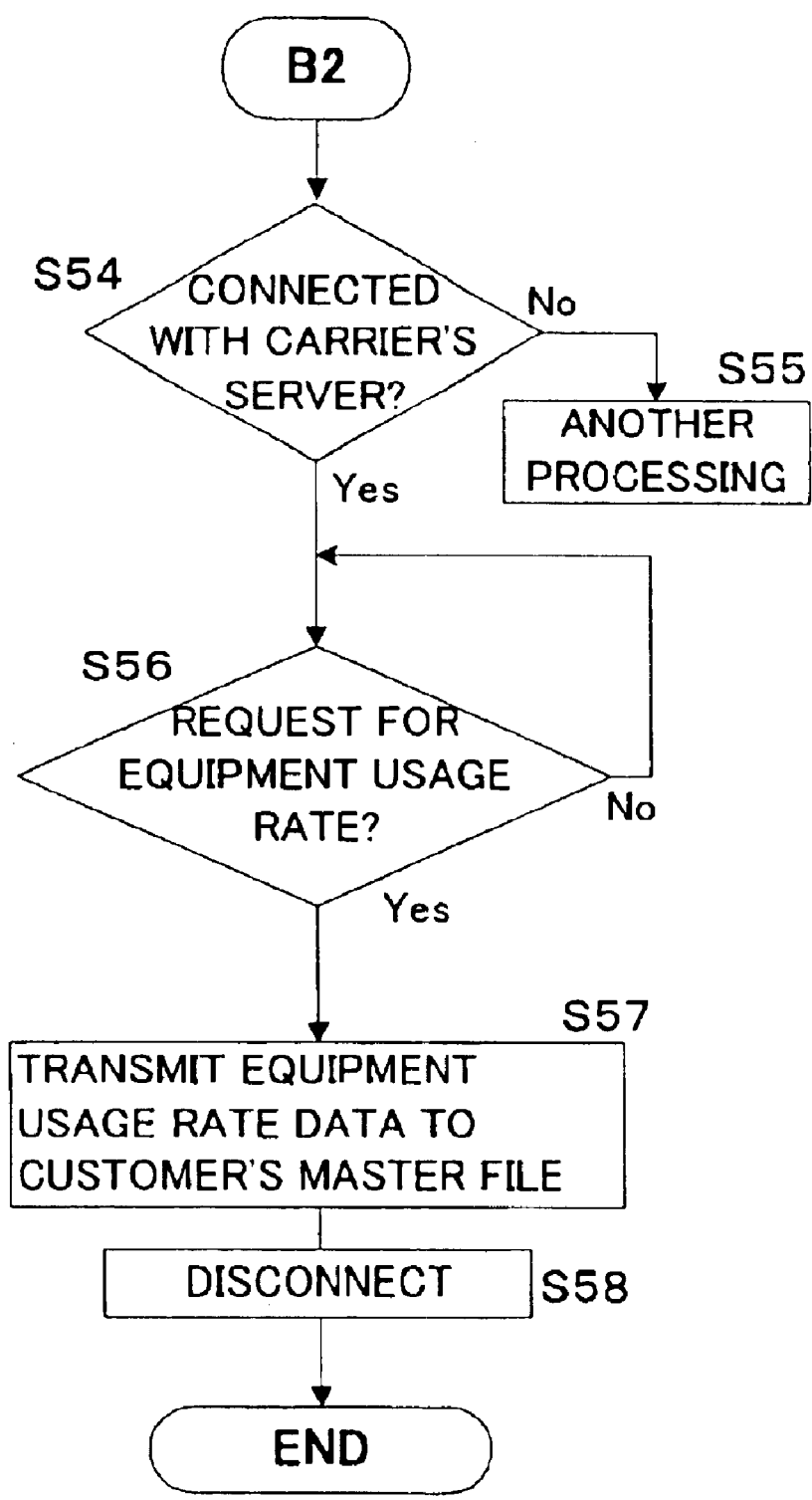

Upon receipt of the transmission above, the laundry managing server of the techno-center 3 performs the controlling procedure shown in FIGS. 19 and 20A, 20B. This controlling procedure is basically the same as the one in FIGS. 16 and 17A, 17B. Accordingly, the steps identical to those in FIGS. 16 and 17A, 17B are indicated by the same step numbers, and explanations thereof are omitted.

The laundry managing server of the techno-center 3 waits until the machine number and the positional information sent from the mobile phone 10 are received in the step S40'.

Then, the laundry managing server explores the master file of stores based on the received positional information (information on the location of the mobile phone 10) so as to determine that a store in the vicinity of the positional information is the corresponding store (step S42'). After that, the phone number of the corresponding store is read out from the master file of stores so that the circuit is connected to the corresponding store(step S43').

In order to allow the laundry managing server to control the steps S42' and S43', the master file of stores in the techno-center 3 preliminarily stores phone numbers and positional information [longitude(east longitude) and latitude(north latitude)] of individual stores listed by store number.

Accordingly, a system in which the customer does not need to input the store number on the mobile phone 10 can be accomplished by the arrangement described above.

Figure 22:
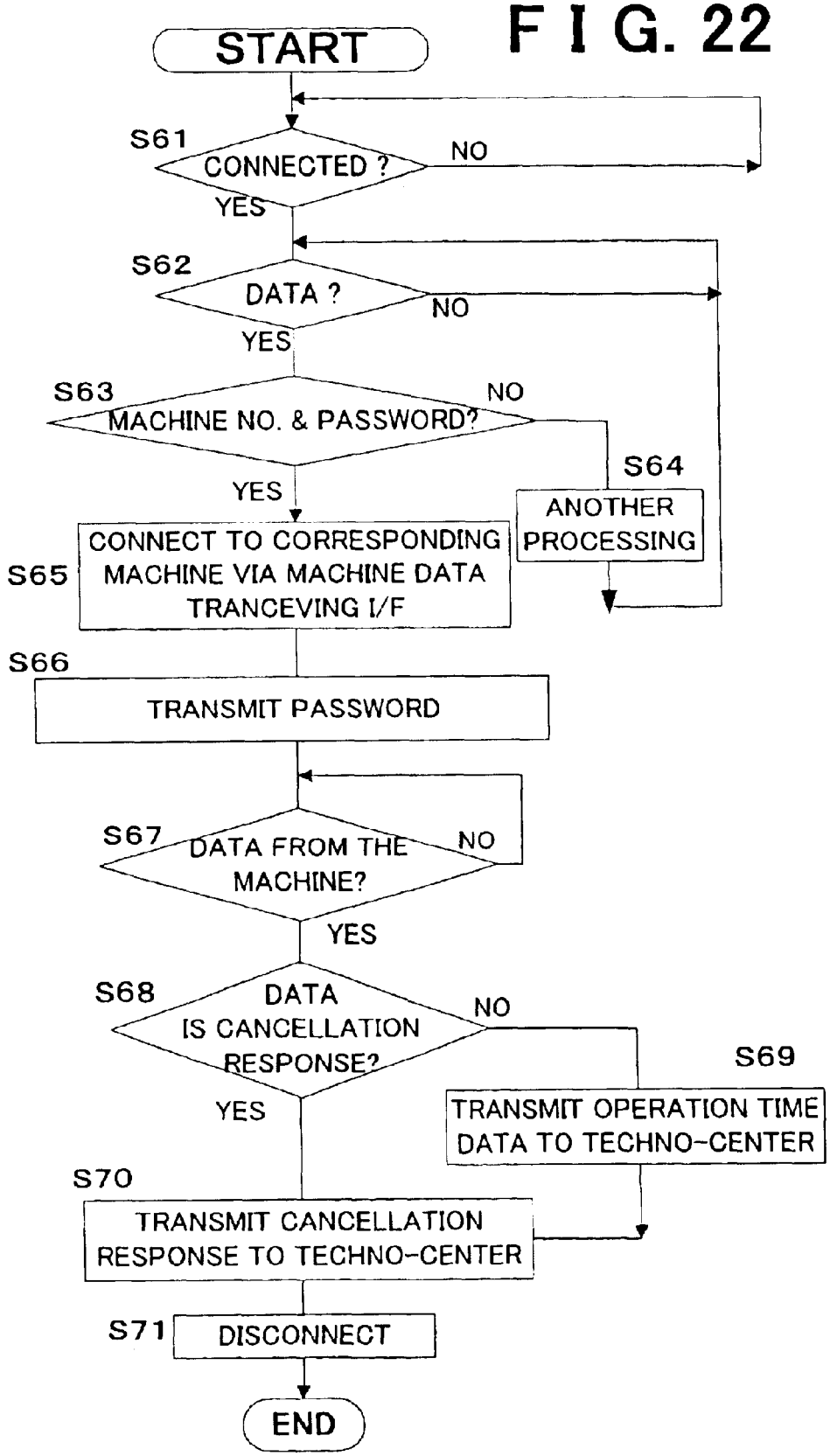
FIG. 22 is a flow chart showing a controlling procedure of the DTC (store controller.)

FIG. 22 is a flowchart showing a controlling procedure of the DTC. In the DTC, whether the circuit is connected or not is determined (step S61). After the connection is confirmed, whether data have been received or not is checked (step S62). When data have been received, whether the data are a machine number or a password is determined (step S63). When the data received are neither a machine number nor a password, another processing according to the received data will be performed (step S64).

When an machine number or a password is received as the data, by using the machine number (machine ID) as an index, the DTC is connected to the corresponding machine in the store via an interface 51 for transceiving machine data (step S65), thereby transmitting the received password to the corresponding machine (step S66).

The operation part 20 (or 30) of the machine is then operated by the customer, and whether operation data have been received via the data transceiving interface 47, the communication line 48 and the interface 51 for transceiving machine data or not is judged (step S67).

When the data are received, whether the data are a cancellation response or not is checked (step S68). If the data are not a cancellation response, the received data are transmitted as an operation time to the techno-center 3 (step S69).

On the other hand, in the case of receiving a cancellation response, the cancellation response is to be transmitted to the techno-center 3 (step S70), thus allowing the connection with the machine to be cut off (step S71).

Figure 23:
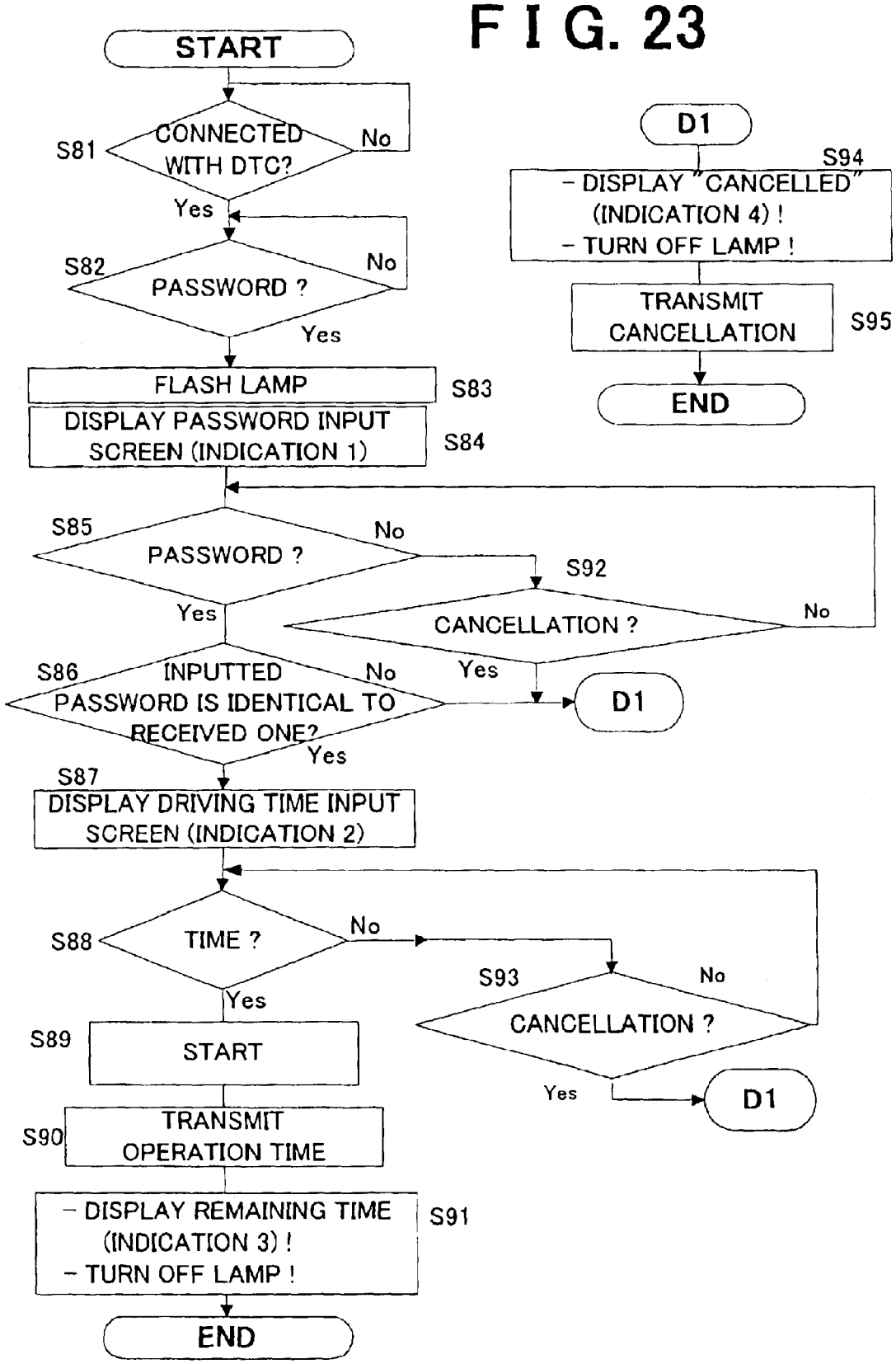
FIG. 23 is a flow chart showing a controlling procedure of the laundry machine in the store.

FIG. 23 is a flowchart showing a controlling procedure of the laundry machine in the store, for instance, a dryer. The dryer judges whether it is connected to the DTC or not (step S81), and when connected, it waits until it receives a password (step S82). Upon receipt of the password, the dryer flashes the ready-to-drive lamp 21 (step S83), simultaneously displaying the password input page (the Indication 1 in FIG. 11) on the display part 22 (step S84). In response to the indication, the customer inputs the password. The control part 41 of the dryer then determines whether the password has been inputted or not (step S85). After the password is inputted, it determines whether the inputted password corresponds to the password that has been received in the step S82 or not (step S86). When the passwords correspond, the operation time input page (the Indication 2 in FIG. 11) is displayed on the display part 22 (step S87), which is followed by the step of determining whether the operation time has been inputted or not (step S88).

Upon input of the operation time, the machine starts operating (step S89) and the operation time is transmitted to the DTC (step S90). At the same time, the time remaining for the operation is displayed on the display part 22 and the ready-to-drive lamp is turned off (step S91).

When no password input has been done by the numeric keys 26 in the step S85, and instead, the cancellation key 25 has been pressed to command cancellation (step S92), or when no operation time input has been done in step S88 while input by the cancellation key 25 has been done (step S93), the operation stop (Indication 4 in FIG. 11) is shown on the display part 32 and the ready-to-drive lamp 21 is turned off (step S94), while the cancellation response is transmitted to the DTC (step S95).

Figure 24:
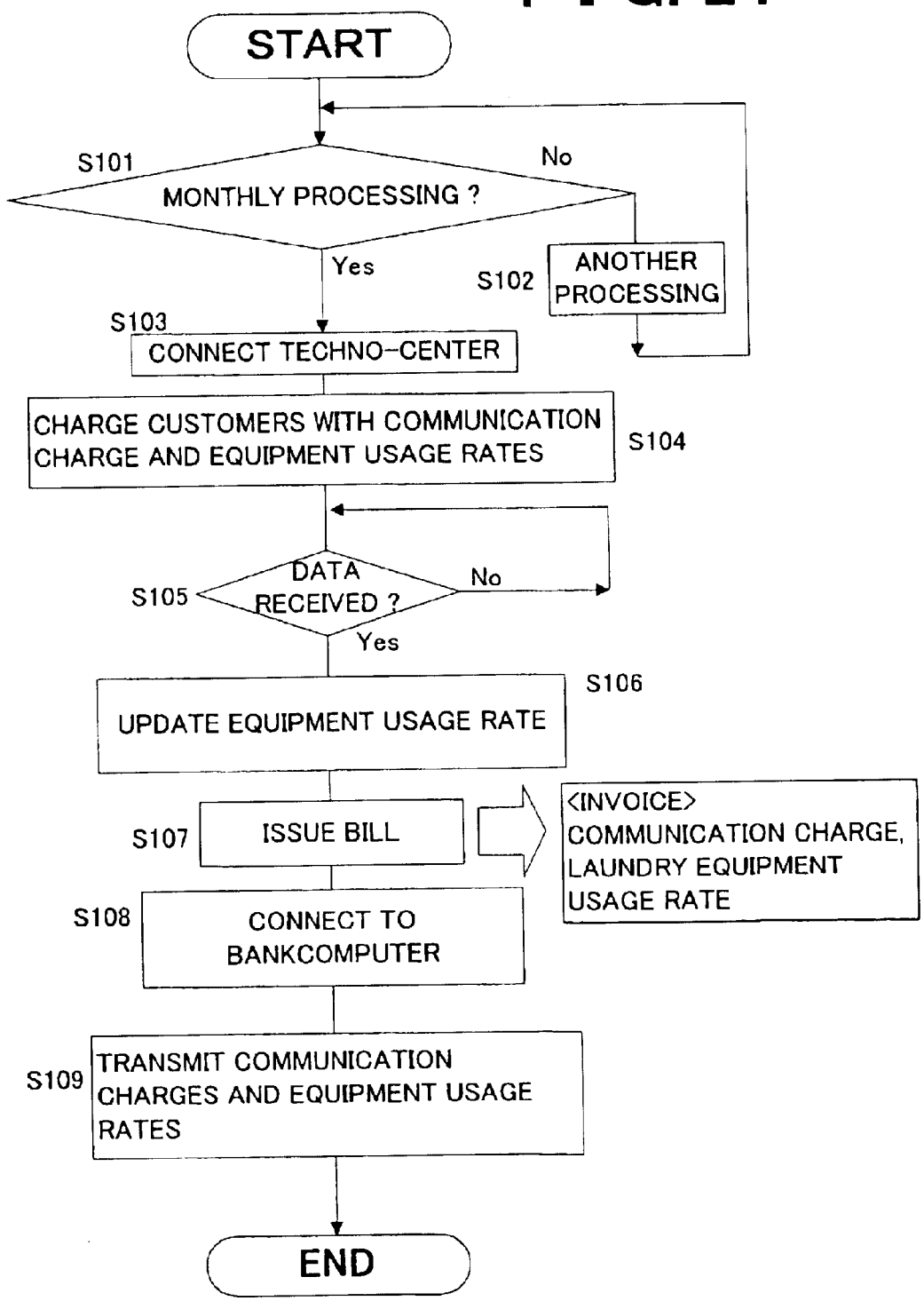
FIG. 24 is a flow chart showing a controlling procedure of the carrier server 4.

FIG. 24 is a flowchart showing a controlling procedure of the carrier's server 4. The carrier's server 4 has a program for carrying out a monthly processing, for example, on $20^{th}$ every month, in which whether the monthly processing is to be carried out or not is determined (step S101). When it is determined that the monthly processing is not to be carried out, another processing will be performed (step S102).

On $20^{th}$ of every month, when it is determined that the monthly processing is carried out, the carrier's server 4 is first connected to the techno-center 3(step S103). Then it requests customers to pay equipment usage rates, which customers being limited to those who have owed communication charges for the use of their mobile phones (step S104). It waits until it receives data that the techno-center 3 transmits in response to the request (step S105). Upon receipt of the data, the circuit is disconnected and the equipment usage rate area in the master files of customers is updated by the received data (step S106). Then bills are issued individually to the customers (step S107). The statement in the bill will be, for example, as follows: "Status of your usage from Jan. 11, 2000–Feb. 10, 2000, Communication charge: ¥2,500, Laundry equipment usage rate: ¥5,000".

Subsequently, the circuit is connected to the bank computer 5 under contract with the carrier (step S108) so that the communication charges and the equipment usage rates in the master files of customers are transmitted to the bank computer 5 (step S109).

Figure 25:
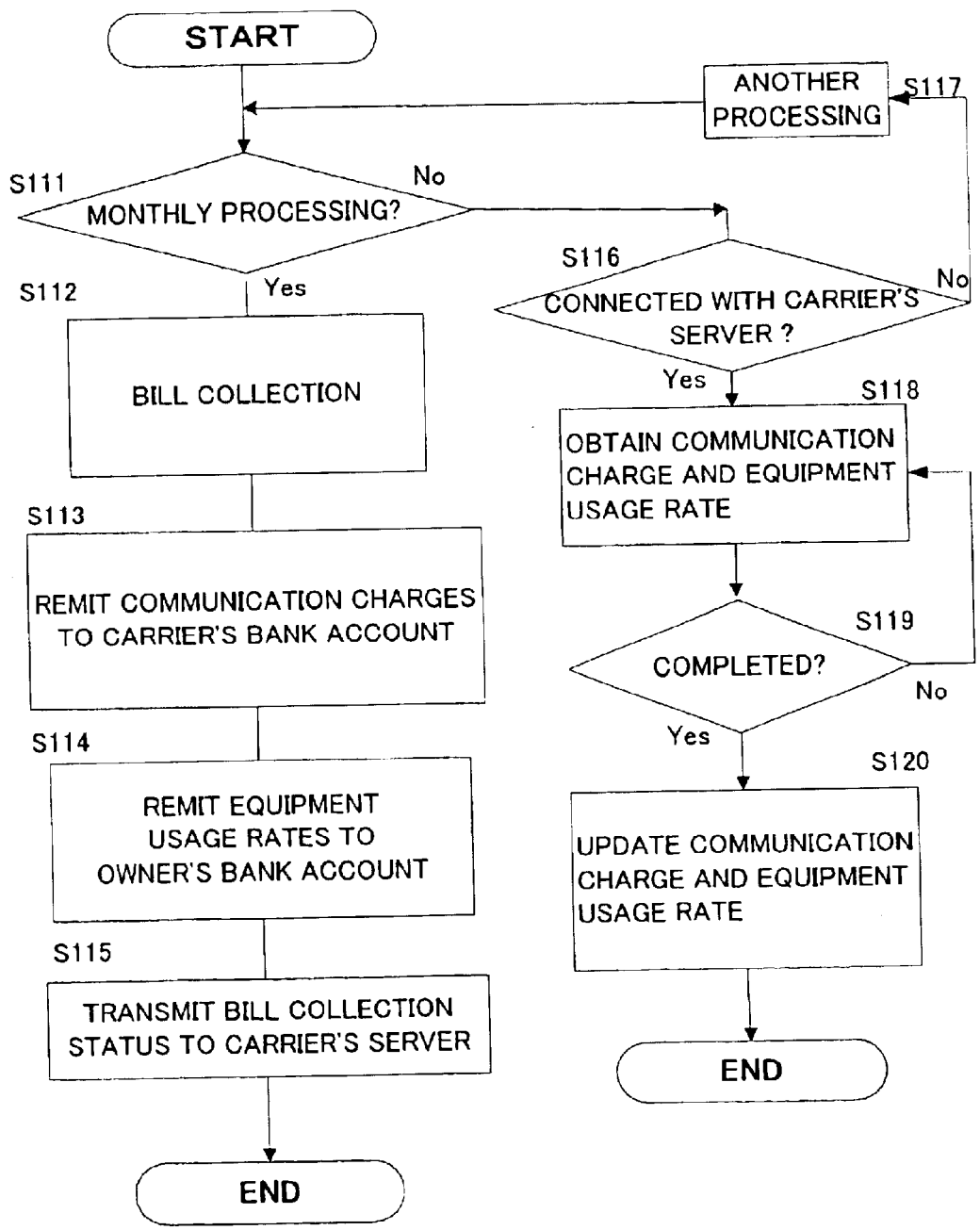
FIG. 25 is a flow chart showing a controlling procedure of the bank computer 5 under contract with the carrier.

FIG. 25 is a flowchart showing a control procedure of the bank computer 5 under contract with the carrier. The bank computer 5 has a program contained therein for carrying out a monthly processing, for instance, on $28^{th}$ of every month. Based on this program, it is determined whether the monthly processing is to be carried out or not (step S111). When the monthly processing is carried out, bills are collected (step S112). In the bill collection, the master files of customers are referred to so that the communication charge and the equipment usage rate are withdrawn from each customer's bank account.

Also, a payment is made (step S113), in which the communication charges included in the amount collected from the customers' individual bank accounts are remitted in a lump to the bank account of the carrier.

Another payment is also made (step S114), in which the equipment usage rates included in the amount collected from the customers' individual bank accounts are remitted in a lump to the bank accounts of individual owners of the laundry. Furthermore, the bill collection status of each customer is transmitted to the carrier's server 4 (step S115).

When carrying out the monthly processing is denied in the step S111, whether there is connection with the carrier's server 4 or not is judged (step S116). When no connection with the carrier's server 4 is found, another processing will be carried out (step S117).

When a connection with the carrier's server 4 is detected, the communication charges and the equipment usage rates of individual customers are obtained (step S118) followed by completion of the data acquisition (step S119). Thereafter, the communication charges and equipment usage rates of individual customers in the master files of customers are updated by the obtained data (step S120).

Figure 26:
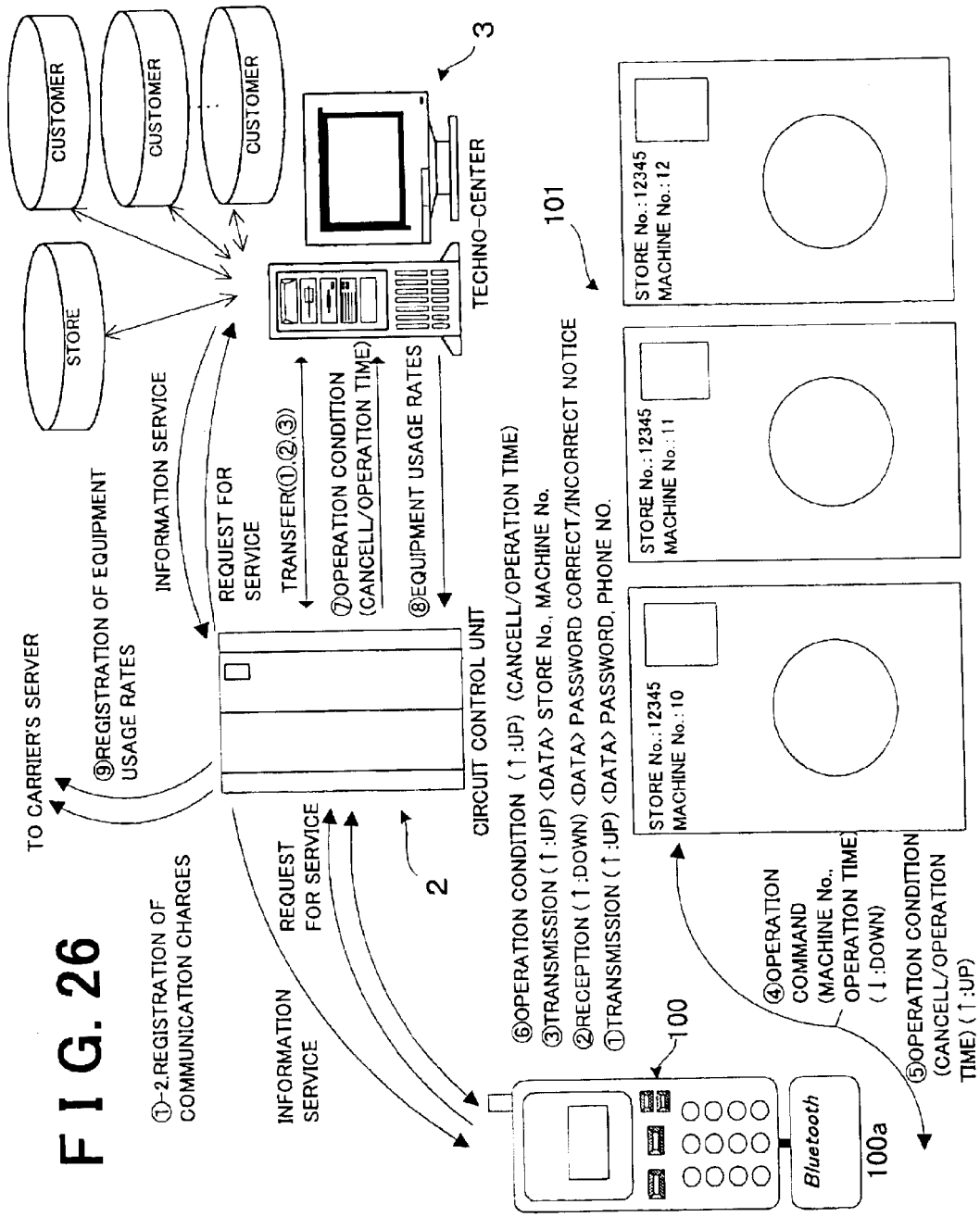
FIG. 26 is a block diagram showing a part of the structure of a laundry system according to a second embodiment of this invention.

FIG. 26 is a block diagram illustrating partially an arrangement of the laundry system according to a second embodiment of this invention. The laundry system according to this embodiment structurally differs from the laundry system described referring to FIGS. 1 and 2 as described below.

First, a laundry (store) 101 is provided with a plurality of laundry machines such as washing machines and dryers, but lacks a DTC (Store controller) to be connected to those machines.

Secondly, as the mobile phone 100, one that has a specified low-power, short-range radiocommunication unit 100*a* in addition to the normal mobile phone functions is used. A unit such as "Bluetooth™" may be used as the specified low-power, short-range radiocommunication unit 100*a*.

Other constitutional elements of this laundry system, namely, use of the circuit control unit 2, existence of the techno-center 3, utilization of the carrier's server 4 and the bank computer 5 under contract with the carrier are the same as those of the laundry system described referring to FIGS. 1 and 2.

Figure 27:
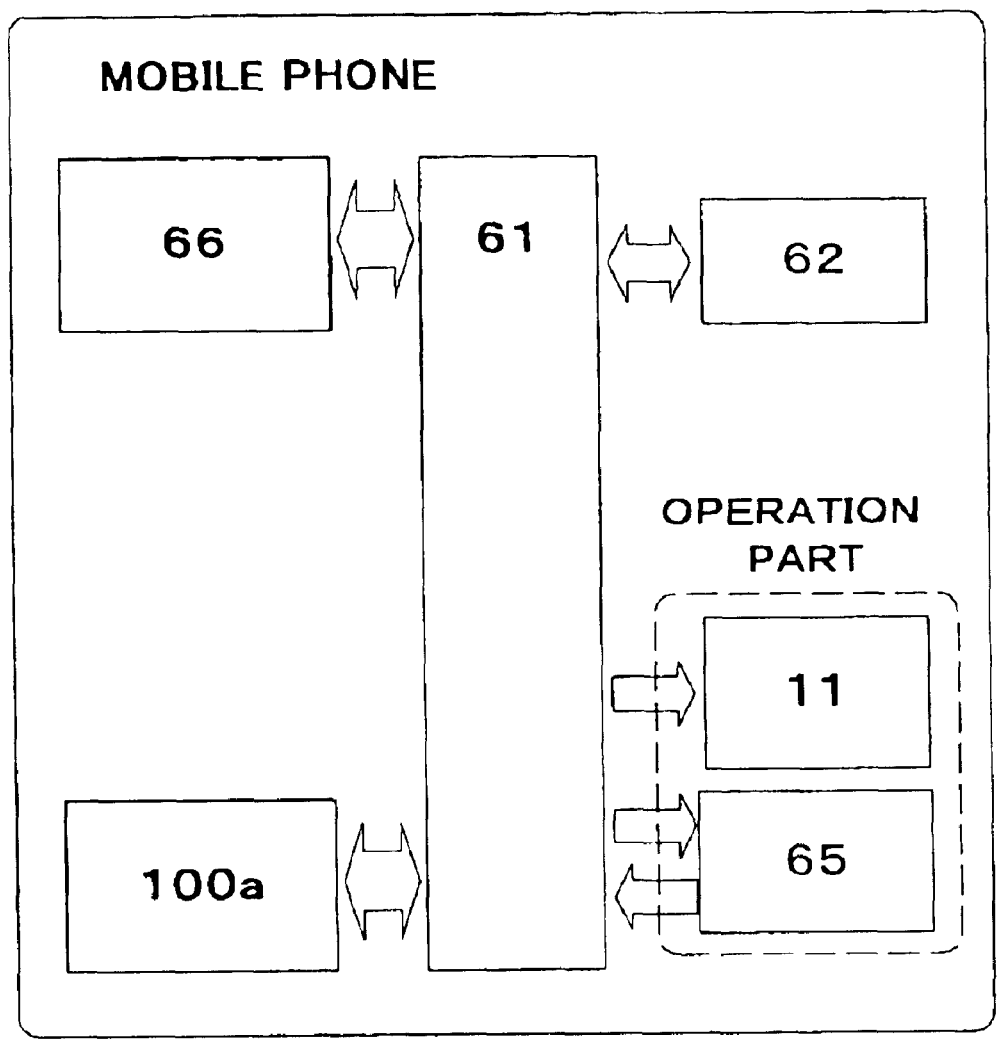
FIG. 27 is a block diagram showing a circuit arrangement of a mobile phone 100 as an example of portable communication tools used in the laundry system according to the second embodiment of this invention.

FIG. 27 is a block diagram showing a circuit arrangement of a mobile phone 100 which is an example of the wireless communication tools to be used in the laundry system according to this embodiment. The mobile phone 100 is provided with a control part 61 including a microcomputer, a memory 62 connected to the control part 61, and an operation part 63 connected to the control part 61. The operation part has an display 11 comprising a LCD or the like, and a key matrix 65. In addition, the control part 61 has a radio data transceiving interface 66 for wireless phones, as well as a radio data transceiving interface 100*a* for the use of a Bluetooth™.

FIG. 28 is a block diagram showing a circuit arrangement of the laundry machines (a washing machine and a dryer)

kept in the laundry. The fundamental circuit arrangement is the same as that in the embodiment described referring to FIG. 14, that is, each of the washing machine and the dryer is provided with a control part 41 including a microcomputer and a memory 42 connected to the control part 41. Also, various kinds of sensors 43 (or 44) for detecting the operational status of the laundry machine are included and connected to the control part 41. Furthermore, the control part 41 is connected to a load drive circuit 45 (or 46) so as to control the drive of the load drive circuit 45 (or 46).

A characteristic of this laundry machine in terms of circuit arrangement is that a radio data transceiving interface 70 for the use of a Bluetooth™ is connected to the control part 41 to which a display part 80 is also connected. The display part 80 includes a machine indicating lamp 81 and an indicator 82 comprising a 7 segment or a LCD or the like. However, this laundry machine does not include operation switches or the like for operating the laundry machine.

Figure 29:
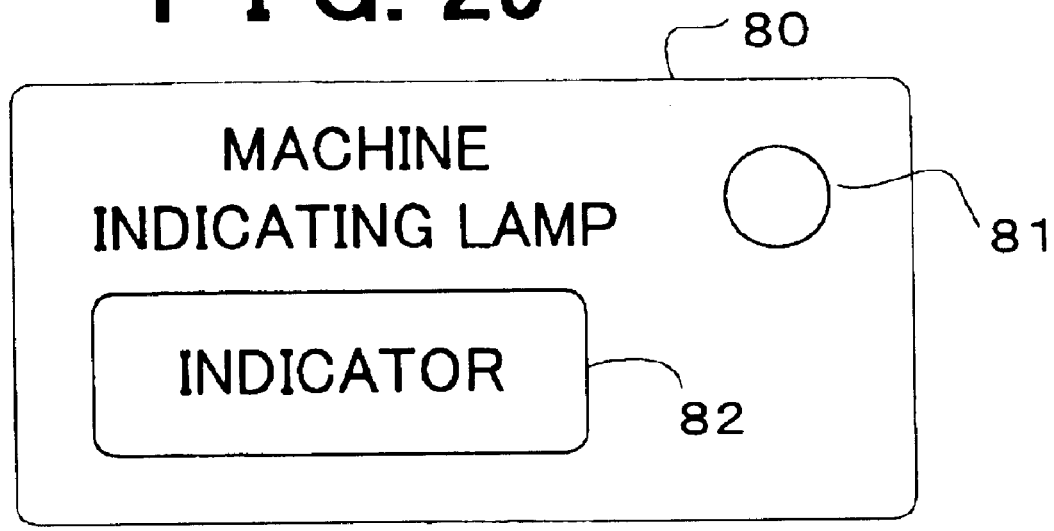
FIG. 29 is an exemplified exterior view of a display part 80 of the laundry machine shown in elevation.

FIG. 29 illustrates an exterior front view of the display part 80 of the above laundry machine. The display part 80 has the machine indicating lamp 81 and the indicator 82 so as to display necessary indications.

An operational procedure for customers of the laundry system according to this embodiment will be hereinafter described.

Figure 30:
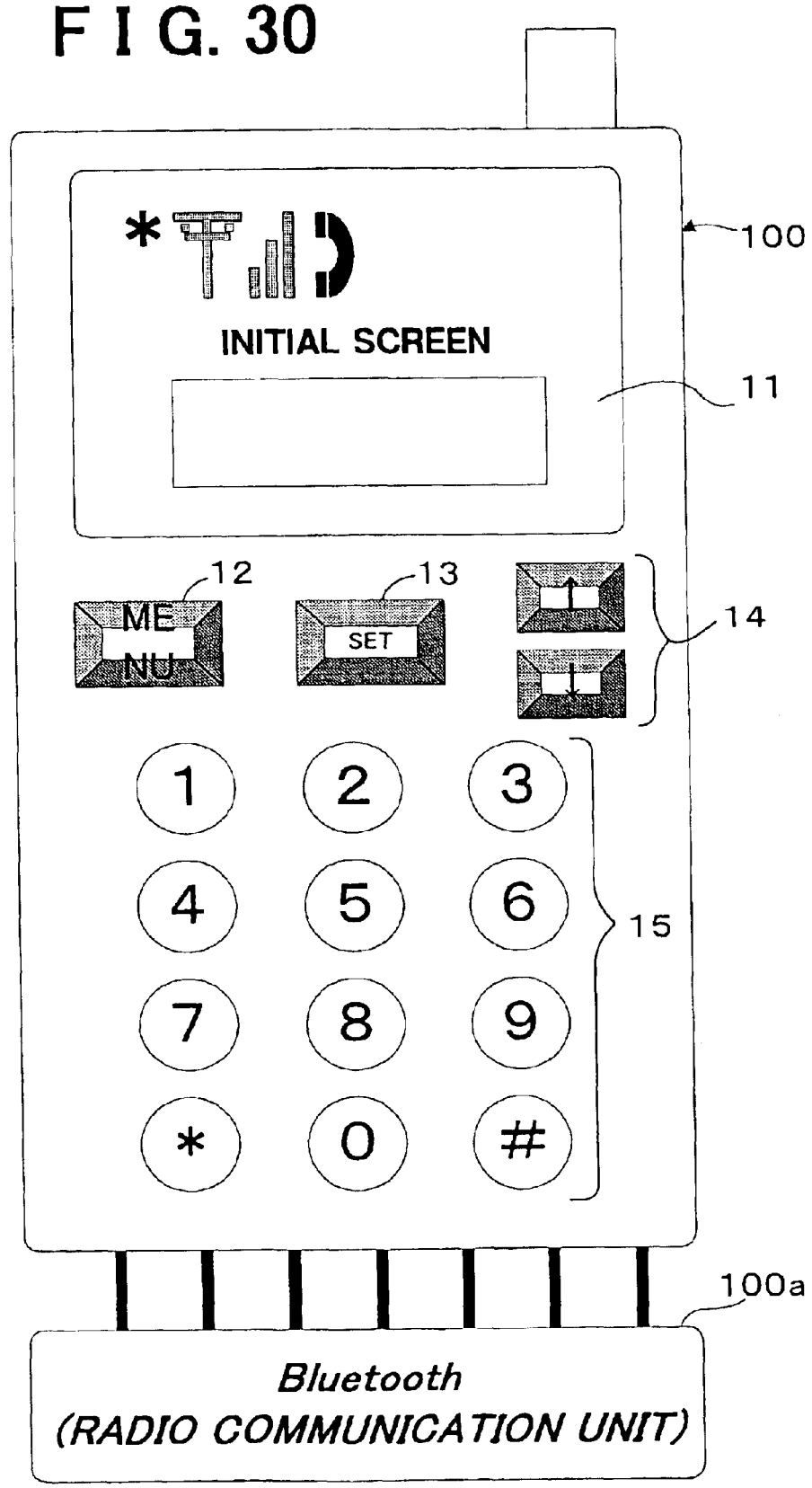
FIG. 30 is an elevational view of the mobile phone 100.

The customer can use the laundry machines by the mobile phone 100 shown in FIG. 30 owned by the customer. The mobile phone is provided with a display 11, a menu key 12, a determination key 13, cursor keys 14 and numeric keys 15. In addition, a Bluetooth™ (low-power, short-range radio-communication unit) 100a is coupled with the phone by a connector such as RS232C or the like. It is of course possible for the mobile phone 100 to have a built-in low-power, short-range radiocommunication unit 100a.

When the customer operates the menu key 12 while the display 11 of the mobile phone 100 shows an initial screen as in FIG. 30, the screen on the display 11 turns into a mobile menu page. The mobile menu page is the same as that mentioned in FIG. 4. The customer selects "Laundry" in this mobile menu page so as to bring the laundry mobile menu page on the display, and then inputs a password. The customer then selects "Use the laundry" followed by input of a laundry store number. Since these operations are exactly the same as the operations described referring to FIGS. 4–7, further explanation is omitted here.

Figure 31:
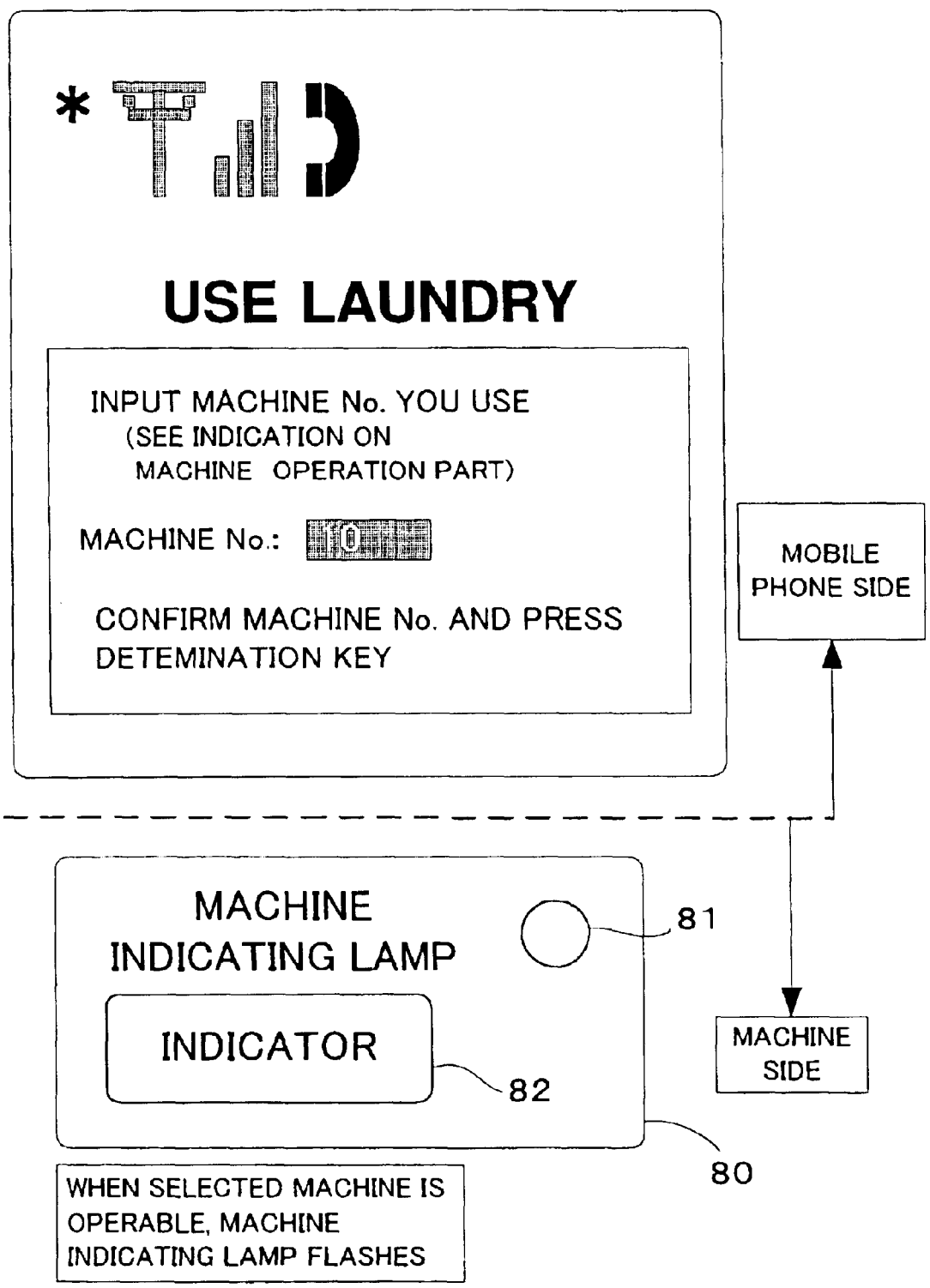
FIG. 31 illustrates one example of a screen on the display screen of the mobile phone 100 in relation to the display part of the laundry machine.

After the store number is inputted and the determination key is pressed, the display screen turns to show a page in FIG. 31 for inputting a laundry machine number that the customer intends to use.

Each of the laundry machines in the laundry is given an individual number. The customer then inputs the number of a laundry machine that the customer wishes to use. For instance, when the customer wants to use a dryer, the customer is to input the machine number "10" of the dyer by the numeric keys 15. Pressing the determination key 13 brings the next page on the display.

When the laundry machine number mentioned above is inputted by using the mobile phone 100, the machine indicating lamp 81 in the display part 80 of the laundry machine starts flashing when it is ready to drive. The flashing of the machine indicating lamp 81 notifies the customer that the machine selected by the customer has become ready to drive.

Figure 32:
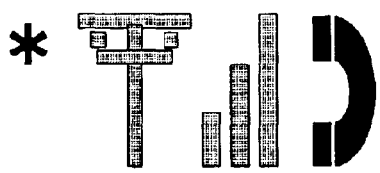
FIG. 32 illustrates one example of another screen on the display screen of the mobile phone 100 in relation to the display part of the laundry machine.

Subsequently, a page shown in FIG. 32 is displayed on the display 11 of the mobile phone 100, when the customer is to input an operation time, for instance, "123 minutes" by the numeric keys 15. Pressing the determination key 13 starts the selected laundry machine to operate.

Meanwhile, in the display part 80 of the selected laundry machine, the operation time inputted by the mobile phone 100 is indicated as "Drying time: 123 minutes" on the indicator 82. Upon initiation of the operation, the machine indicating lamp 81 is turned off, and the drying time indicated on the indicator 82 decreases as the drying operation proceeds, thereby showing the remaining time.

Figure 33:
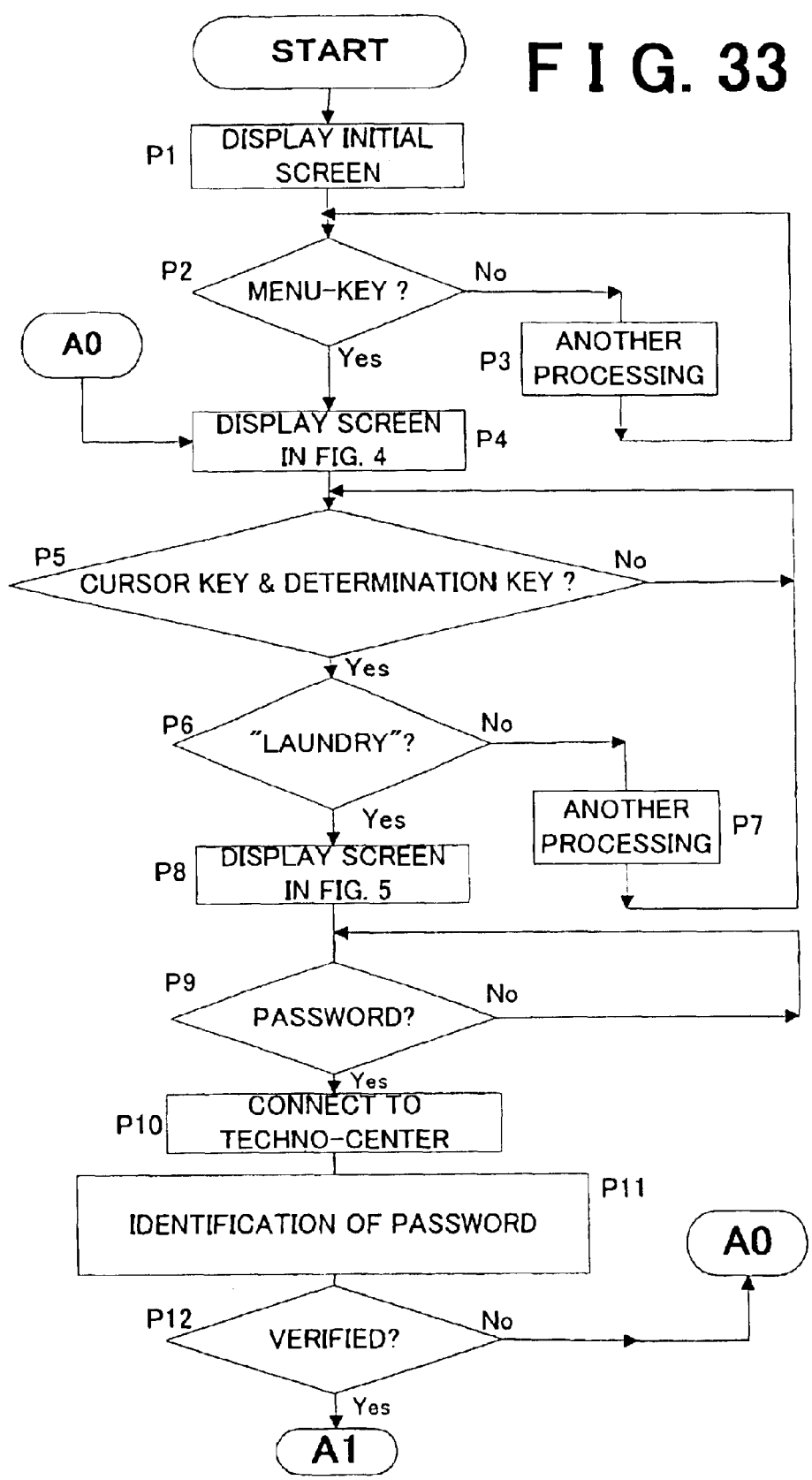
FIGS. 33, 34A and 34B are flow charts showing a controlling procedure of the mobile phone 100.
Figure 34A:
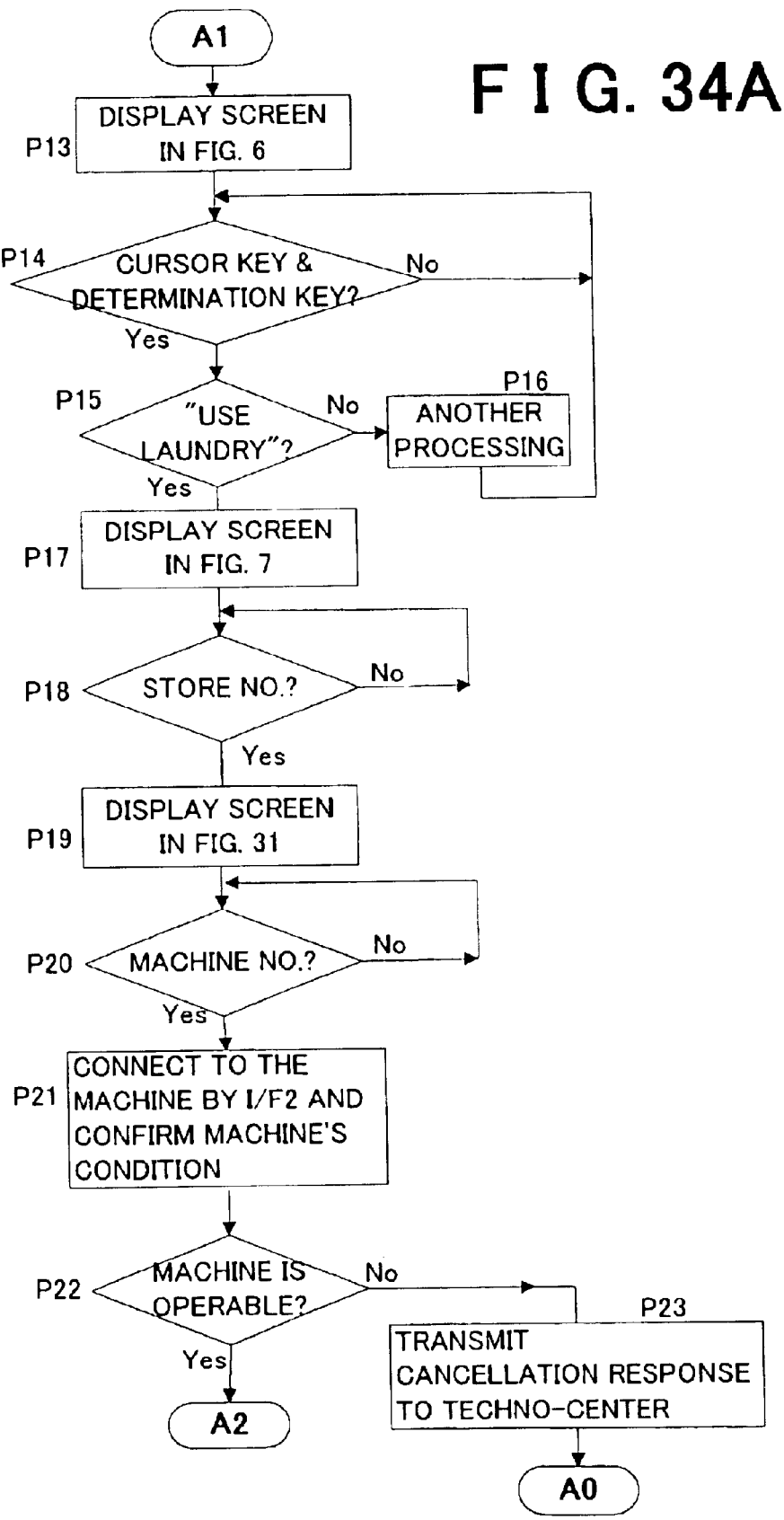
Figure 34B:
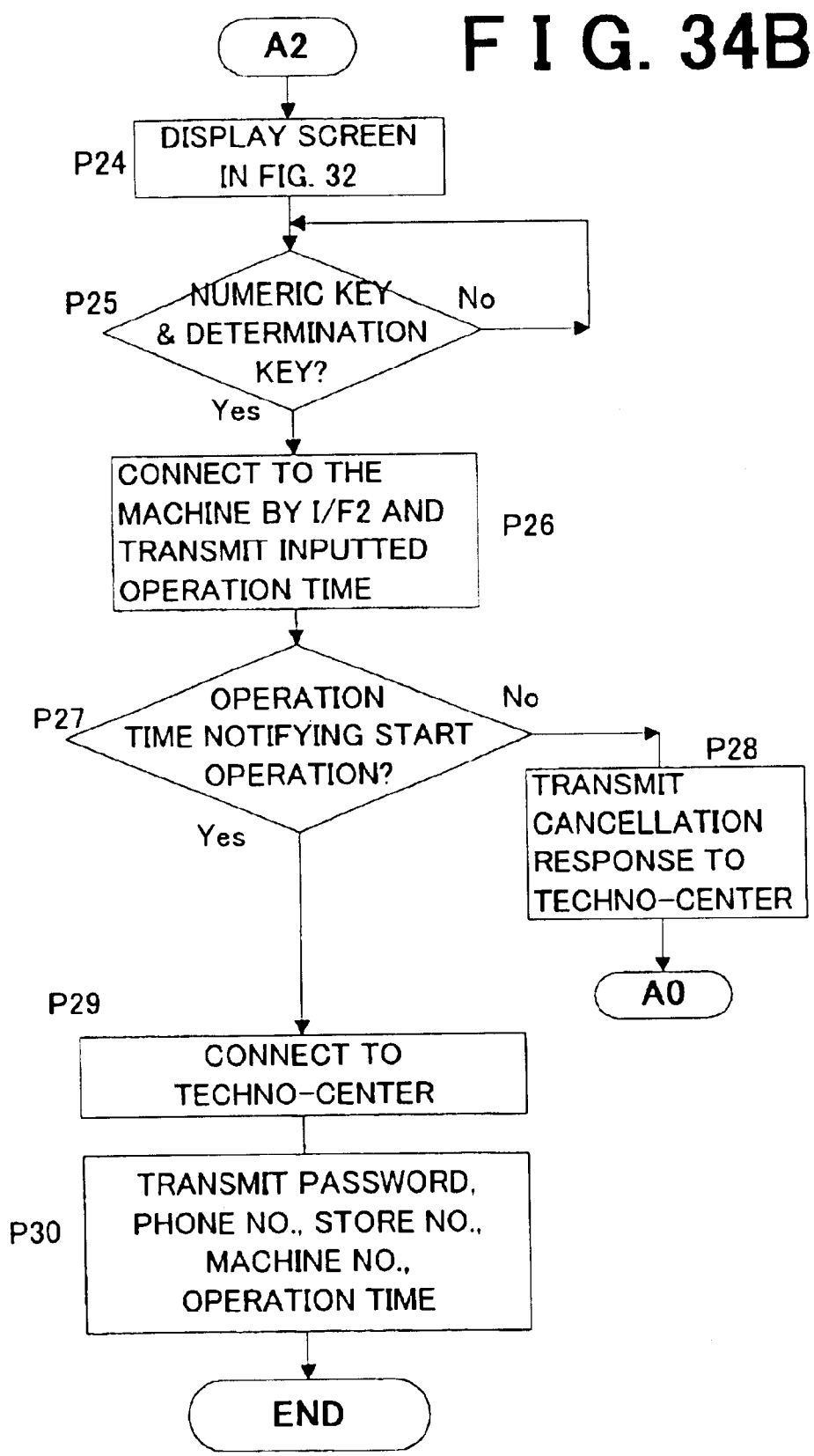

FIGS. 33 and 34A, 34B are flowcharts showing a controlling procedure of the mobile phone 100. First, the initial screen shown in FIG. 30 is displayed on the display 11 (step P1), and whether the menu key 12 is pressed or not is judged (step P2). When a key other than the menu key 12 is pressed, a processing according to the input on the key is to be performed (step P3).

With the menu key having been pressed, the display 11 displays the page of "mobile menu" in FIG. 4 (step P4). Then the phone waits for a menu selection by the cursor keys 14 and input of the determination key 13 (step P5). After the input of the determination key 13, whether "5. Laundry" in the menu has been selected or not is judged (step P6). When another menu has been selected, a processing according to the selected menu is to be carried out (step P7).

When "5. Laundry" is selected, the display 11 turns to show "Laundry mobile menu" (step P8), then the program waits until a password is inputted (step P9).

With the password having been inputted, the mobile phone is connected to the techno-center 3 via the circuit control unit 2 by the interface 66 (step P10) so that the password and the number of the mobile phone 100 (customer's ID) are transmitted to the techno-center 3 by means of, for example, packet communication. As has been already discussed above, the techno-center 3 judges the validity of the password by referring to the password and the mobile phone number (customer's ID), and responds to the mobile phone 100 (step P11).

When the mobile phone 100 finds the data received from the techno-center 3 meaning that the password is incorrect (No at step P11), it changes the screen on the display 11 to that in FIG. 4, which means the procedure returns to the step P4.

When the password is judged to be correct in the step P12, the screen on the display 11 turns into the screen in FIG. 6 (step P13). Then, the program waits until a menu is selected by the cursor keys 14 and the determination key 13 is pressed (step P14).

With the determination key having been pressed, whether "1. Use the laundry " has been selected or not is judged (step P15). When another menu has been selected, a processing according to the menu selected will be carried out (step P16).

When "1. Use the laundry" has been selected, the display 11 turns to show the "Use the laundry" page in FIG. 7 (step P17), and then the phone 100 waits until a laundry store number is inputted (step P18).

After the store number is inputted, the display 11 turns to show the page in FIG. 31 (step P19), when the phone 100 waits until a machine number is inputted (step P20).

After the machine number is inputted, the control part 61 carries out a wireless connection to the machine corresponding to the inputted machine number by the radio data transceiving interface 100a for Bluetooth™ so as to inquire if the machine is ready to drive or not (step P21). The control part 61 determines whether the machine is ready to drive or not according to the response from the machine corresponding to the machine number (step P22). When the machine is not ready to drive, the mobile phone 100 is connected to the techno-center 3 by the interface for wireless phones 66 so as to transmit a cancellation response (step P23). Then, the procedure returns to the step P4.

When the corresponding machine is possible to drive, the display 11 shows the page in FIG. 32 (step P24). An operation time is then inputted by the numeric keys 15, and then the phone waits until the determination key 13 is pressed (step P25). Subsequently, by the radio data transceiving interface 100a for Bluetooth™, the mobile phone 100 is wireless-connected to the corresponding machine so as to transmit the inputted operation time (step P26).

Thereafter, the phone 100 judges whether the operation time notifying the start of the operation is received from the wirelessly connected machine or not (step P27). When the operation time is not received from the machine while a signal indicating that the machine is impossible to drive is received, the mobile phone 100 is connected by the radio data transceiving interface 66 for wireless phones with the techno-center 3 through the circuit control unit 2 so as to transmit a cancellation response to the techno-center 3 (step P28). Then, the procedure returns to the step P4.

Meanwhile, in the case of receiving the operation time, the mobile phone 100 is likewise connected to the techno-center 3 (step P29) so that the password inputted this time, the mobile phone number (customer's ID), the store number, the machine number and the operation time that has been received are transmitted to the techno-center 3 (step P30).

Figure 35:
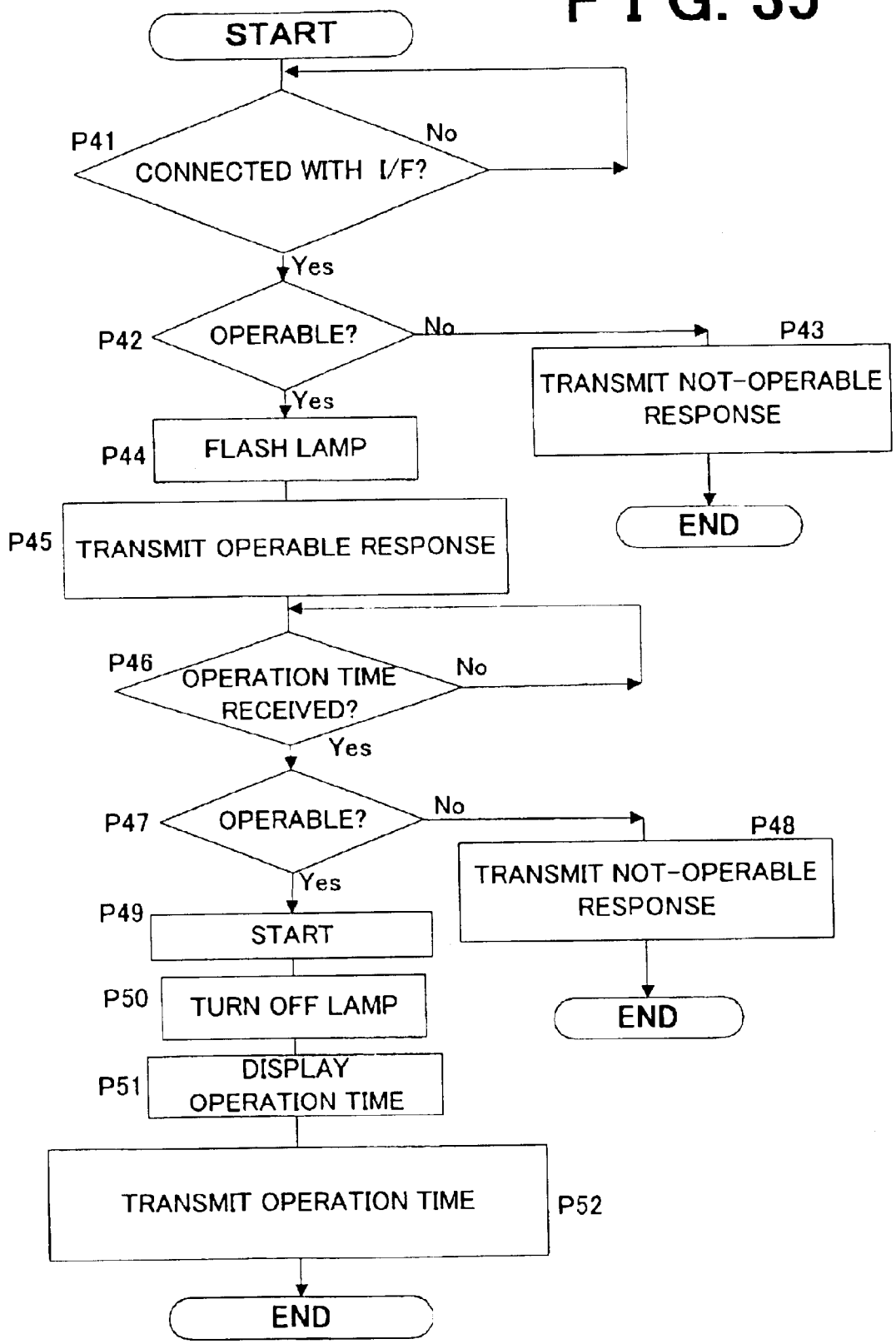
FIG. 35 is a flow chart showing a controlling procedure of a dryer as the laundry machine.

FIG. 35 is a flowchart showing a controlling procedure of a laundry machine, for example, a dryer.

In the dryer, the program judges whether a connection by the radio data transceiving interface 70 for the use of Bluetooth™ is present or not (step P41). When the connection is present, whether the machine is possible to drive or not is determined (step P42). When the machine cannot be driven for some reason such as that it is already in operation, an unable-to-drive response is transmitted to the mobile phone 100 (step P43).

On the other hand, when the machine is ready to drive, the machine indicating lamp 81 provided in the display part 80 of the machine starts flashing (step P44), and a ready-to-drive response is transmitted to the mobile phone 100 (step P45). After that, the dryer waits until an operation time is received from the mobile phone 100 (step P46), and then judges whether the operation time is within a range permitting the operation of the machine (step P47). In cases where the operation time is extremely long, for example, as long as "900 minutes," it judges that the operation is impossible, and transmits the unable-to-drive response to the mobile phone 100 (step P41).

When the machine is ready to drive, it is started to operate (step P49), while the machine indicating lamp is turned off (step P50) and the operation time is displayed on the indicator 82 (step P51). Additionally, the operation time is transmitted to the mobile phone 100 so as to notify the customer of the initiation of the operation (step P52).

Meanwhile, the numeric value of the time indicated on the indicator 82 decreases as the operation time elapses so as to indicate the remaining time.

As described so far, in the laundry system according to this embodiment, the operation of each machine in the laundry 101 is carried out by utilizing a specified low-power, short-range radiocommunication unit such as a Bluetooth™ provided in the mobile phone 100, and the operational information is transmitted from the mobile phone 100 to the techno-center 3 through the circuit control unit 2.

Incidentally, data transmission/receiving between the techno-center 3 and the carrier's server 4 as well as between the carrier's server 4 and the bank computer 5 under contract with the carrier are carried out similarly to those in the laundry system according to the embodiment that has been described previously.

The laundry system according to the second embodiment of this invention can also be arranged such that the input of the store number is omitted. Such an arrangement is made possible by having a built-in GPS antenna in the mobile phone 100 as in the laundry system according to the first embodiment. Furthermore, in this laundry system according to the second embodiment, the mobile phone 100 is equipped with the low-power, short-range radiocommunication unit 100a. This enables the system to automatically obtain the store number based on the communication between the radiocommunication unit 100a and each of the machines in the store.

To explain more specifically, the system is arranged in such a manner that each machine in the laundry 101 is given the store number being registered. Here, the mobile phone 100 is arranged such that it inquires the store number registered to the machine immediately before acquiring the information on whether the machine can be driven or not by the low-power, short-range radiocommunication unit 100a so that it can obtain the store number automatically.

In this case, since the reach of radio waves of the low-power, short-range radiocommunication unit 100a is limited within the range from several meters to several tens of meters, the mobile phone 100 can automatically obtain the store number in the above-mentioned manner under a circumstance where the distance between laundries (stores) is 100 m or more. That is, since information of the store itself is not transmitted far away, it is only receivable within the store.

Figure 36A:
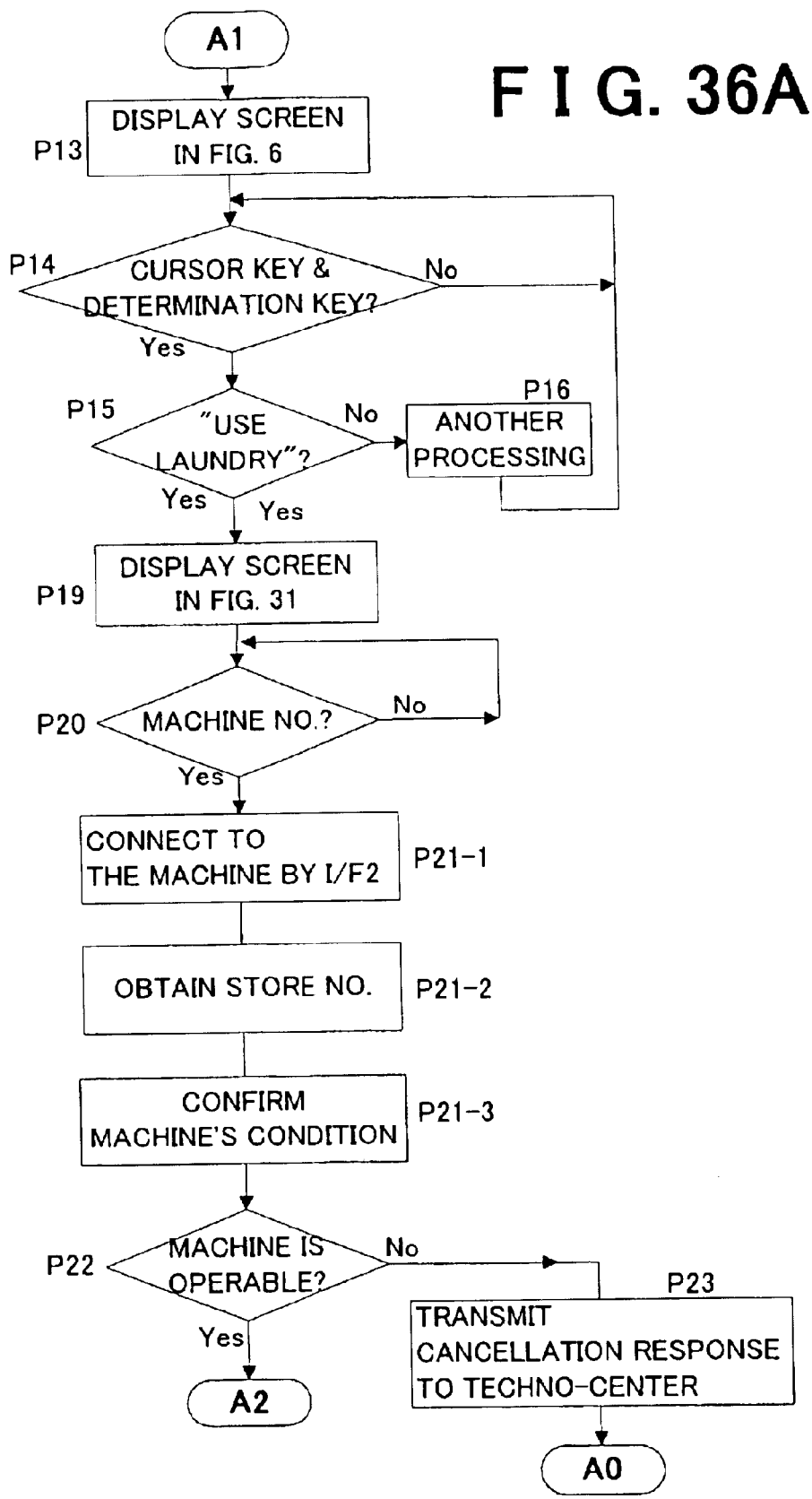
FIGS. 36A and 36B are flow charts showing another controlling procedure of the mobile phone 100.
Figure 36B:
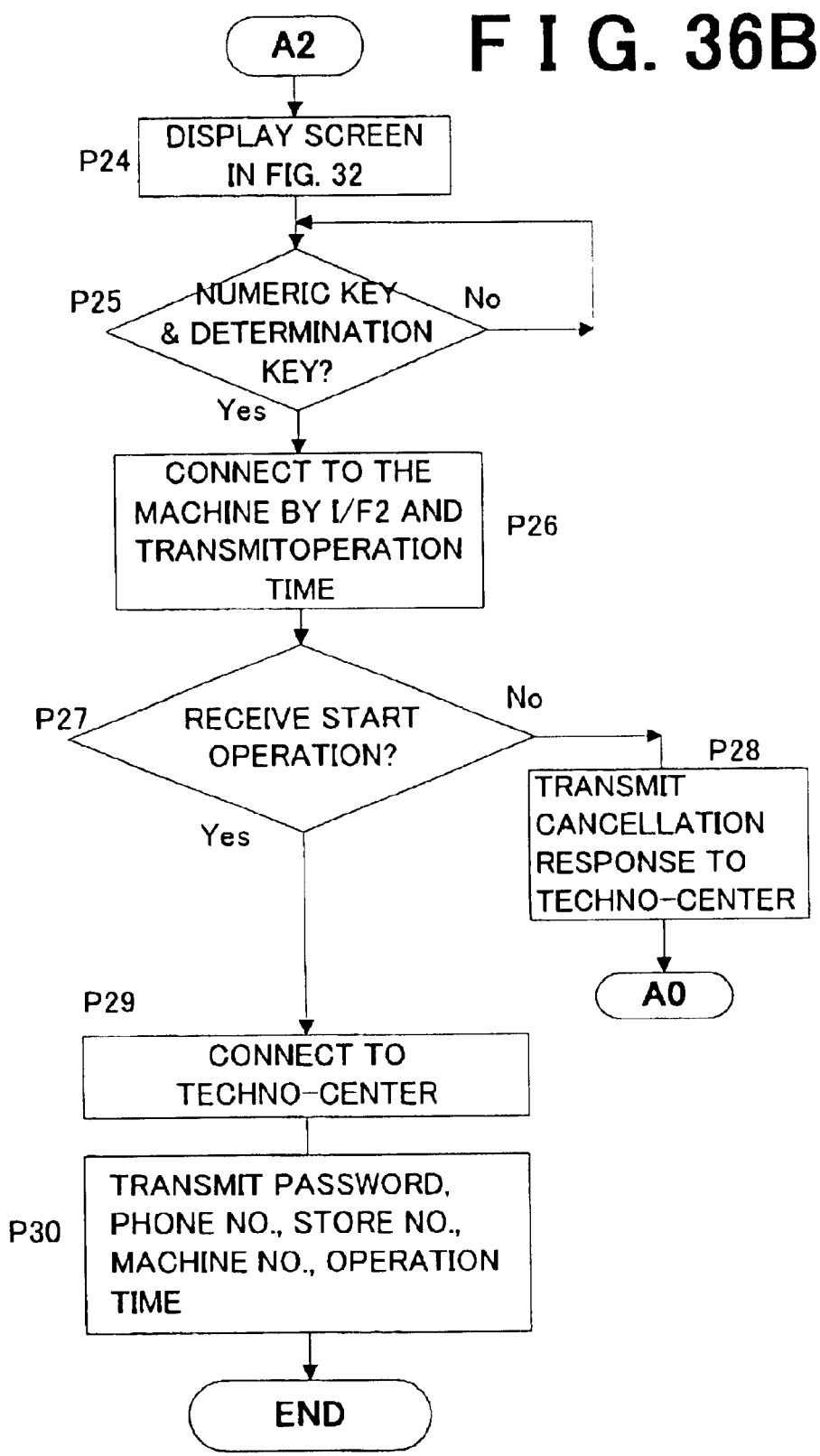
Figure 37:
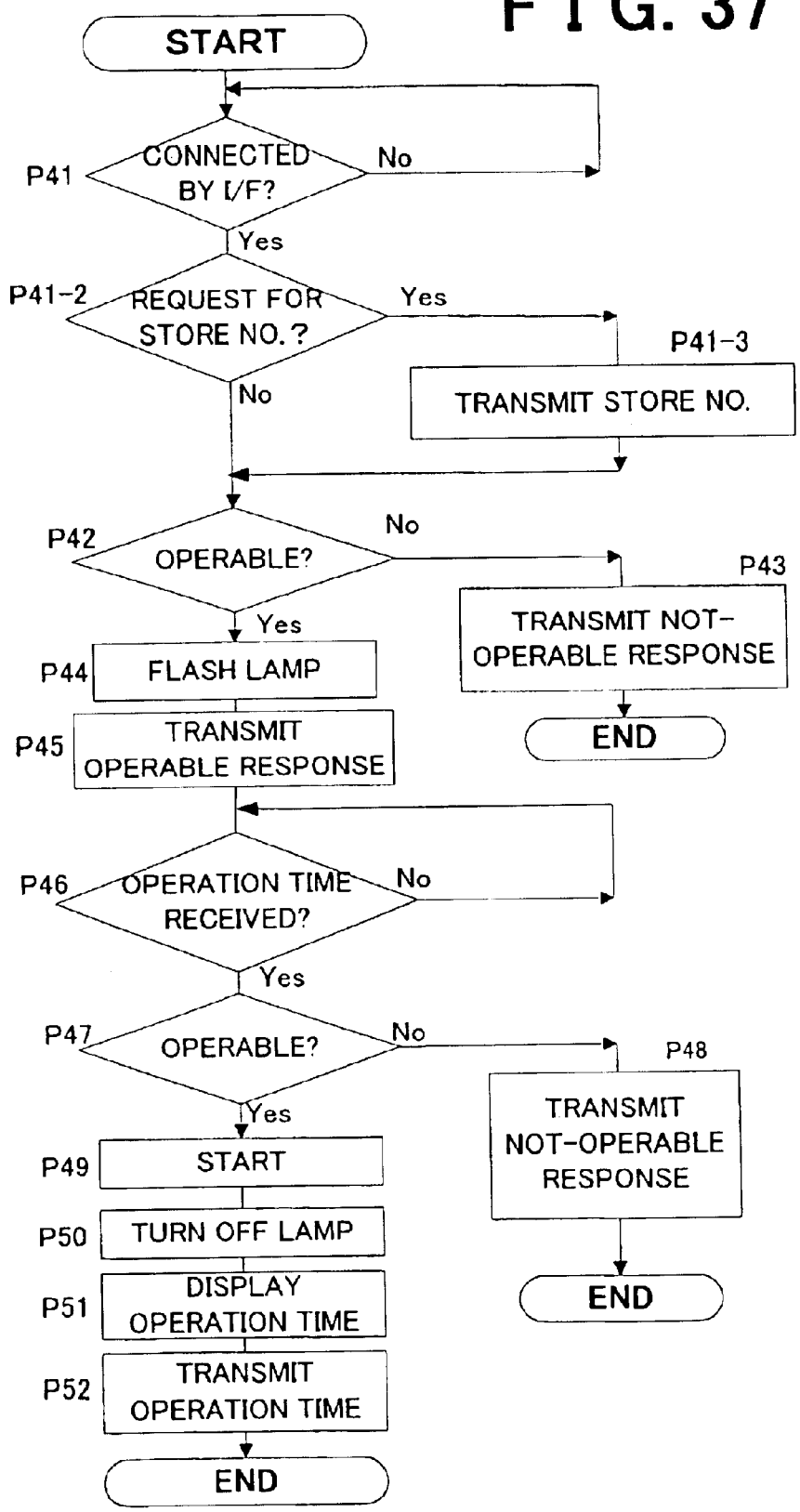
FIG. 37 is a flow chart showing another controlling procedure of the dryer as the laundry machine.

The system arranged as above is now more specifically described with respect to the flowcharts in FIGS. 36A, 36B and 37.

The flowchart in FIGS. 36A and 36B shows a part of the controlling procedure of the mobile phone 100. Since the basic procedure is the same as that in FIGS. 34A and 34B, corresponding steps are denoted by the same step numbers. Before the step P13 in FIG. 36A, the steps P1–P12 in FIG. 33 are to be carried out.

The controlling procedure in FIG. 36 is characterized in that when "1. Use the laundry" is selected in the step P15, the procedure advances directly to the step P19 for displaying the page in FIG. 31 without carrying out the steps P17 and P18, which means that the input of the store number is omitted.

Meanwhile, after the step P20, steps S21-1, S21-2, and P21-3 are carried out. In these steps, the mobile phone 100 is wireless-connected by the low-power, short-range radiocommunication unit 100a for Bluetooth™ with a machine corresponding to inputted machine number (step P21-1). Then, it obtains a store number (step P21-2) from the machine, and subsequently, inquires the machine whether the machine can be driven or not (step P21-3).

The store number is therefore obtained from the machine connected to the mobile phone 100.

The flowchart in FIG. 37 shows a controlling procedure of a laundry machine in a manner corresponding to the flowchart in FIG. 35, in which it differs from the flowchart in FIG. 35 in that it includes a processing for transmitting a store number to the mobile phone 100. Steps identical with those in FIG. 35 are denoted by the same step numbers.

In the procedure in FIG. 37, for example, a dryer determines whether there is a connection brought by the radio data transceiving interface 70 for Bluetooth™ or not (step P41). When it detects the connection, it judges whether the connection is for a request for the store number or not (step P41-2). When it detects the request, it transmits the store number that has been preliminarily registered to the mobile phone 100 by the radio data transceiving interface 70 (step P41-3).

Steps thereafter are the same as those shown in the flowchart in FIG. 35.

According to the above arrangement, it is possible for a mobile phone without having a built-in GPS antenna to automatically obtain a store number by utilizing the low-power, short-range radiocommunication unit 100a.

Figure 38:
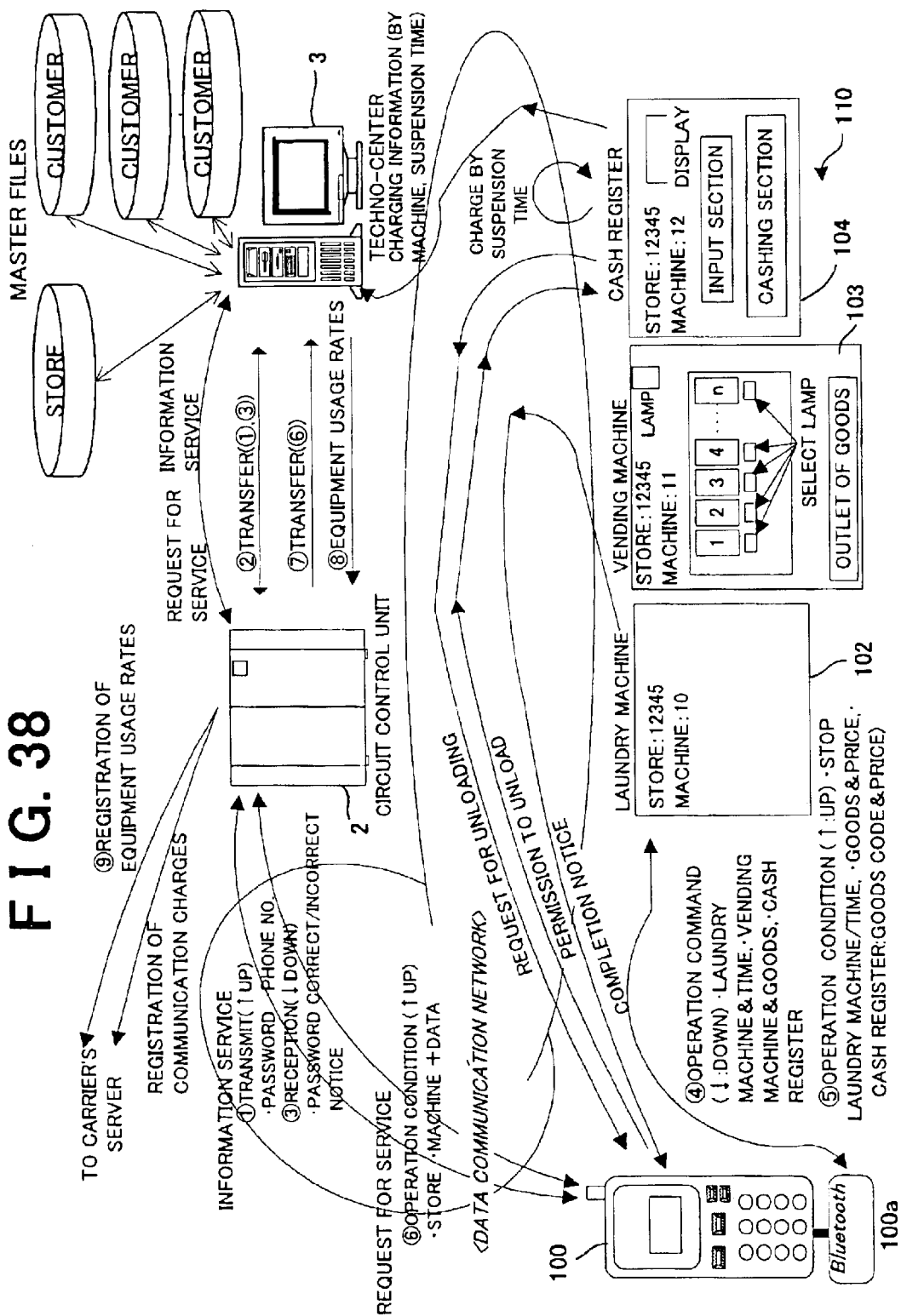
FIG. 38 is a block diagram showing a part of the structure of a laundry system according to a third embodiment of this invention.

FIG. 38 is a block diagram showing a part of the structure of the laundry system according to a third embodiment of this invention. The laundry system according to this embodiment differs from the laundry system described referring to FIGS. 1 and 2 in structure as described in the following:

Firstly, a laundry (store) 110 has a vending machine 103 and a cash register 104 in addition to the laundry machines (washing machine and dryer) 102, and is supposed to be manned. Usually, the laundry machine 102 comprises a plurality of machines, and the vending machine 103 comprises one or a plurality of vending machines, while the cash register 104 is usually one. The cash register 104 is operated by a store clerk.

This laundry system is arranged assuming the use of a mobile phone 100 having a low-power, short-range radio-communication unit 100a similarly to the laundry system according to the second embodiment. That is, the laundry machine 102, the vending machine 103, the cash register 104 and the mobile phone 100 are able to mutually communicate by means of low-power, short-range radiocommunication. Also, in this embodiment, the store clerk can transmit by operating the cash register 104 completion notifications and requests for permission to unload the laundry, while the mobile phone 100 can transmit a signal for permitting/prohibiting unloading of the laundry to the cash register 104.

Being arranged in such a manner, this system allows the customer to be notified of completion of washing or drying even when the customer leaves the store during the washing or the drying, thereby improving the customer service. In addition, the request to unload the laundry and the signal for permitting unloading of the laundry can prevent the clothes of the customer from being left in the laundry machine for a long time, and therefore eliminate inconveniences that another customer is unable to use the laundry machine.

In addition, in the laundry system according to the third embodiment, the customer not only can use the laundry machine 102 by means of the mobile phone owned by the customer, but also can purchase a desired goods from the vending machine 103. More concretely, specifying the number of the vending machine 103 and the number of the goods by the mobile phone 100 makes the vending machine 103 release the goods into its outlet opening, when simultaneously, the number and the price of the goods are delivered to the mobile phone 100 and transmitted to the techno-center 3 via the circuit control unit 2.

Furthermore, when various kinds of goods are displayed in the store 110, using the mobile phone 100 allows for so-called cashless purchases of desired goods. More specifically, specifying the cash register 104 by the mobile phone 100 makes the cash register 104 usable for the customer. Then, the codes and prices of the goods can be inputted by using the cash register 104 that has been made usable. The inputted codes and prices of the goods are delivered by means of the low-power, short-range radio-communication unit 100a from the cash register 104 to the mobile phone 100, from which they are further transmitted to the techno-center 3 via the circuit control unit 2.

Meanwhile, in this embodiment, although the store 110 is assumed to be a manned facility, it may also be unmanned. In that case, the goods displayed in the store are tagged for protection against stealing. As for the goods that have been inputted in the cash register 104, the system may be arranged such that their tags for protection against steeling are nullified so that the alarm will not set off when they are brought outside the store.

As discussed so far, this embodiment allows the customer in the store 110 to use the laundry machine 102 and to purchase goods from the vending machine 103 by using the mobile phone 100, and also to purchase goods without cash by utilizing the cash register 104.

FIG. 39 is a block diagram showing an arrangement of control circuits of the vending machine 103 and the cash register 104 provided in the store 110.

The vending machine 103 has a control part 91 including a microcomputer, a memory 92, and a goods selecting section 93 and a goods releasing section 94 controlled by the control part 91. By the goods selecting section 93 and the goods releasing section 94, a specific goods in a goods stock 95 is released into an outlet opening 96. A display part 97 is also connected to the control part 91. The display part 97 includes a machine selection lamp 98 and a goods selection lamp 99. The control part 91 of the vending machine 103 also has a radio data transceiving interface 70 for Bluetooth™ connected thereto.

The cash register 104 has a control part 71 including a microcomputer and a memory 72. An operation part 73 is connected to the control part 71. The operation part 73 includes an indicator 74 comprising a 7 segment, a LCD or the like, and a key matrix 75. This control part 71 also has a radio data transceiving interface 70 for Bluetooth™ connected thereto. Additionally, the cash register 104 has a cash installing/discharging section 76.

Meanwhile, the arrangement of the control circuit of the laundry machine 102 installed in the store 110 is the same as that of the system according to the second embodiment described referring to FIG. 28. Also, the arrangement of the control circuit of the mobile phone 100 is the same as that of the mobile phone used in the second embodiment described referring to FIG. 27. Accordingly, detailed descriptions of them are omitted here.

Figure 40:
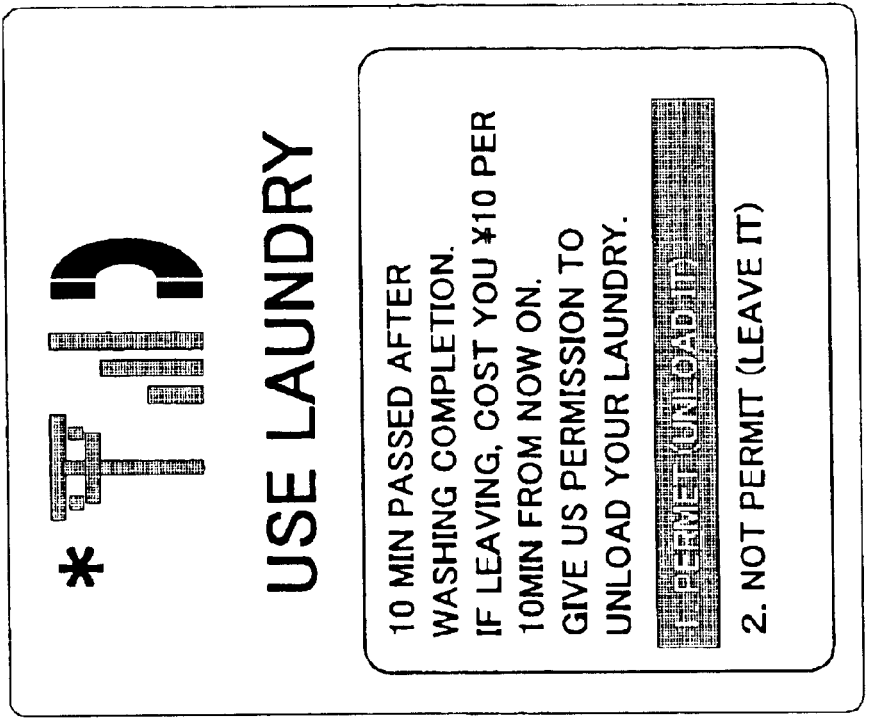
FIG. 40 illustrates one example of a completion notice displayed on the display of the mobile phone 100.
Figure 41:
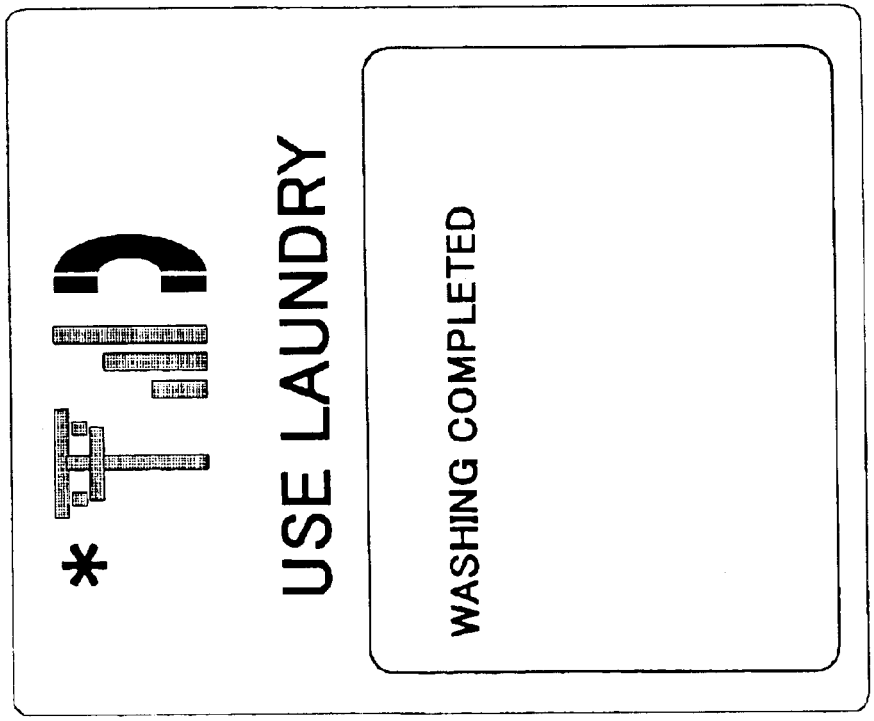
FIG. 41 illustrates one example of a request for permission to unload the laundry displayed on the display of the mobile phone 100.

FIG. 40 is an example of a completion message (e-mail message) displayed on the display 11 of the mobile phone 100. FIG. 41 is an example of a request for permission to unload the laundry also to be displayed on the display 11. In response to the request for permission to unload the laundry, the customer can select "Permitted" or "Not permitted", and send it back to the cash register 104.

FIGS. 42A–D and 43A, 43B illustrate in detail the operation part 73 of the cash register 104, in which an operational procedure of the key matrix 75 and contents displayed on the indicator 74 are shown.

When a key for requesting permission to unload the laundry is pressed (FIG. 42A), the indicator 74 displays a message, for example, "Machine No. 8 is waiting for unloading of laundry" (FIG. 42B). When the machine selection key is additionally pressed, the number of another machine waiting for unloading of the laundry appears (FIG. 42C). When requesting unloading of the laundry to the machine displayed, the customer presses the key for requesting permission to unload the laundry. Then, the message on the indicator 74 turns to the one in FIG. 42D.

Figure 43A:
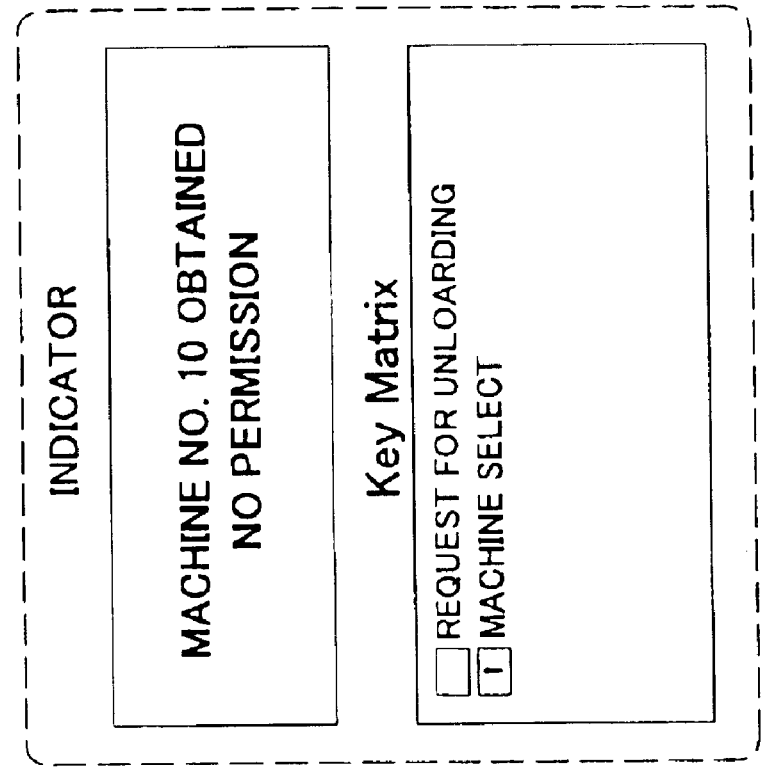
Figure 43B:
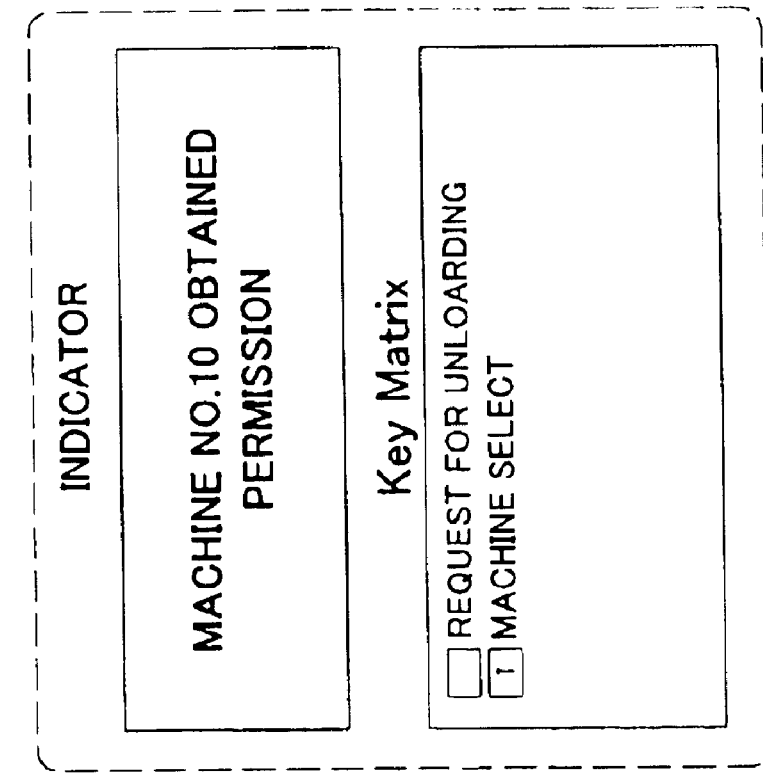

When receiving a response from the customer, the indicator 74 displays a message in FIG. 43A or in FIG. 43B. The message in FIG. 43A appears when a permission for unloading the laundry has been received, while the message in FIG. 43B appears when a prohibition of unloading the laundry has been received.

As described above, the laundry system according to this embodiment provides a service notifying the customer of completion of washing and drying, and with the customer's permission, a service in which the store clerk of the store 110 takes the laundry out of the laundry machine 102 after completion of washing or drying, and, for instance, transfers them into a basket container. In case of a customer leaving the laundry as it is even after a prescribed time, for example, ten minutes, has elapsed after completion of washing or drying, the system charges the customer.

Such a procedure of this system is hereinafter described with respect to flow charts.

Figure 44:
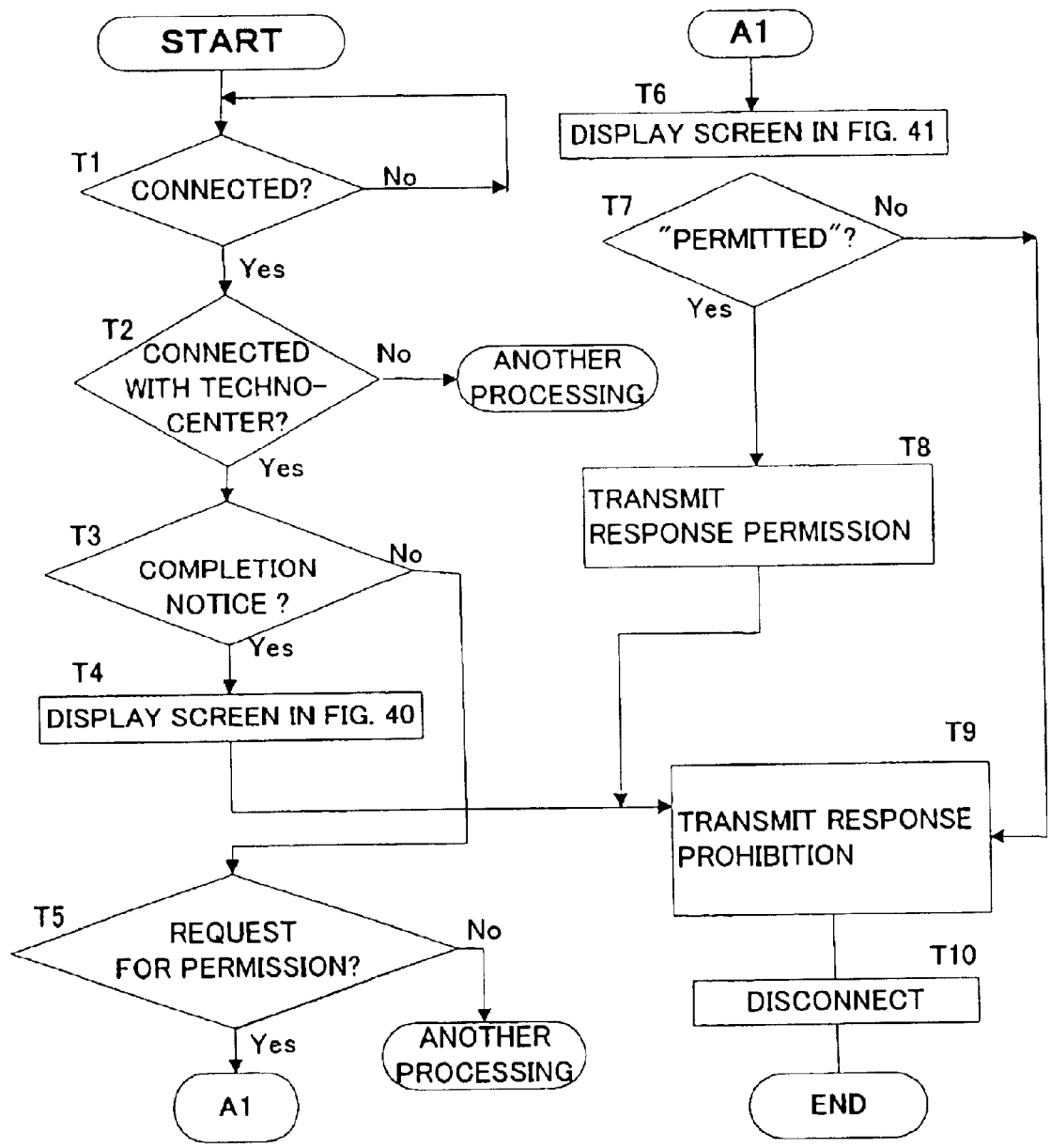
FIG. 44 is a flow chart showing a controlling procedure of the mobile phone 100.

FIG. 44 is a flow chart showing a controlling procedure of the mobile phone 100. When the circuit is connected (step T1), whether the connection is from the techno-center 3 or not is determined (step T2). When the connection is from the techno-center 3, whether a completion notice has been received or not is judged (step T3). With the completion notice having been received, the display 11 displays the screen in FIG. 40. That is, a message reading, "Washing has been completed.", is displayed on the display 11. Also, a voice message may be used for the completion notice instead of the character message.

When the notice received in step T3 is not a completion notice, whether it is a request for permission to unload the laundry or not is further judged (step T5). When it is the request for permission to unload the laundry, the screen in FIG. 41 is displayed (step T6). That is, the display shows a guide message reading, "10 minutes have passed after the washing finished. With your permission to unload the laundry, we will take your laundry out. Unless we receive such permission, you are to be charged 10 yen for every 10 minutes from now on.", along with two selectable options indicated as "1. Permitted (Unload the laundry)" and "2. Not permitted (Leave the laundry as it is)."

In response to these messages, the customer can select either one of the options. Subsequently, whether "1. Permitted" has been selected or not is determined (step T7). With the permission having been selected, the mobile phone 100 transmits a response for permitting to unload the laundry (step T8).

When prohibition is selected instead of permission, the mobile phone transmits a response refusing to unload the laundry (step T9), and then the circuit is disconnected (step T10).

Meanwhile, when a completion notice is received in step T4, the circuit is disconnected by the customer's operation or upon elapse of a prescribed time.

Figure 45:
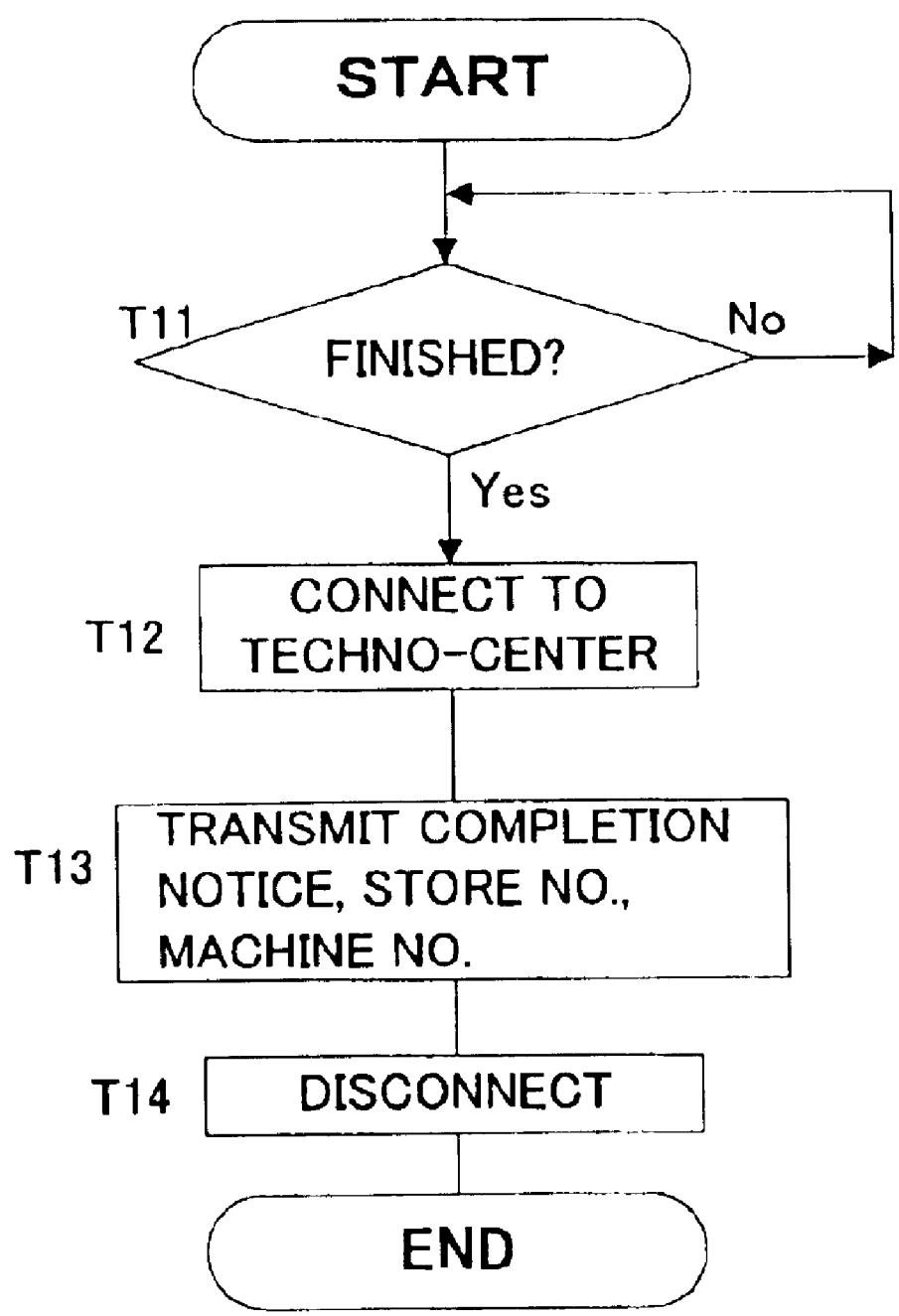
FIG. 45 is a flowchart showing a controlling procedure of the laundry machine 102.

FIG. 45 is a flowchart showing a controlling procedure of the laundry machine 102. In the laundry machine 102, whether the operation has been completed or not is determined (step T11). With the operation having been completed, the circuit is connected to the techno-center 3(step T12) so that a completion notice is transmitted along with a store number and a machine number to the techno-center 3 (step T13). Then, the circuit is disconnected (step T14).

Figure 46:
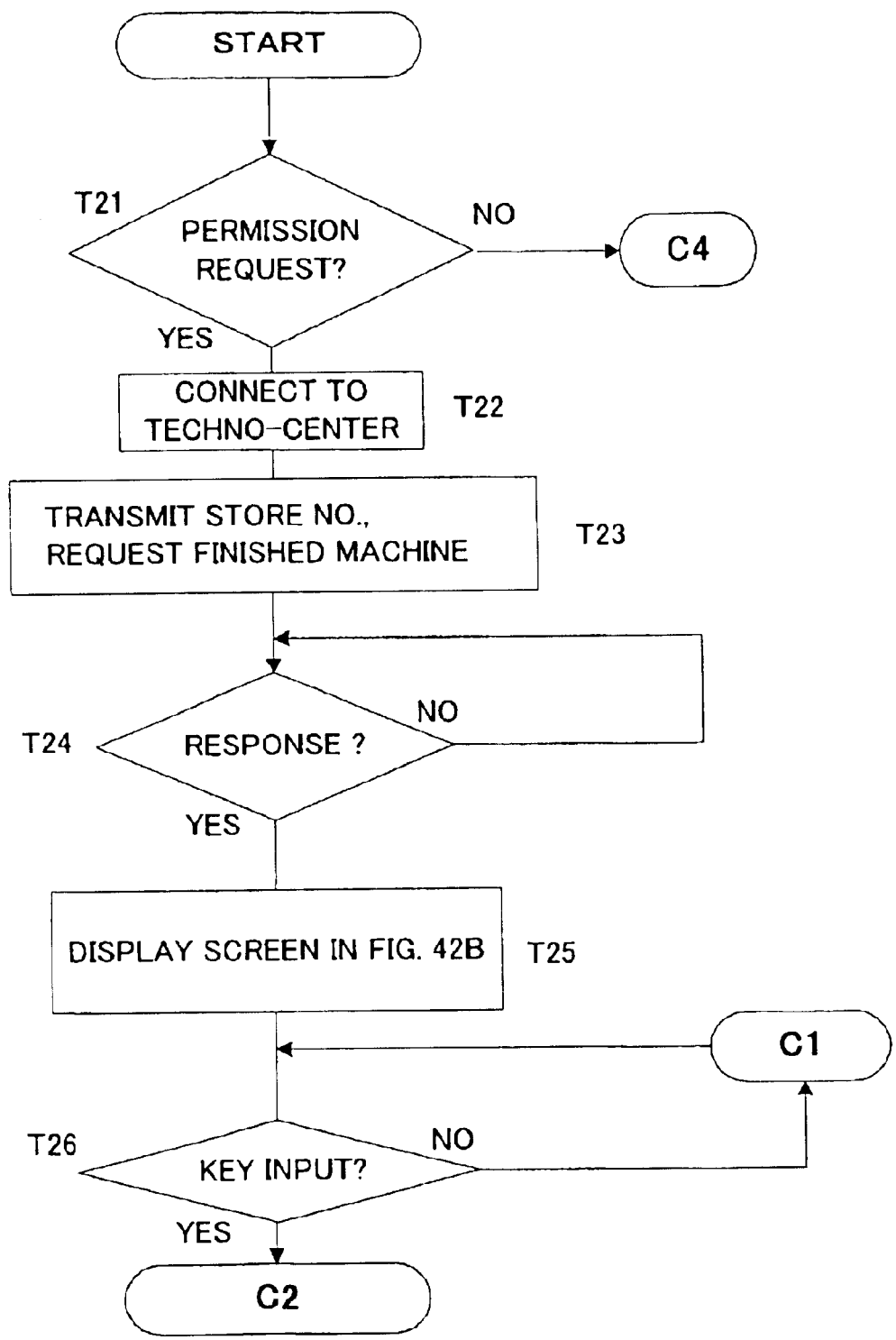
FIGS. 46 and 47 are flowcharts showing a controlling procedure of the cash register 104 operated by a store clerk.
Figure 47:
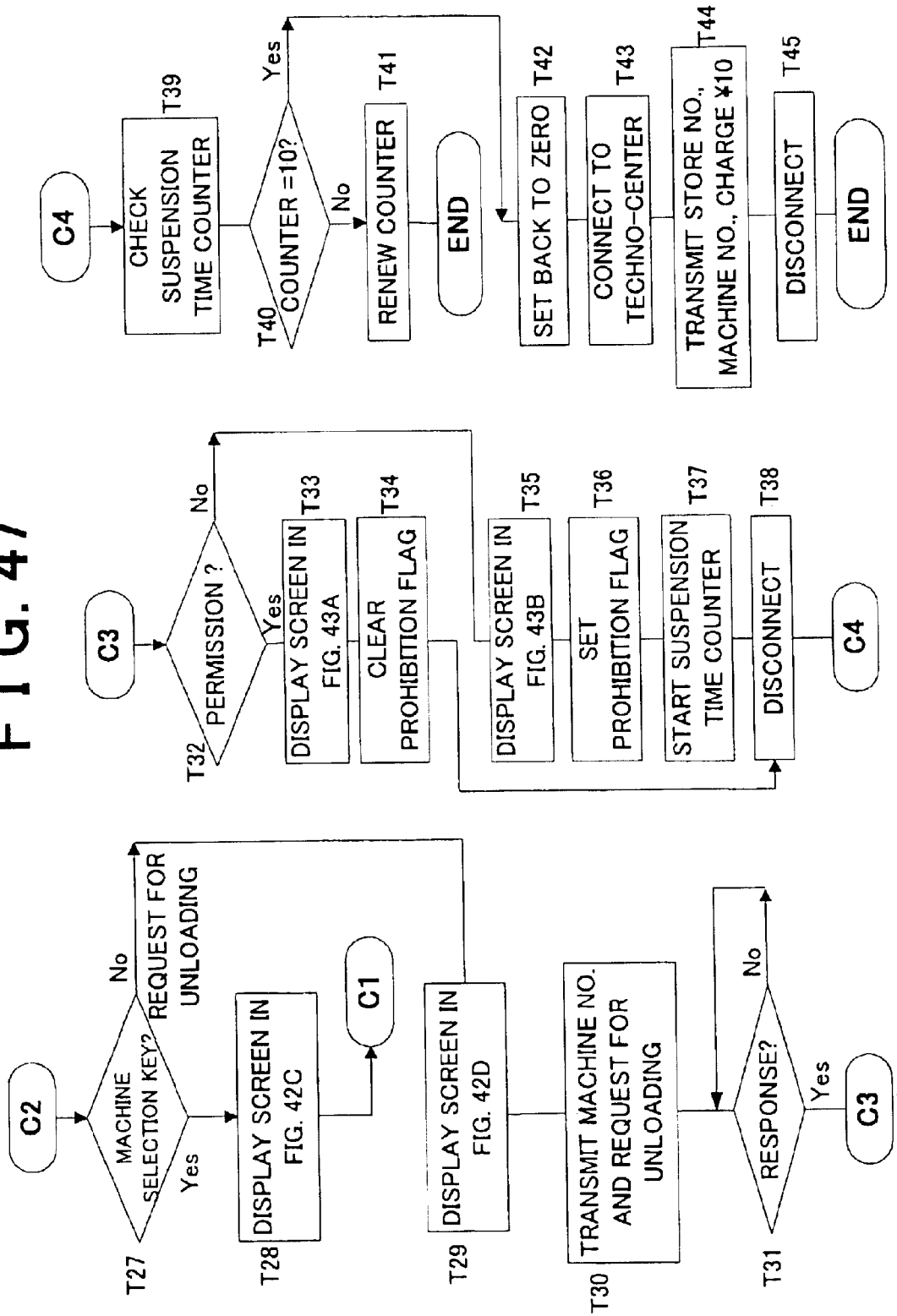

FIG. 46 is a flowchart showing a controlling procedure of the cash register 104 operated by a store clerk. The cash register 104 judges whether there is input by the key for requesting permission to unload the laundry or not (step T21). When it finds the input, it is connected to the techno-center 3 (step T22) so as to transmit the store number and a command requesting information on machines that have finished their operations (step T23). Subsequently, it waits for a response from the techno-center 3 (step T24), and upon receipt of the response, it displays the message in FIG. 42B on the indicator 74 (step T25) based on the data of the machines that have finished the operation.

Then, whether there is input on a key by the store clerk who has seen the above message is judged (step T26).

When there is a key input, whether the key is the machine selection key or not (step T27) is judged. When it is the machine selection key, according to the response given by the techno-center 3 and based on the data of the machines having finished their operations, a message, for example, the message in FIG. 42C is displayed (step T28).

When the input found in the step T27 is not by the machine selection key but by the key for requesting permission to unload the laundry, the message in FIG. 42D is displayed (step T29), and a command requesting permission to unload the laundry is transmitted along with the machine number to the mobile phone 100 (step T30).

The cash register then waits for a response from the mobile phone 100 (step T31), and thereafter, judges whether the response is permission or prohibition (step T32).

When the received response is a permission response, the message in FIG. 43A is displayed (step T33) so that the prohibition flag of the corresponding machine is cleared (step T34). Then, the circuit is disconnected (step T38).

On the contrary, when the response is a prohibition response, the message in FIG. 43B is displayed (step T35) and the prohibition flag of the corresponding machine is set (step T36). Then, a suspension time counter of the corresponding machine is started (step T37) and the circuit is disconnected (step T38).

Subsequently, the cash register 104 checks the suspension time counter of the machine in which the prohibition flag has been set (step T39) so as to determine whether the value of the counter is "10" or not (step T40). It renews the counter when the value is not "10" (step T41). When the value of the counter becomes "10", it sets back the counter to "00" (step T42) and connects to the techno-center 3(step T43) so as to transmit the store number, the machine number and a charge rate of 10 yen (step T44). Then, the circuit is disconnected (step T45).

For the sake of reference, FIG. 48 shows an example of prohibition flags and suspension time counter provided in a control program managing table inside the cash register 104.

Figure 49:
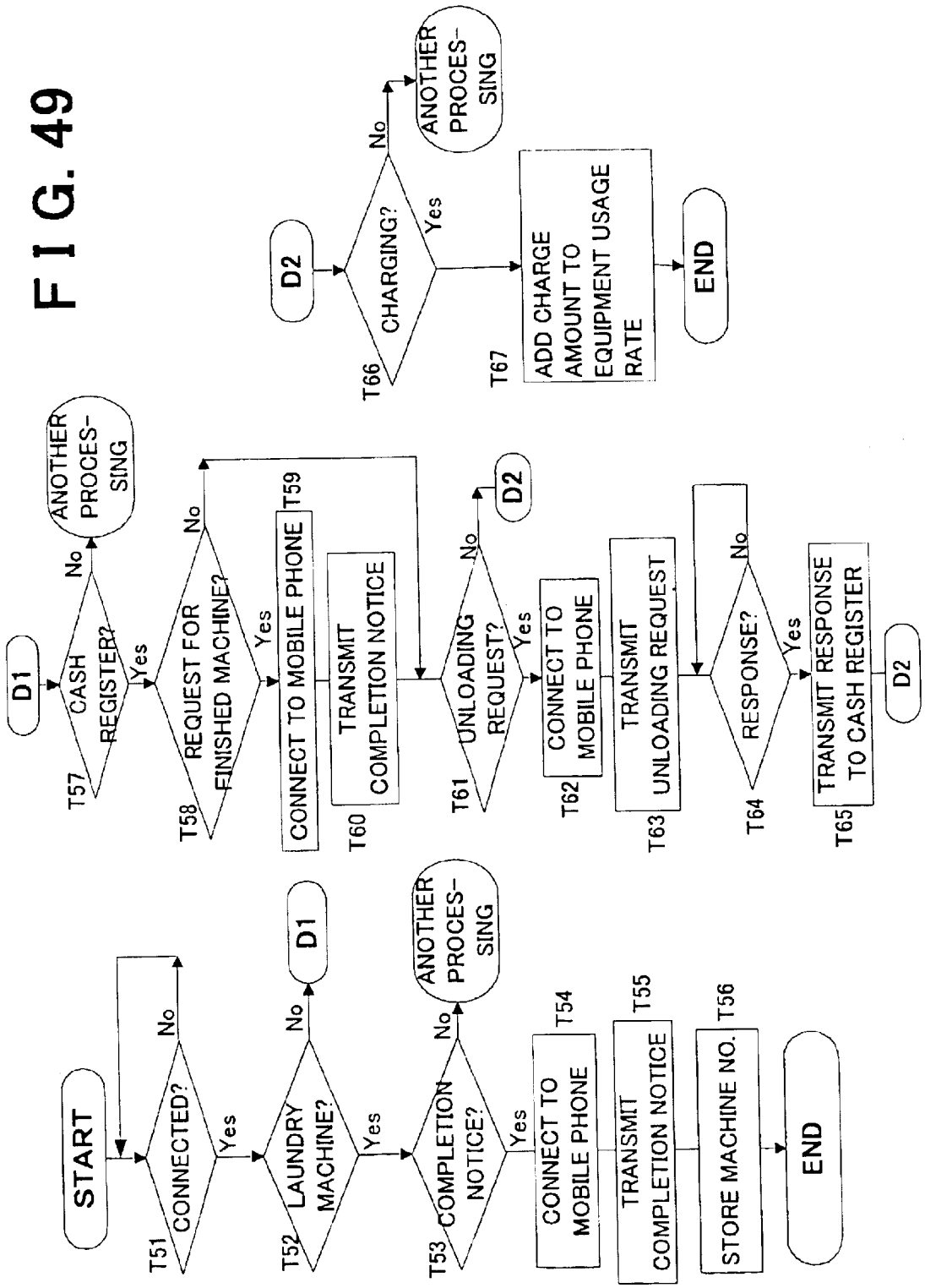
FIG. 49 is a flowchart showing a controlling procedure of the laundry managing server of the techno-center 3.

FIG. 49 is a flowchart showing a controlling procedure of the techno-center 3.

After determining that the circuit has been connected (step T51), the techno-center 3 determines whether the connection is from the laundry machine 102 or not (step T52). When the connection is from the laundry machine 102, whether it is receipt of a completion notice or not is checked (step T53). In the case of the completion notice, the circuit is connected to the mobile phone 100 on the basis of the store number and the machine number (step T54) so as to transmit the completion notice to the mobile phone 100 (step T55), when the techno-center 3 memorizes that the machine has finished the operation (step T56).

On the other hand, when it is determined that the connection in the step T52 is not from the laundry machine 102, whether it is from the cash register 104 or not is checked (step T57). In the case of a connection from the cash register 104, whether it is a request for information on machines that have finished the operation or not is determined (step T58). In the case of a request for the information on such machines, the circuit is connected to the mobile phone 100 on the basis of the store number and the machine number (step T59) so as to transmit the completion notice to the mobile phone 100(step T60).

When the connection is not intended for a request for information on machines that have finished the operation in the step T58, whether it is a request for permission to unload the laundry or not is further checked (step T61).

When it is the request for permission to unload the laundry, the circuit is connected to the mobile phone 100 on the basis of the store number and the machine number (step T62) so as to transmit the request for permission to unload the laundry to the mobile phone 100 (step 63).

Subsequently, the techno-center 3 waits until it receives data for permission or prohibition to unload the laundry (step T64). Upon receipt of the data from the mobile phone 100, it transmits the received data for permission or prohibition to unload the laundry to the cash register 104 (step T65).

When the connection in the step T61 is not intended for a request for permission to unload the laundry, whether it is a charge notice or not is determined (step T66)).

In the case of a charge notice, the techno-center 3 accesses the master files of customers so as to add the charged amount to the data of the equipment usage rate of the customer (step T67).

In the above procedure, the completion notice and the request for permission to unload the laundry are transmitted via the techno-center 3 to the customer's mobile phone 100, and the techno-center 3 receives the signals from the customer's mobile phone 100. However, it is also possible to arrange the procedure in such a manner that the completion notice and the request for permission to unload the laundry are transmitted from the cash resister 104 or the laundry machine 102 in the store 110 directly to the customer's mobile phone 100, and the signal for permission or prohibition to unload the laundry is transmitted from the mobile phone 100 to the cash register 104.

In this embodiment, the completion notice and the request for permission to unload the laundry are transmitted as character signals in the form of so-called e-mail. However, such completion notice and the request for permission to unload the laundry may be informed in the form of pictures or symbols. Or, synthetic voices or the like may be adopted to deliver the completion notice and the request for permission to unload the laundry as voice information to the customer's mobile phone 100 so that the customer responds to the voice by his or her voice.

In each of the embodiments described so far, it is possible for one server to be both the techno-center 3 (laundry managing server) and the carrier server 4 at the same time, that is, the carrier server 4 may perform the laundry management as well.

It is to be understood that the present invention is not limited to the embodiments described above, but modifications thereof may be made within the scope of the appended claims.

This application is based on Japanese patent applications No. 2000-099762 and No. 2001-036805, the contents of which are incorporated herein by reference.

What is claimed is:

1. A laundry system comprising laundry equipment which comprises a plurality of laundry machines, a laundry managing server for managing the laundry equipment, and a carrier server capable of communicating with the laundry managing server wherein:

the laundry equipment comes into an operable state by receiving a signal for permitting operation thereof from the laundry managing server, and transmits operational information to the laundry managing server in response to operation of the laundry equipment which has become operable;

the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information; and the carrier server comprises:
a customer file for storing customer information;
means for writing a communication charge caused by the portable communication tool in the customer file each time when the portable communication tool transmits information;
means for writing bill data transmitted from the laundry managing server in the customer file as a laundry equipment usage rate; and
means for issuing a bill to the customer, the bill claiming a sum of the communication charge and the laundry equipment usage rate.

2. The laundry system according to claim 1, wherein the laundry equipment includes a store controller (DTC) connected to the plurality of laundry machines by communication means and the store controller has another communication means for communicating with the laundry managing server.

3. The laundry system according to claim 1, wherein the means for creating bill data memorize a billing amount based on the operational information of the customer for a prescribed period, and create bill data based on aggregation of the billing amount for the prescribed period.

4. A laundry managing server for the laundry system according to claim 1, further comprising:

a customer file memorizing at least customer identification data that have been predetermined between the laundry managing server and a customer;

means capable of communicating with the laundry equipment and a portable communication tool owned by the customer for transmitting a signal for permitting operation to the laundry equipment that has been identified by information for identifying the laundry equipment that the customer desires to use, the transmission being carried out in response to receipt of the customer identification data and the information for identifying the laundry equipment transmitted from the portable communication tool of the customer;

means for receiving operational information transmitted from the laundry equipment when the laundry equipment is driven to operate; and means for storing the received operational information in the customer file by summing up the operational information by customer, and outputting the operational information as a laundry equipment usage rate of the customer at prescribed periods.

5. The laundry system according to claim 1, wherein a server serves as both the laundry managing server and the carrier server.

6. The laundry system according to claim 1, further comprising a bank computer under contract with the carrier server, the bank computer comprising:

means for collecting the communication charge and the laundry equipment usage rate of the customer from a bank account of the customer by accessing the customer file of the carrier server; and means for paying the collected communication charge to a bank account of a carrier and paying the collected laundry equipment usage rate to a bank account of an owner of the laundry equipment.

7. The laundry system of claim 4, further comprising:

means for transmitting a notice of completion of a prescribed treatment for the laundry in the laundry machine to a portable communication tool of a customer in response to the completion of the treatment.

8. The laundry system according to claim 1, wherein the portable communication tool comprises:

means for requesting input of a predetermined password;

means for requesting input of identification information for identifying the laundry equipment and the laundry machine; and communication means for transmitting the password and the identification information that have been inputted by radio communication.

9. The portable communication tool according to claim 8, wherein the communication means receive at least a signal informing whether the password has been verified or not after transmitting the password.

10. The laundry system according to claim 1, wherein the laundry equipment is capable of communicating with the portable communication tool of the customer by a first low-power, short-range radio communication means, while the portable communication tool of the customer is capable of transmitting data concerning the communication with the laundry equipment to the laundry managing server by a second radio communication means other than the first low-power radio communication means.

11. A laundry system comprising laundry equipment which comprises a plurality of laundry machines, and a laundry managing server for managing the laundry equipment, wherein:

the laundry equipment comes into an operable state by receiving a signal for permitting operation thereof from the laundry managing server, and transmits operational information to the laundry managing server in response to operation of the laundry equipment which has become operable;

the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information;

the laundry equipment includes a store controller (DTC) connected to the plurality of laundry machines by communication means, and the store controller has another communication means for communicating with the laundry managing server;

each of the plurality of the laundry machines comprises information given thereto for identifying the laundry machine, an operable condition indicator, an operation part, and controlling means for driving the machine to operate upon input of an operation signal caused by operation of the operation part while the indicator indicates an operable condition, and then outputting operational information at the time to the store controller via the communication means; and the store controller comprises external communication means, means for bringing the laundry machine into an operable condition upon receipt of information for identifying the laundry machine along with a signal for permitting operation thereof, and means for transmitting the operational information inputted from the laundry machine by the external communication means.

12. A laundry system comprising laundry equipment which comprises a plurality of laundry machines, and a laundry managing server for managing the laundry equipment, wherein:

the laundry equipment comes into an operable state by receiving a signal for permitting operation thereof from the laundry managing server, and transmits operational information to the laundry managing server in response to operation of the laundry equipment which has become operable;

the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information; p1 the laundry equipment is capable of communicating with the portable communication tool of the customer by a low-power, short-range first radio communication means, while the portable communication tool of the customer is capable of transmitting data concerning the communication with the laundry equipment to the laundry managing server by a second radio communication means other than the first low-power radio communication means;

the portable communication tool has a GPS antenna so as to identify positional information of the portable communication tool by receiving a signal from the GPS antenna; and the laundry managing server identifies the laundry equipment to be used by the customer based on the positional information of the portable communication tool transmitted from the portable communication tool owned by the customer.

13. A laundry system comprising laundry equipment which comprises a plurality of laundry machines, and a laundry managing server for managing the laundry equipment, wherein:
   the laundry equipment comes into an operable state by receiving a signal for permitting operation thereof from the laundry managing server, and transmits operational information to the laundry managing server in response to operation of the laundry equipment which has become operable;
   the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information;
   the laundry equipment is capable of communicating with the portable communication tool of the customer by a low-power, short-range first radio communication means, while the portable communication tool of the customer is capable of transmitting data concerning the communication with the laundry equipment to the laundry managing server by a second radio communication means other than the first radio communication means;
   the data to be transmitted from the laundry equipment to the portable communication tool of the customer by the first radio communication means include information for identifying the laundry equipment;
   the portable communication tool of the customer transmits the information for identifying the laundry equipment received from the laundry equipment to the laundry managing server by the second radio communication means; and
   the laundry managing server identifies the laundry equipment to be used by the customer based on the information transmitted thereto.

14. A laundry system comprising laundry equipment which comprises a plurality of laundry machines, and a laundry managing server for managing the laundry equipment, wherein:
   the laundry equipment comes into an operable state by receiving a signal for permitting operation thereof from the laundry managing server, and transmits operational information to the laundry managing server in response to operation of the laundry equipment which has become operable;
   the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information;
   the laundry equipment is capable of communicating with the portable communication tool of the customer by a low-power, short-range first radio communication means, while the portable communication tool of the customer is capable of transmitting data concerning the communication with the laundry equipment to the laundry managing server by a second radio communication means other than the first radio communication means;
   the laundry machine has identification for identifying itself;
   the laundry machine further comprises:
      the first specified low-power, short-range radio communication means;
      first judgment means for judging whether the machine is operable or not when the first radio communication means receive identification information from a portable communication tool;
      means for indicating an operable condition of the machine and transmitting a response by the first radio communication means permitting operation of the machine based on a judgment of the first judgment means determining that the machine is operable;
      second judgment means for judging whether operational information permits operation of the machine or not when the first radio communication means receives the operational information as a result of the transmission of the response permitting operation of the machine; and
      means for starting operation of the machine based on a judgment of the second judgment means determining that the machine is operable, and transmitting the operational information from the first radio communication means.

15. A portable communication tool for use with a desired laundry machine in a laundry system that includes laundry equipment that comprises a plurality of laundry machines, and a laundry managing server for managing the laundry equipment, wherein
   the laundry equipment comes into an operable state by receiving a signal for permitting operation thereof from the laundry managing server, and transmits operational information to the laundry managing server in response to operation of the laundry equipment which has become operable;
   the laundry managing server comprises means for confirming validity of customer identification data when receiving the customer identification data along with specific information for identifying laundry equipment that the customer desires to use from a portable communication tool of the customer and transmitting a signal to the laundry equipment that has been identified by the specific information so as to permit operation of the laundry equipment, and means for receiving the operational information from the laundry equipment and creating bill data for charging the customer based on the customer identification data and the operational information; and
   the portable communication tool comprises:
      means for requesting input of a predetermined password;

means for requesting input of identification information for identifying the laundry equipment and the laundry machine;

first communication means for transmitting the password and the identification information that have been inputted by radio communication;

second communication means for transceiving signals by prescribed low-power, short-range radio communication which is different from aforementioned radio communication; and means for transmitting inputted operational information of the laundry machine in response to receipt of verification of the password by the second communication means.

16. The portable communication tool according to claim 15, further comprising transmission control means for transmitting the operational information of the laundry machine by aforementioned communication means that are different from the second communication means when the second communication means receive the operational information of the laundry machine as a response to the transmission of the operational information.

17. A laundry system comprising laundry equipment having a plurality of laundry machines for carrying out prescribed treatments including a washing machine for washing laundry and a dryer for drying laundry, and a laundry managing server for managing the laundry equipment, the laundry system additionally comprising:

means for transmitting a notice of completion of a prescribed treatment for the laundry in the laundry machine to a portable communication tool of a customer in response to the completion of the treatment;

means for transmitting a request for permission to unload the laundry to the portable communication tool of the customer for inquiring whether the laundry may be unloaded from the laundry machine, the transmission being carried out in response to a lapse of a prescribed time after the completion of the treatment for the laundry, and means for charging the customer based on receipt of a signal for prohibiting unloading of the laundry from the portable communication tool of the customer in response to the transmission of the request for permission to unload the laundry, or based on absence of response from the portable communication tool of the customer.

18. The laundry system according to claim 17, wherein the request for permission to unload the laundry includes data for permission and prohibition as data available for the customer's response so that either response is selected by the portable communication tool of the customer so as to be automatically transmitted to the laundry system.

19. The laundry system according to claim 18, wherein the transmission to the portable communication tool of the customer is carried out by means of characters and/or figures information.

* * * * *